US012358410B2

(12) United States Patent
Yamauchi

(10) Patent No.: US 12,358,410 B2
(45) Date of Patent: Jul. 15, 2025

(54) VEHICLE SEAT HAVING A HEATER AND A PLURALITY OF AIR CELLS, AND A METHOD FOR MANUFACTURING THE SAME

(71) Applicant: TS TECH CO., LTD., Asaka (JP)

(72) Inventor: Naoto Yamauchi, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 175 days.

(21) Appl. No.: 18/246,962

(22) PCT Filed: Sep. 15, 2021

(86) PCT No.: PCT/JP2021/033918
§ 371 (c)(1),
(2) Date: Mar. 28, 2023

(87) PCT Pub. No.: WO2022/070920
PCT Pub. Date: Apr. 7, 2022

(65) Prior Publication Data
US 2023/0365041 A1 Nov. 16, 2023

Related U.S. Application Data

(60) Provisional application No. 63/198,098, filed on Sep. 29, 2020.

(30) Foreign Application Priority Data

Dec. 28, 2020 (JP) .................................. 2020-219011
Feb. 24, 2021 (JP) .................................. 2021-027636
Mar. 1, 2021 (JP) .................................. 2021-031811

(51) Int. Cl.
*B60N 2/90* (2018.01)
*B60N 2/00* (2006.01)
*B60N 2/56* (2006.01)

(52) U.S. Cl.
CPC ............ *B60N 2/914* (2018.02); *B60N 2/0021* (2023.08); *B60N 2/5685* (2013.01); *B60N 2/976* (2018.02)

(58) Field of Classification Search
CPC ....... B60N 2/914; B60N 2/5685; B60N 2/976
(Continued)

(56) References Cited

U.S. PATENT DOCUMENTS 4,869,550 A * 9/1989 Lorenzen ................. H05B 3/34
297/180.12
4,960,304 A * 10/1990 Frantz ................... A61G 5/1043
297/284.6
(Continued)

FOREIGN PATENT DOCUMENTS

DE 102013014039 * 9/2019 ........... B60N 2/5621
FR 3040930 A1 3/2017
(Continued)

OTHER PUBLICATIONS

Extended European Search Report for corresponding Application No. 21875222.8, dated Sep. 30, 2024, 8 pages.
(Continued)

*Primary Examiner* — Milton Nelson, Jr.
(74) *Attorney, Agent, or Firm* — Dority & Manning, P.A.

(57) ABSTRACT

A vehicle seat includes at least one of a seat back and a seat cushion having a pad member and a skin member covering the pad member, wherein a heater having a sheet configuration and a plurality of air cells are provided between a surface side of the pad member and the skin member.

13 Claims, 32 Drawing Sheets

(58) Field of Classification Search
USPC .......................... 297/180.12, 284.6, 452.41
See application file for complete search history.

(56) References Cited

U.S. PATENT DOCUMENTS

| | | | |
|---|---|---|---|
| 8,544,942 | B2 | 10/2013 | Lazanja et al. |
| 8,702,164 | B2 | 4/2014 | Lazanja et al. |
| 9,657,963 | B2 | 5/2017 | Lazanja et al. |
| 9,975,516 | B2 | 5/2018 | Kobayashi |
| 11,370,337 | B2 * | 6/2022 | Greenwood ......... B60N 2/5642 |
| 2012/0032478 | A1 | 2/2012 | Friderich et al. |
| 2013/0101878 | A1 | 4/2013 | Pilgram et al. |
| 2014/0097651 | A1 * | 4/2014 | Fortune .................. B60N 2/003 297/180.12 |
| 2018/0086238 | A1 | 3/2018 | Onuma et al. |
| 2021/0300224 | A1 * | 9/2021 | Tait .......................... B60N 2/56 |
| 2022/0281368 | A1 | 7/2022 | Greenwood |

FOREIGN PATENT DOCUMENTS

| | | |
|---|---|---|
| JP | 2004237821 A | 8/2004 |
| JP | 2008-238926 A | 10/2008 |
| JP | 2013531335 A | 8/2013 |
| JP | 2014083916 A | 5/2014 |
| JP | 2015003579 A | 1/2015 |
| JP | 2015048054 A | 3/2015 |
| JP | 2017201999 A | 11/2017 |
| JP | 2017210072 A | 11/2017 |
| JP | 2018047862 A | 3/2018 |
| JP | 2019-026232 A | 2/2019 |
| JP | 2019123278 A | 7/2019 |
| JP | 2020124970 A | 8/2020 |

OTHER PUBLICATIONS

Japanese Office Action (w/ English translation) for corresponding Application No. 2021-031811, dated Oct. 1, 2024, 8 pages.
Office Action (with English translation) received in corresponding Application No. JP 2020- 219011, dated Dec. 20, 2023, 12 pages.
Japanese Office Action (with English translation) received in correspoding Application No. JP 2020-219011, dated Aug. 17, 2023, 8 pages.
Japanese Office Action for Application No. 2021-027636 Dated Nov. 26, 2024.
International Search Report (with English translation) for PCT/JP2021/033918, mailed on Dec. 7, 2021, 4 pages.

* cited by examiner

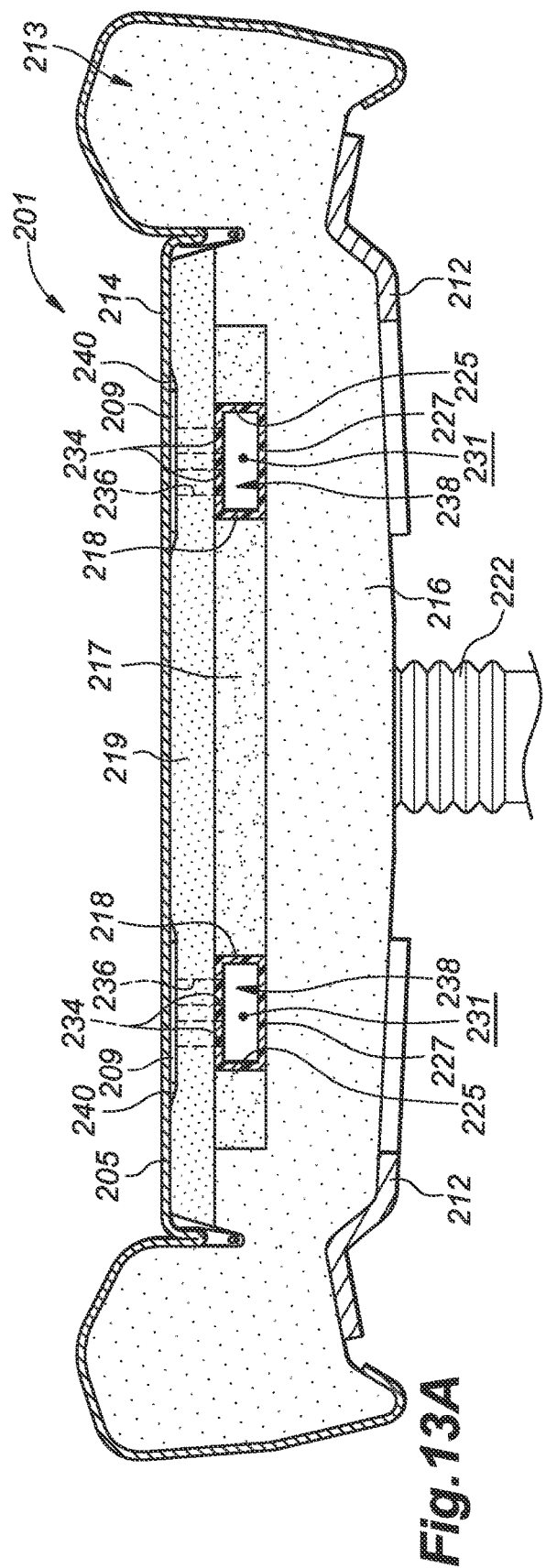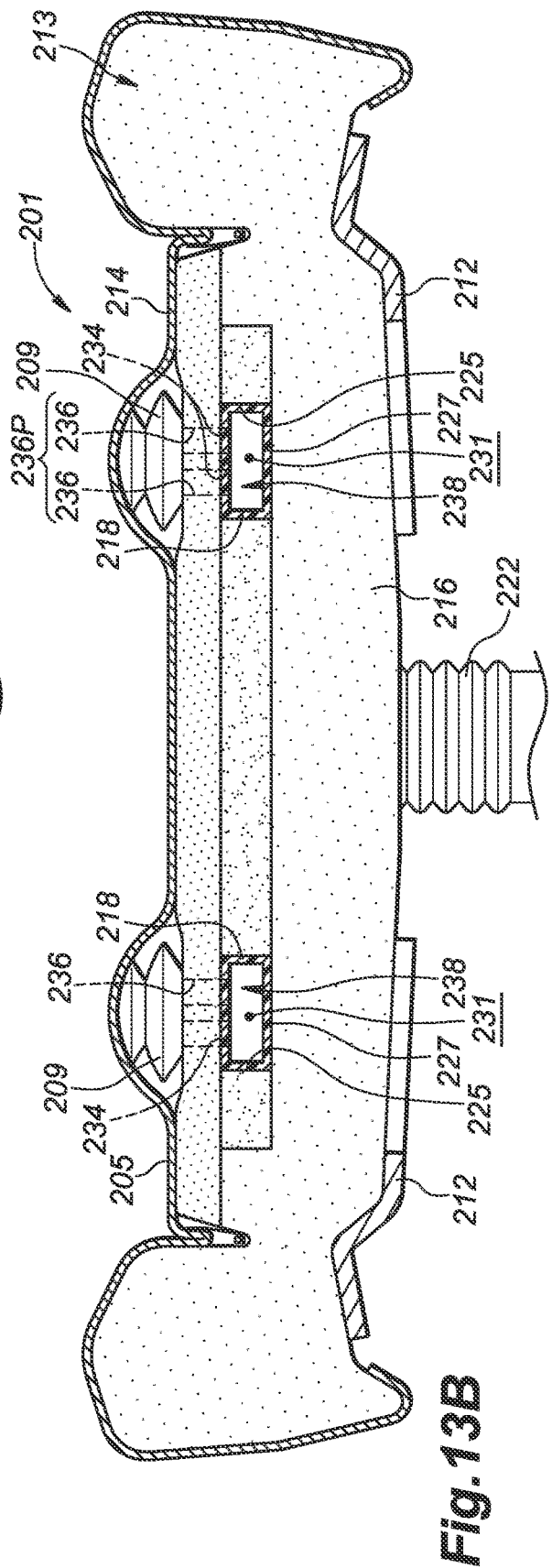

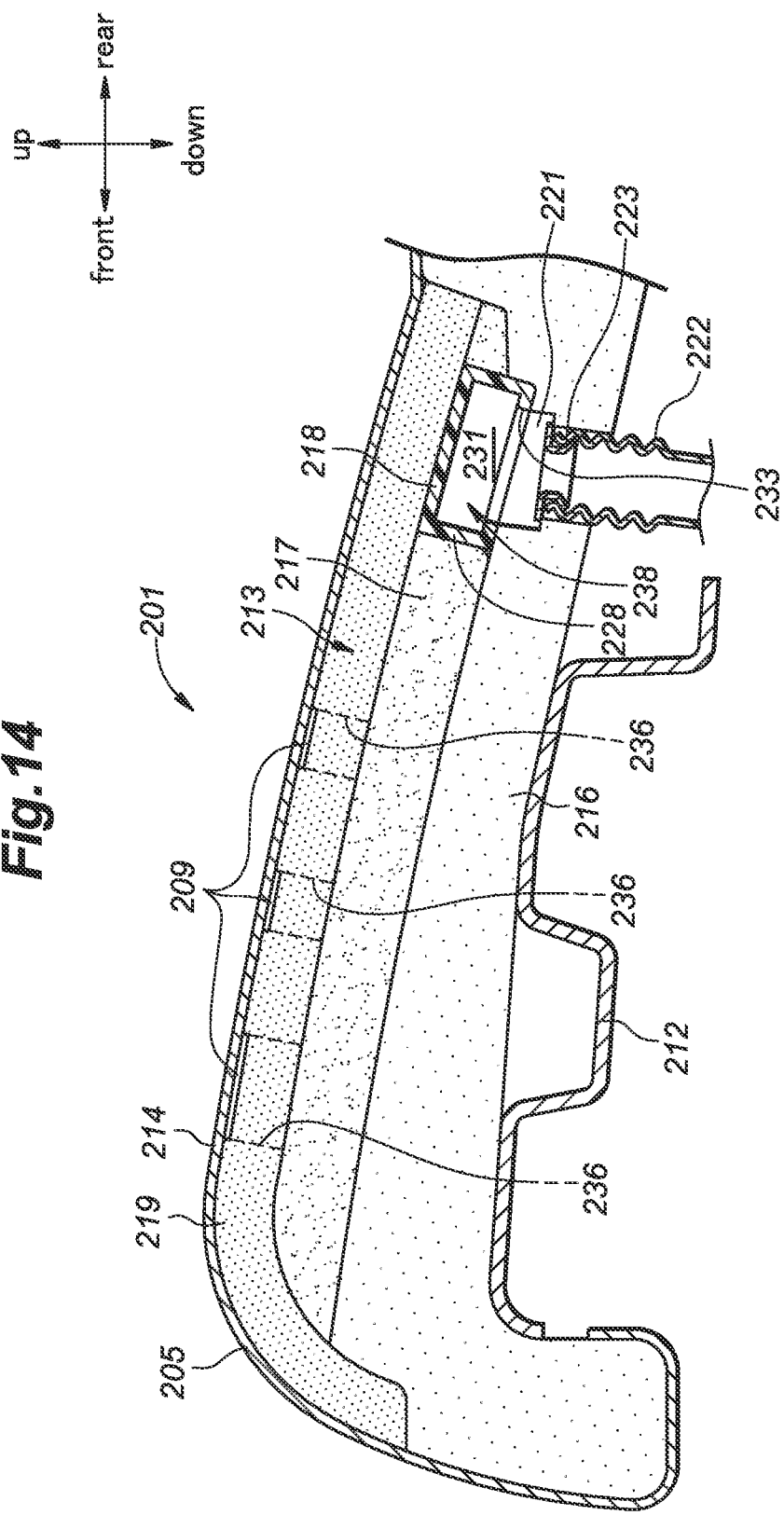

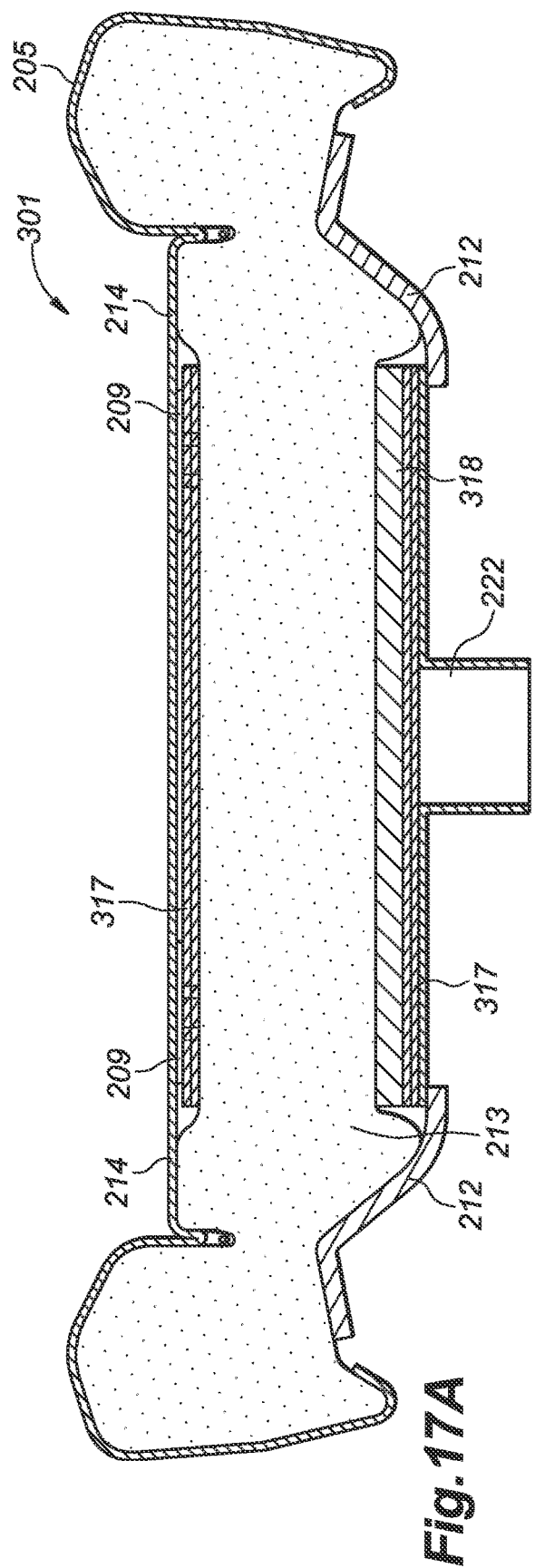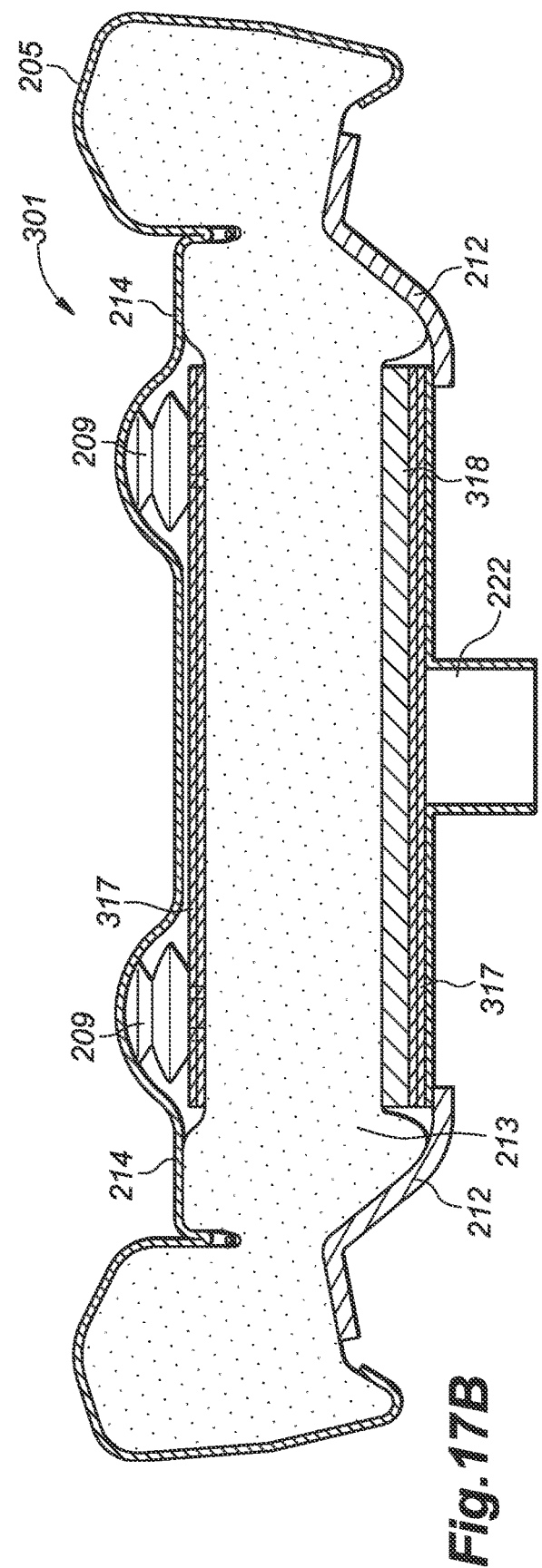

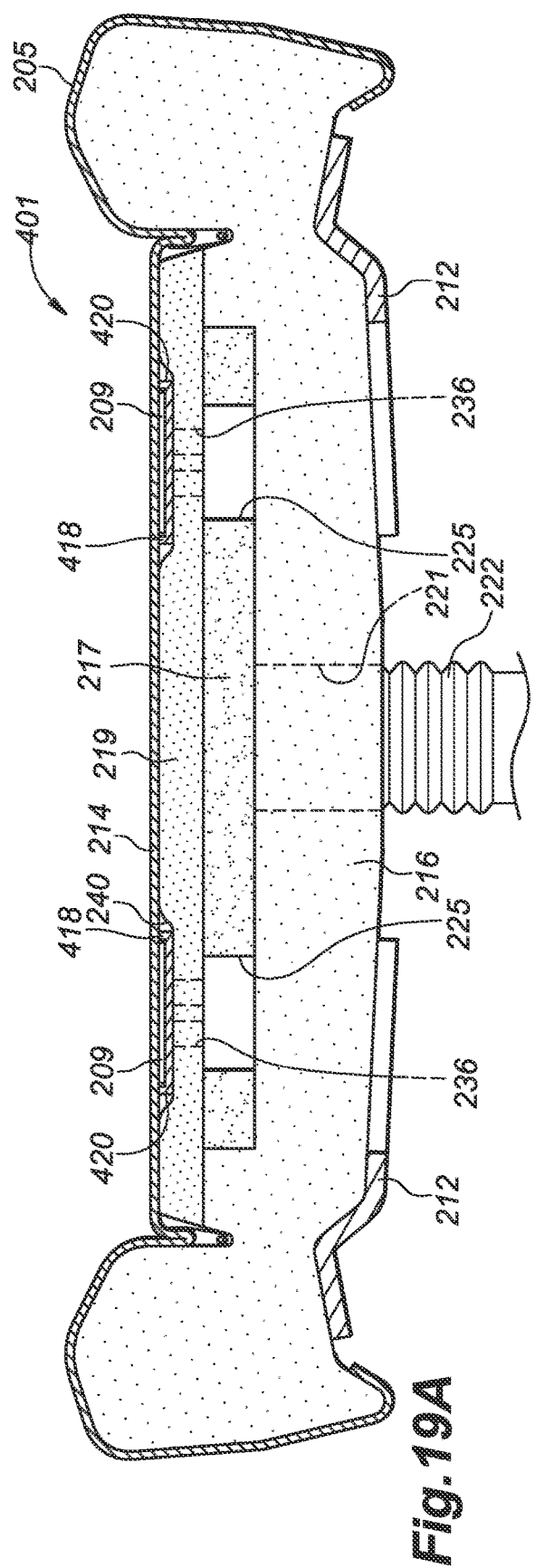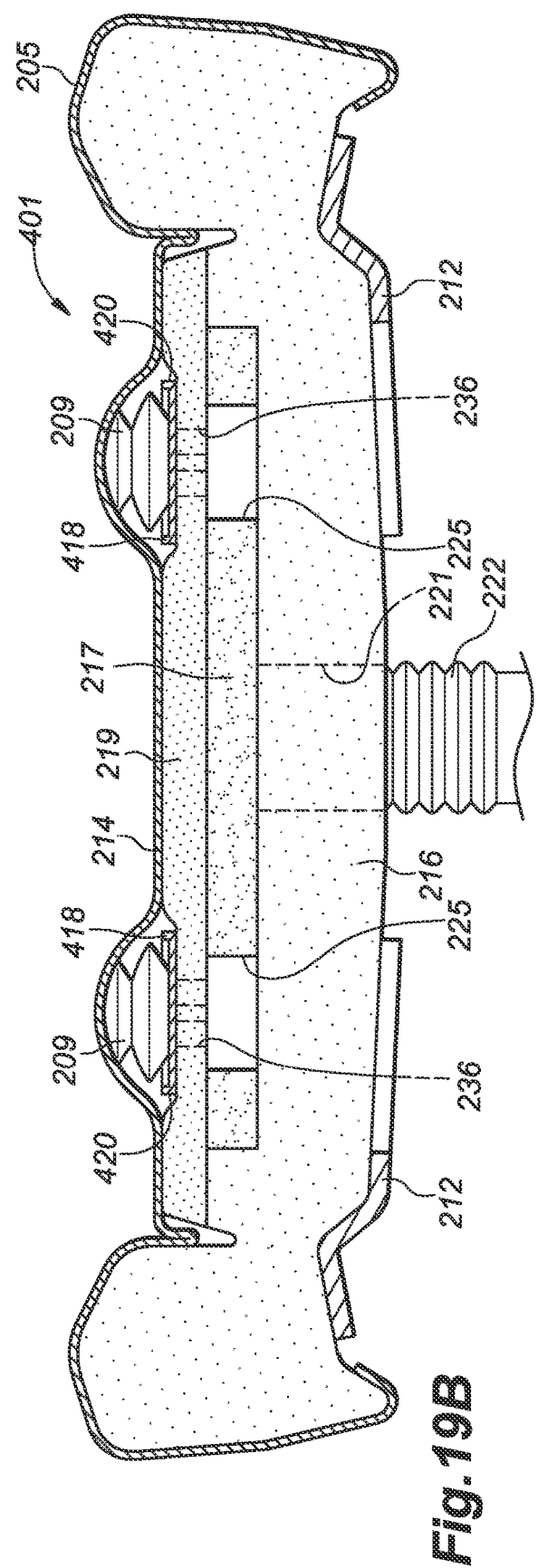

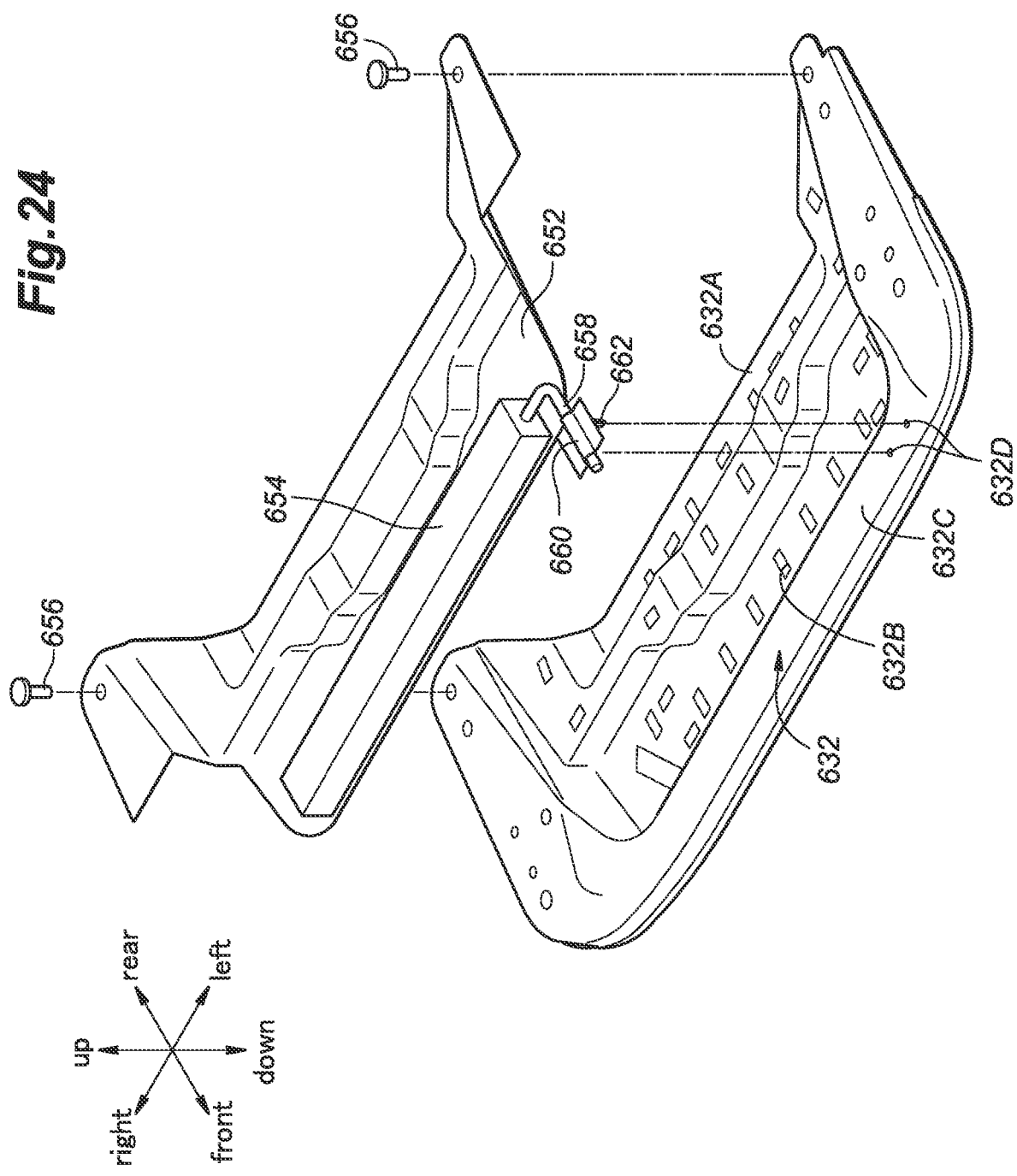

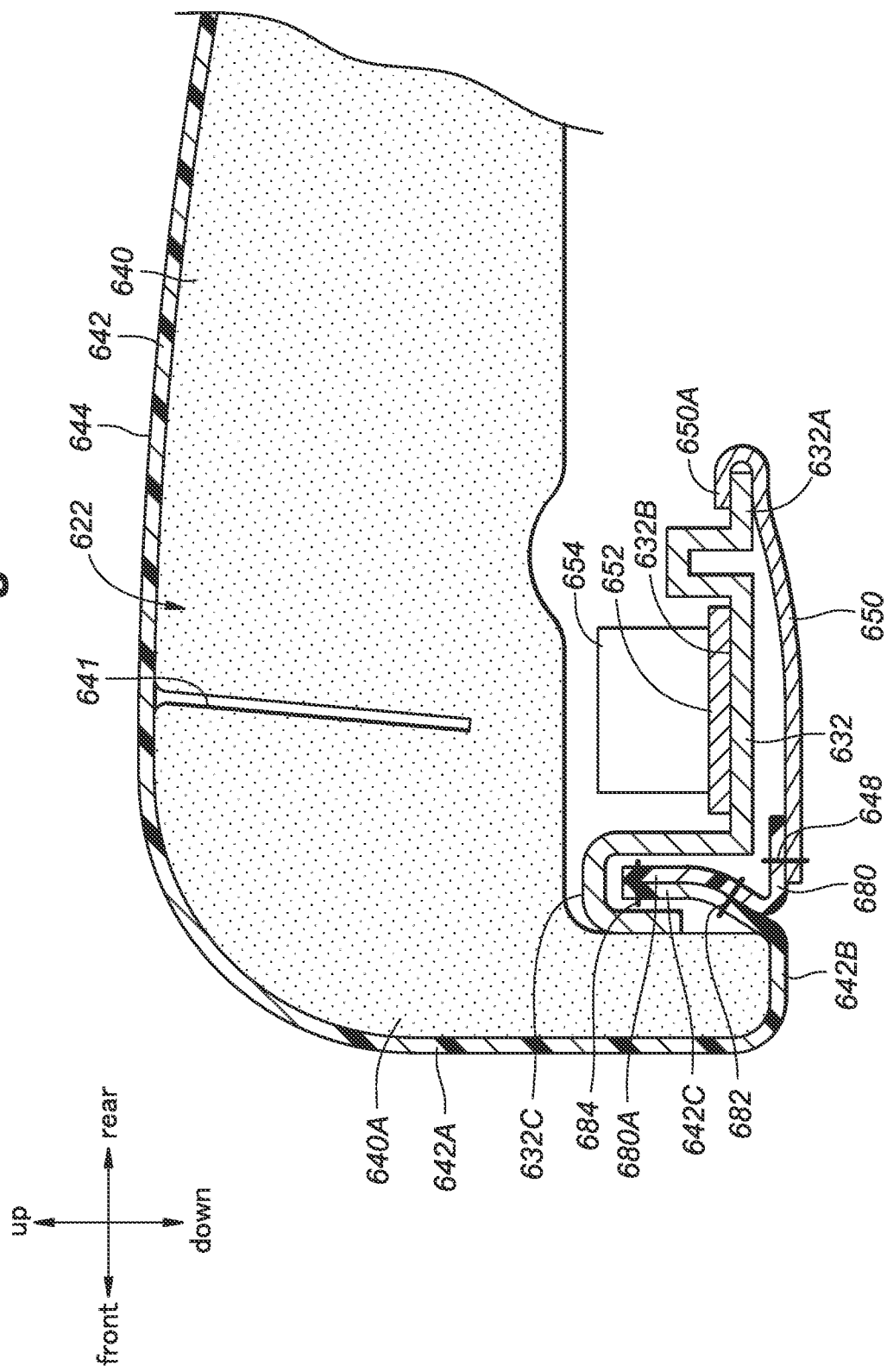

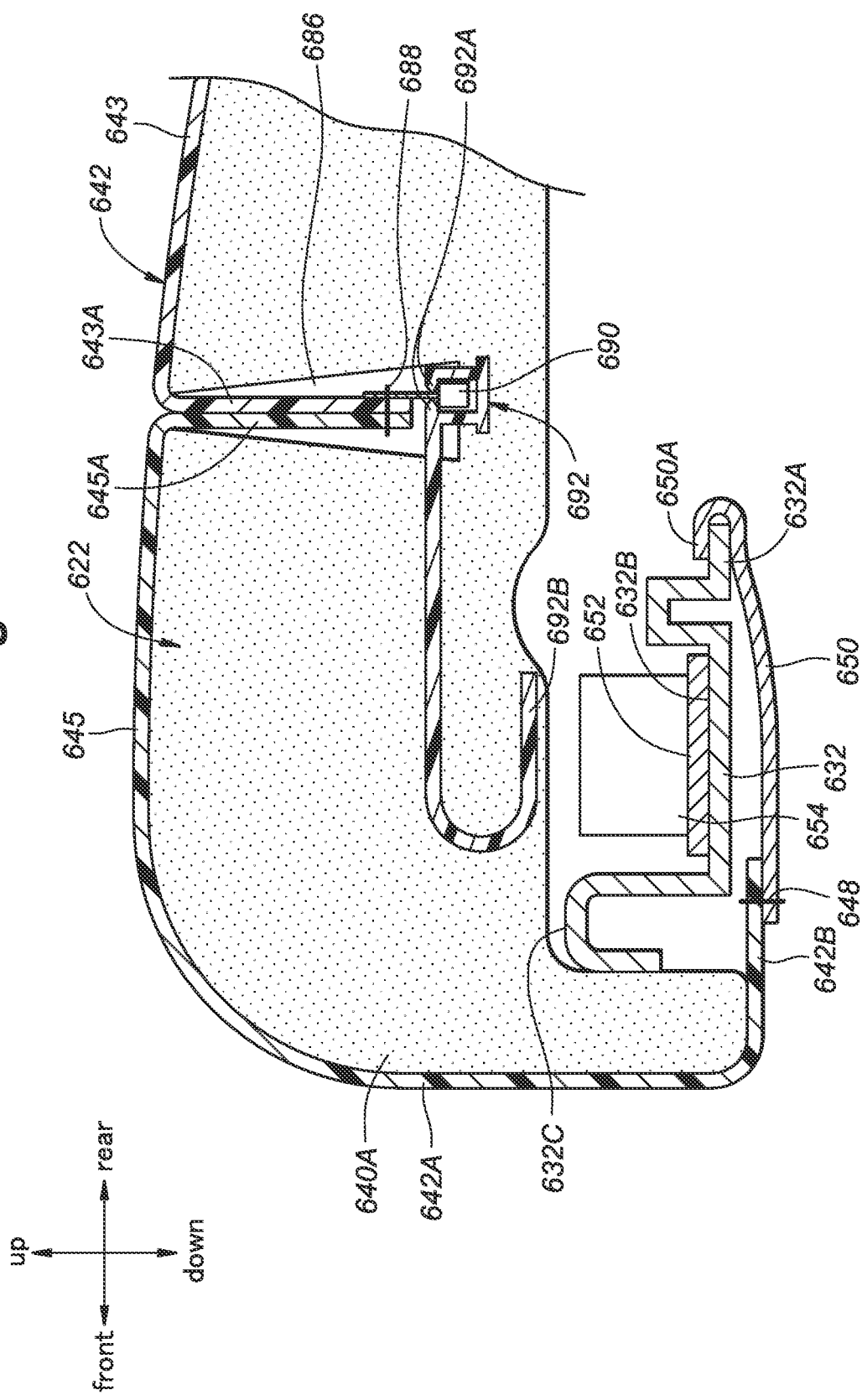

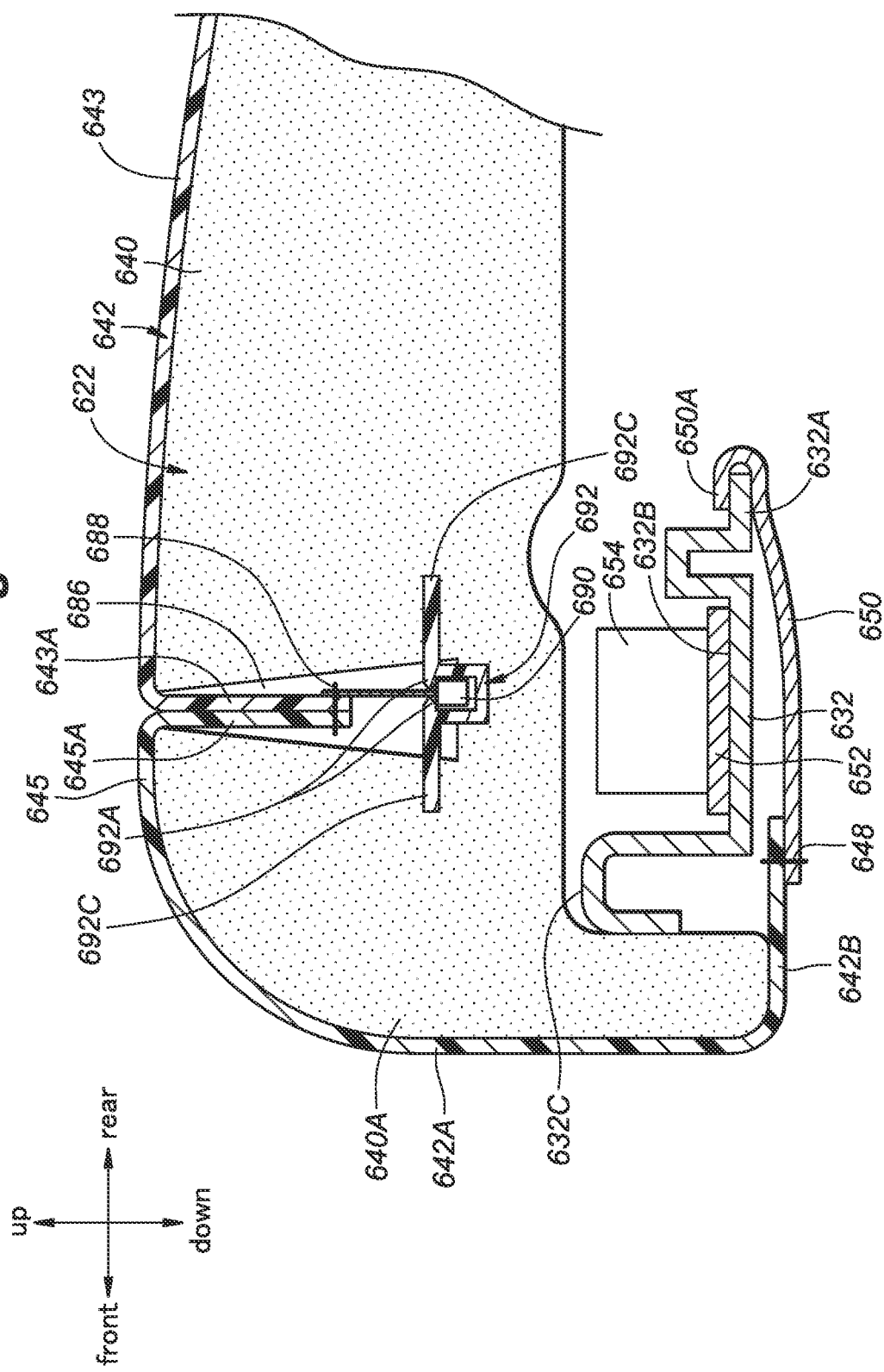

VEHICLE SEAT HAVING A HEATER AND A PLURALITY OF AIR CELLS, AND A METHOD FOR MANUFACTURING THE SAME

CROSS REFERENCE TO RELATED APPLICATIONS

This application is the U.S. National Stage entry of International Application No. PCT/JP2021/033918, filed on Sep. 15, 2021, which, in turn, claims priority to U.S. Provisional Patent Application No. 63/198,098, filed Sep. 29, 2020; Japanese Patent Application No. 2020-219011, filed on Dec. 28, 2020; Japanese Patent Application No. 2021-027636, filed on Feb. 24, 2021; and Japanese Patent Application No. 2021-031811, filed on Mar. 1, 2021; both of which are hereby incorporated herein by reference in their entireties for all purposes.

The present invention relates to a vehicle seat.

BACKGROUND ART

A vehicle seat incorporated with air cells that can be selectively inflated and deflated is known in the art (for example, Patent Document 1). In the vehicle seat disclosed in Patent Document 1, the air cells are provided on the surface side (the side on which the occupant is seated) of the pad member incorporated in the seat cushion or the seat back.

Each air cell is placed in a recess provided on the surface of the pad member. When the air cell is inflated, a slab covering the air cell and the skin member swells and expands upward so as to press a part of the occupant's body. As a result, the hip, back and thighs of the occupant can be massaged to relax or refresh the occupant.

PRIOR ART DOCUMENT(S)

Patent Document(s)

Patent Document 1: JP2018-47862A

SUMMARY OF THE INVENTION

Task to be Accomplished by the Invention

A vehicle is often fitted with an air conditioner that controls the temperature inside the vehicle. However, since the temperatures which the occupants find most comfortable may vary from one occupant to another, it is difficult to provide a temperature environment that is comfortable to every occupant.

In view of such a problem of the prior art, a primary object of the present invention is to provide a vehicle seat including a pad member and air cells positioned on the surface of the pad member and configured to be selectively inflated and deflated to provide a temperature condition that is agreeable to every occupant of the vehicle.

Means to Accomplish the Task

In order to solve such a problem of the prior art, a certain aspect of the present invention provides a vehicle seat (1, 101, 151), comprising at least one of a seat back (6) and a seat cushion (8) having a pad member (12) and a skin member (13) covering the pad member, wherein a heater (38) having a sheet configuration and a plurality of air cells (32) are provided between a surface side of the pad member and the skin member.

Thereby, a pressure can be applied to the occupant by inflating the air cells, and the skin member can be heated by activating the heater so that the vehicle seat on which an occupant is seated can be set to a temperature suitable for the particular occupant.

Preferably, in this vehicle seat, the heater is attached to a back side surface of the skin member, and the air cells are attached to a surface side surface of the pad member.

Thereby, the assembling process for the vehicle seat can be facilitated.

Preferably, in this vehicle seat, the heater and the air cells are positioned so as not to overlap each other in a surface side to back side direction.

Since the heater and the air cells do not overlap each other, the thickness of the vehicle seat can be minimized, and the vehicle seat can be made compact.

Preferably, in this vehicle seat, the heater is provided with a readily deformable portion (103, 160) that can be readily deformed when the air cells are inflated.

Since the heater can be deformed in conformity to the inflation of the air cells, the inflation of the air cells is not hindered by the heater.

Preferably, in this vehicle seat, the readily deformable portion includes a slit (102, 155) provided in the heater.

Thereby, the deformable portion can be easily created.

Preferably, in this vehicle seat, the slit overlaps with one of the air cells in the surface side to back side direction.

Since the readily deformable portion is located adjacent to the air cell, the heater can readily conform to the inflation of the air cells.

Preferably, in this vehicle seat, the heater includes a base cloth (68) with a sheet configuration and a heating wire (70) positioned along a surface of the base cloth, the slit being provided between adjacent segments of the heating wire.

Thereby, an excessive tensile load is prevented from being applied to the heating wire.

Preferably, in this vehicle seat, the heater includes a base cloth (68) with a sheet configuration and a heating wire (70) positioned along a surface of the base cloth, and the deformable portion includes a segment of the heating wire that extends while meandering in a first direction and is looped back in a second direction orthogonal to the first direction.

Thereby, the readily deformable portion of the heating wire can be made readily deformable in both the first direction and the second direction.

Preferably, in this vehicle seat, a part of the base cloth located in the readily deformable portion is provided with a slit (155) that does not overlap with the heating wire.

Thereby, an excessive tensile load is prevented from being applied to the heating wire.

Preferably, in this vehicle seat, the slit includes a first part extending in the first direction and a second part extending orthogonally to the first part.

Thereby, the base fabric is enabled to readily deform in conformity to the inflation of the air cells.

Further, a vehicle seat that is configured to blow air from the surface opposing the seated occupant is known (for example, JP2020-55394A). In such a vehicle seat, the seat cushion is internally provided with an air passage. When the blower blows air into the air passage, the air passes through the air passage and is blown out from the surface of the seat main body opposing the occupant. The inventors of the present application have conceived the idea of providing an air passage in a vehicle seat to inflate and deflate the air cells (fluid sealed member) to massage the occupant and control the posture of the occupant. The inventors of the present application have also noticed that when the air cells are inflated, the pad may be deformed causing the air cells to move toward the pad member with the result that the pressure from the air cells may not be applied to the occupant in the way the air cells are designed.

Therefore, there is a task with respect to a seat provided with a pad member and a fluid sealed member that can be selectively inflated and deflated to allow the pressure to be properly applied from the fluid sealed member to the occupant.

To achieve such an object, another aspect of the present invention provides a vehicle seat (201, 301, 401, 501), comprising a pad member (12) and a fluid sealed member (209) that can be selectively inflated and deflated, the vehicle seat further comprising a stiff member (218, 418) less deformable than the pad member and provided behind the fluid sealed member so that the stiff member reduces deformation of the pad member when the fluid sealed member is inflated by opposing a pressure applied by the fluid sealed member.

Thereby, the deformation of the pad member is reduced by the stiff member so that the load created by the inflation of the fluid sealed member is restricted from being transmitted to the pad member. As a result, the pressure from the fluid sealed member is more effectively applied to the occupant.

Preferably, in this vehicle seat, a passage (238, 338) passing through a back side of the fluid sealed member is provided, and the stiff member is provided with tubular shape defining at least a part of the passage.

Thus, when a load due to the inflation of the fluid sealed member is applied to the pad member, the stiff member opposes this load so that the deformation of the passage can be prevented.

Preferably, in this vehicle seat, the pad member includes a pad main body (216) forming a back side of the pad member, a passage forming piece (217) overlaid on the pad main body and provided with a slot (225) receiving the stiff member therein, and an upper part forming piece (219) overlaid on the passage forming piece, the stiff member and the passage forming piece being integrally molded to each other.

Thereby, the assembly of the vehicle seat is simplified.

Preferably, in this vehicle seat, the vehicle seat further comprises a passage forming member (317) in a sheet form provided with a passage (338) therein, and the stiff member (318) is provided between the pad member and the passage forming member.

Thereby, a passage can be easily formed in the vehicle seat.

Preferably, in this vehicle seat, the stiff member and the passage forming member are bonded to each other to jointly form an integral body.

Thereby, the assembling of the vehicle seat can be facilitated.

Preferably, in this vehicle seat, the pad member is provided with a passage passing through a back side of the fluid sealed member, and the stiff member (418) is interposed between the back side of the fluid sealed member and a surface side of the pad member, the stiff member having a greater lateral width than the fluid sealed member.

Since the passage passes through the back side of the fluid sealed member, the size of the vehicle seat can be reduced. Further, by supporting the fluid sealed member with the stiff member, the pressure applied to the pad member can be dispersed so that blockage of the passage due to a deformation of the pad member can be prevented.

Preferably, in this vehicle seat, the stiff member and the fluid sealed member have a rectangular shape in top view (in a front side to a back side view), and the stiff member is greater than the fluid sealed member in width as measured in a direction orthogonal to the lateral direction.

Thereby, the pressure applied to the pad member can be dispersed so that blockage of fluid in the passage can be prevented in a highly reliable manner.

Preferably, in this vehicle seat, an edge part of the stiff member is provided with a projecting wall (420) projecting away from a surface of the pad member.

Thereby, the fluid sealed member is prevented from moving when the fluid sealed member is being inflated.

Preferably, in this vehicle seat, the fluid sealed member includes a plurality of fluid sealed members, and the passage communicates adjoining ones the fluid sealed members with each other.

Thereby, the passage can gain access to a gap between the adjoining fluid sealed members in which air tends to stagnate.

It is known in the art to incorporate a submarining preventing mechanism in a seat device for vehicles such as automobiles for the purpose of preventing the submarine phenomenon in which the lower body of a seated occupant slides forward on the seat cushion when a large fore and aft acceleration is applied to the seat occupant of the seat device. The submarining preventing mechanism operates by causing an upward bulging deformation of a front part of the seat cushion by using an airbag device. See JP2005-193844A and JP2007-153030A, for instance.

The seat cushion includes a pad member made of polyurethane foam or the like, and a skin member consisting of a leather or a resin sheet covering the pad member. When the pad member is raised and deformed by the airbag device, the skin member is brought under tension, and tends to hinder the deformation of the pad member. This impairs the submarining preventing performance.

Thus, there is a technical task in achieving a required submarining preventing performance by preventing the skin member from hindering the bulging deformation of the pad member.

In view of such a problem of the prior art, the vehicle seat device (610) according to an embodiment of the present invention comprises a seat cushion (622) including a frame (610), a pad member (640) provided on the frame, and a skin member (642) covering the pad member, and an airbag device (654) provided on the frame to deform a front part of the pad member so as to be raised upward, wherein the skin member includes an extendable portion (646, 642C, 680A, 643A, 645A) that allows the pad member to be raised and deformed.

Thereby, the bulging deformation of the pad member is prevented from being hindered by the skin member, and the required submarining preventing performance can be obtained.

Preferably, in this vehicle seat device, the extendable portion includes a folded portion (646) of the skin member.

Thereby, the extendable portion can be created with a simple configuration.

Preferably, in this vehicle seat device, the extendable portion includes a joint portion (682) which is formed by joining overlapping portions (642C, 680A) of the skin member so as to be ruptured when the airbag device is deployed.

Thereby, the extendable portion can be created with a simple configuration.

Preferably, in this vehicle seat device, the extendable portion includes a first joint portion (682) which is formed by joining overlapping portions (642C, 680A) of the skin member so as to be ruptured when the airbag device is deployed, and a second joint portion (684) which is located on a terminal edge side of the first joint portion, and formed by joining overlapping portions of the skin member so as to be ruptured when the airbag device is deployed.

Thereby, the extendable portion can be created with a simple configuration.

Preferably, in this vehicle seat device, the joint portion includes a sewn portion.

Thereby, the joint portion can be obtained as a highly reliable one.

Preferably, in this vehicle seat device, the extendable portion includes an anchor member (690) that resiliently grips two overlapping ends (643A, 645A) of the skin member, the anchor member being configured to release the overlapping ends when the airbag device is deployed.

Thereby, the extendable portion can be easily formed by utilizing a retaining structure for the skin member.

Preferably, in this vehicle seat device, the clip forms a retaining structure for the skin member.

Thereby, the retaining structure for the skin member can be utilized conveniently for the extendable portion.

Preferably, in this vehicle seat device, the pad member is provided with a groove (641) extending laterally on the upper surface at a position corresponding to the airbag device in the fore and aft direction.

Thereby, the bulging deformation of the pad member by the airbag device can be facilitated.

Preferably, in this vehicle seat device, the pad member is provided with a laterally extending groove (641) on a lower surface of the pad member at a position corresponding to the airbag device in the fore and aft direction.

Thereby, the bulging deformation of the pad member by the airbag device is facilitated.

Preferably, this vehicle seat device further includes a wire harness (658) extending through a region located between the frame and the seat cushion, and connected to the airbag device, and a cover member (660) fixed to the frame and covering the wire harness.

Thereby, the wire harness is protected from breakage.

Effect of the Invention

A certain aspect of the present invention provides a vehicle seat, comprising at least one of a seat back and a seat cushion having a pad member and a skin member covering the pad member, wherein a heater having a sheet configuration and a plurality of air cells are provided between a surface side of the pad member and the skin member. Thereby, a pressure can be applied to the occupant by inflating the air cells, and the skin member can be heated by activating the heater so that the vehicle seat on which an occupant is seated can be set to a temperature suitable for the particular occupant.

Preferably, in this vehicle seat, the heater is attached to the back surface of the skin member, and the air cells are attached to the surface of the pad member. Thereby, the assembling process for the vehicle seat can be facilitated.

Preferably, in this vehicle seat, the heater and the air cells are positioned so as not to overlap each other in a surface side to back side direction. Since the heater and the air cells do not overlap each other, the thickness of the vehicle seat can be minimized, and the vehicle seat can be made compact.

Preferably, in this vehicle seat, the heater is provided with a readily deformable portion that can be readily deformed when the air cells are inflated. Since the heater can be deformed in conformity to the inflation of the air cells, the inflation of the air cells is not hindered by the heater.

Preferably, in this vehicle seat, the readily deformable portion includes a slit (102, 155) provided in the heater. Thereby, the deformable portion can be easily created.

Preferably, in this vehicle seat, the slit overlaps with one of the air cells in a surface side to back side direction. Since the readily deformable portion is located adjacent to the air cell, the heater can readily conform to the inflation of the air cells.

Preferably, in this vehicle seat, the heater includes a base cloth with a sheet configuration and a heating wire positioned along the surface of the base cloth, the slit being provided between adjacent segments of the heating wire. Thereby, an excessive tensile load is prevented from being applied to the heating wire.

Preferably, in this vehicle seat, the heater includes a base cloth with a sheet configuration and a heating wire positioned along the surface of the base cloth, and the deformable portion includes a segment of the heating wire that extends while meandering in a first direction and is looped back in a second direction orthogonal to the first direction. Thereby, the readily deformable portion of the heating wire can be made readily deformable in both the first direction and the second direction.

Preferably, in this vehicle seat, a part of the base cloth located in the readily deformable portion is provided with a slit that does not overlap with the heating wire. Thereby, an excessive tensile load is prevented from being applied to the heating wire.

Preferably, in this vehicle seat, the slit includes a first part extending in the first direction and a second part extending orthogonally to the first part. Thereby, the base fabric is enabled to readily deform in conformity to the inflation of the air cells.

In order to achieve a task with respect to a seat provided with a pad member and a fluid sealed member that can be selectively inflated and deflated to allow the pressure to be properly applied from the fluid sealed member to the occupant, another aspect of the present invention provides a vehicle seat, comprising a pad member and a fluid sealed member that can be selectively inflated and deflated, the vehicle seat further comprising a stiff member less deformable than the pad member and provided behind the fluid sealed member so that the stiff member reduces deformation of the pad member when the fluid sealed member is inflated by opposing a pressure applied by the fluid sealed member. Thereby, the deformation of the pad member is reduced by the stiff member so that the load created by the inflation of the fluid sealed member is restricted from being transmitted to the pad member. As a result, the pressure from the fluid sealed member is more effectively applied to the occupant.

Preferably, in this vehicle seat, a passage passing through a back side of the fluid sealed member is provided, and the stiff member is provided with tubular shape defining at least a part of the passage. Thus, when a load due to the inflation of the fluid sealed member is applied to the pad member, the stiff member opposes this load so that the deformation of the passage can be prevented.

Preferably, in this vehicle seat, the pad member includes a pad main body (216) forming a back side of the pad member, a passage forming piece overlaid on the pad main body and provided with a slot receiving the stiff member therein, and an upper part forming piece overlaid on the passage forming piece, the stiff member and the passage forming piece being integrally molded to each other. Thereby, the assembly of the vehicle seat is simplified.

Preferably, in this vehicle seat, the vehicle seat further comprises a passage forming member in a sheet form provided with a passage therein, and the stiff member is provided between the pad member and the passage forming member. Thereby, a passage can be easily formed in the vehicle seat.

Preferably, in this vehicle seat, the stiff member and the passage forming member are bonded to each other to jointly form an integral body. Thereby, the assembling of the vehicle seat can be facilitated.

Preferably, in this vehicle seat, the pad member is provided with a passage passing through a back side of the fluid sealed member, and the stiff member is interposed between the back side of the fluid sealed member and a surface side of the pad member, the stiff member having a greater lateral width than the fluid sealed member. Since the passage passes through the back side of the fluid sealed member, the size of the vehicle seat can be reduced. Further, by supporting the fluid sealed member with the stiff member, the pressure applied to the pad member can be dispersed so that blockage of the passage due to a deformation of the pad member can be prevented.

Preferably, in this vehicle seat, the stiff member and the fluid sealed member have a rectangular shape in top view (in a front side to a back side view), and the stiff member is greater than the fluid sealed member in width as measured in a direction orthogonal to the lateral direction. Thereby, the pressure applied to the pad member can be dispersed so that blockage of fluid in the passage can be prevented in a highly reliable manner.

Preferably, in this vehicle seat, an edge part of the stiff member is provided with a projecting wall projecting away from a surface of the pad member. Thereby, the fluid sealed member is prevented from moving when the fluid sealed member is being inflated.

Preferably, in this vehicle seat, the fluid sealed member includes a plurality of fluid sealed members, and the passage communicates adjoining ones the fluid sealed members with each other. Thereby, the passage can gain access to a gap between the adjoining fluid sealed members in which air tends to stagnate.

In order to achieve a technical task in achieving a required submarining preventing performance by preventing the skin member from hindering the bulging deformation of the pad member, an aspect of the present invention provides a vehicle seat device according to an embodiment of the present invention comprises a seat cushion including a frame, a pad member provided on the frame, and a skin member covering the pad member, and an airbag device provided on the frame to deform a front part of the pad member so as to be raised upward, wherein the skin member includes an extendable portion that allows the pad member to be raised and deformed. Thereby, the bulging deformation of the pad member is prevented from being hindered by the skin member, and the required submarining preventing performance can be obtained.

Preferably, in this vehicle seat device, the extendable portion includes a folded portion of the skin member. Thereby, the extendable portion can be created with a simple configuration.

Preferably, in this vehicle seat device, the extendable portion includes a joint portion which is formed by joining overlapping portions of the skin member so as to be ruptured when the airbag device is deployed. Thereby, the extendable portion can be created with a simple configuration.

Preferably, in this vehicle seat device, the extendable portion includes a first joint portion which is formed by joining overlapping portions of the skin member so as to be ruptured when the airbag device is deployed, and a second joint portion which is located on a terminal edge side of the first joint portion, and formed by joining overlapping portions of the skin member so as to be ruptured when the airbag device is deployed. Thereby, the extendable portion can be created with a simple configuration.

Preferably, in this vehicle seat device, the joint portion includes a sewn portion. Thereby, the joint portion can be obtained as a highly reliable one.

Preferably, in this vehicle seat device, the extendable portion includes an anchor member that resiliently grips two overlapping ends of the skin member, the anchor member being configured to release the overlapping ends when the airbag device is deployed. Thereby, the extendable portion can be easily formed by utilizing a retaining structure for the skin member.

Preferably, in this vehicle seat device, the clip forms a retaining structure for the skin member. Thereby, the retaining structure for the skin member can be utilized conveniently for the extendable portion.

Preferably, in this vehicle seat device, the pad member is provided with a groove extending laterally on the upper surface at a position corresponding to the airbag device in the fore and aft direction. Thereby, the bulging deformation of the pad member by the airbag device can be facilitated.

Preferably, in this vehicle seat device, the pad member is provided with a laterally extending groove on a lower surface of the pad member at a position corresponding to the airbag device in the fore and aft direction. Thereby, the bulging deformation of the pad member by the airbag device is facilitated.

Preferably, this vehicle seat device further includes a wire harness extending through a region located between the frame and the seat cushion, and connected to the airbag device, and a cover member fixed to the frame and covering the wire harness. Thereby, the wire harness is protected from breakage.

BRIEF DESCRIPTION OF THE DRAWING

FIGS. 13A and 13B are sectional views taken along line XIII-XIII of FIG. 11;

FIG. 14 is a sectional view taken along line XIV-XIV of FIG. 11;

FIGS. 17A and 17B are cross sectional views of a seat cushion of a vehicle seat according to a fifth embodiment of the present invention;

FIGS. 19A and 19B are cross sectional views of a seat cushion of a vehicle seat according to a sixth embodiment of the present invention;

FIG. 24 is an enlarged fragmentary perspective view of the vehicle seat of the eighth embodiment showing the front pan and the air back device;

FIG. 26 is an enlarged fragmentary sectional view of a vehicle seat according to a ninth embodiment of the present invention;

FIG. 27 is an enlarged fragmentary sectional view of the vehicle seat of a tenth embodiment of the present invention showing the positioning of a wire harness;

FIG. 28 is an enlarged fragmentary sectional view of a vehicle seat according to an eleventh embodiment of the present invention;

DESCRIPTION OF THE PREFERRED EMBODIMENT(S)

Hereinafter, embodiments of the present invention as applied to a seat, in particular to a vehicle seat configured to be mounted on a vehicle, will be described in the following with reference to the appended drawings. In the following disclosure, various directions will be defined with respect to the vehicle on which the vehicle seat is mounted.

First Embodiment

Figure 1:
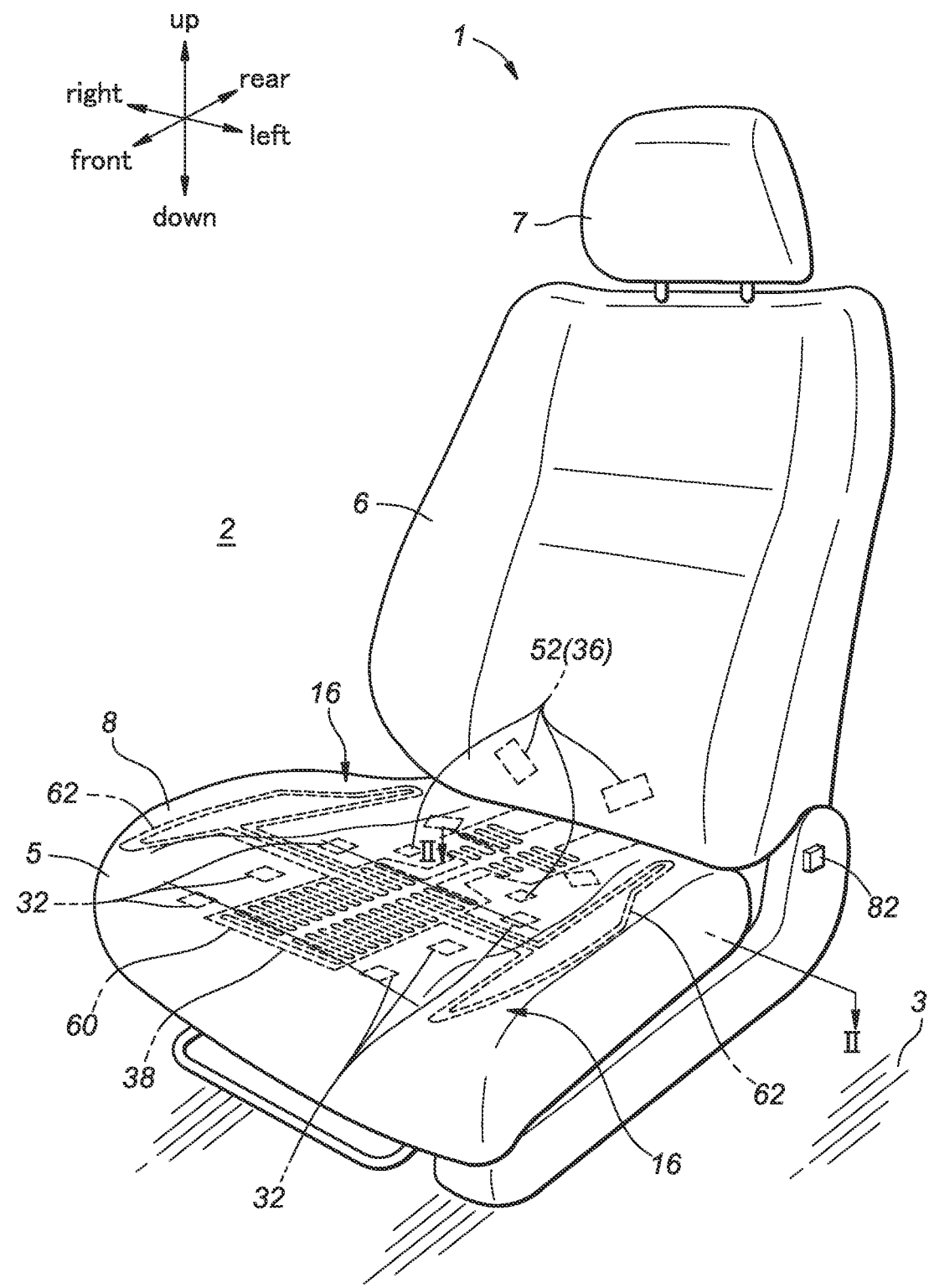
FIG. 1 is a perspective view of a vehicle seat according to a first embodiment of the present invention.

As shown in FIG. 1, the vehicle seat 1 is mounted on a floor 3 defining the bottom end of a vehicle cabin 2 so as to face the front of the vehicle. In the present embodiment, the vehicle seat 1 consists of a passenger seat positioned laterally next to the driver's seat.

The vehicle seat 1 includes a seat cushion 5 attached to the floor 3, a seat back 6 connected to a rear part of the seat cushion 5, and a headrest 7 provided on the upper end of the seat back 6. The seat cushion 5 defines a seating surface 8 on the upper surface thereof that supports the buttocks and thighs of the seated occupant. The seat back 6 is positioned behind the hip and back of the seated occupant, and the headrest 7 is positioned behind the head of the seated occupant.

The seat cushion 5 includes a cushion frame 11 supported by the vehicle body and so as to form the structural framework of the seat cushion 5, a pad member 12 supported by the cushion frame 11, and a skin member 13 that covers the surface of the pad member 12.

Figure 2:
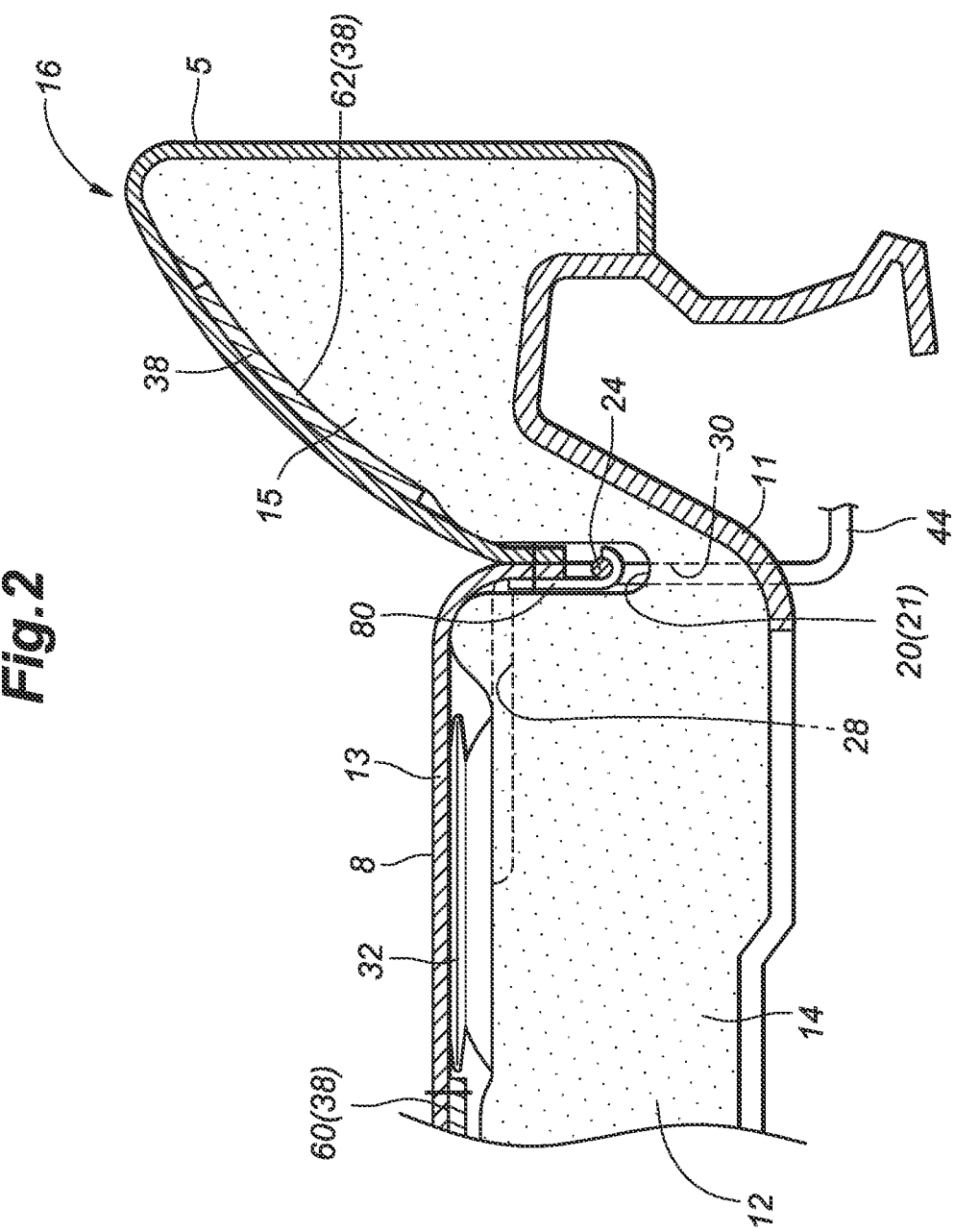
FIG. 2 is a sectional view taken along line II-II of FIG. 1.

The pad member 12 is made of a foamed resin such as urethane foam. As shown in FIG. 2, the pad member 12 is supported by the cushion frame 11 at the lower surface thereof.

Figure 3:
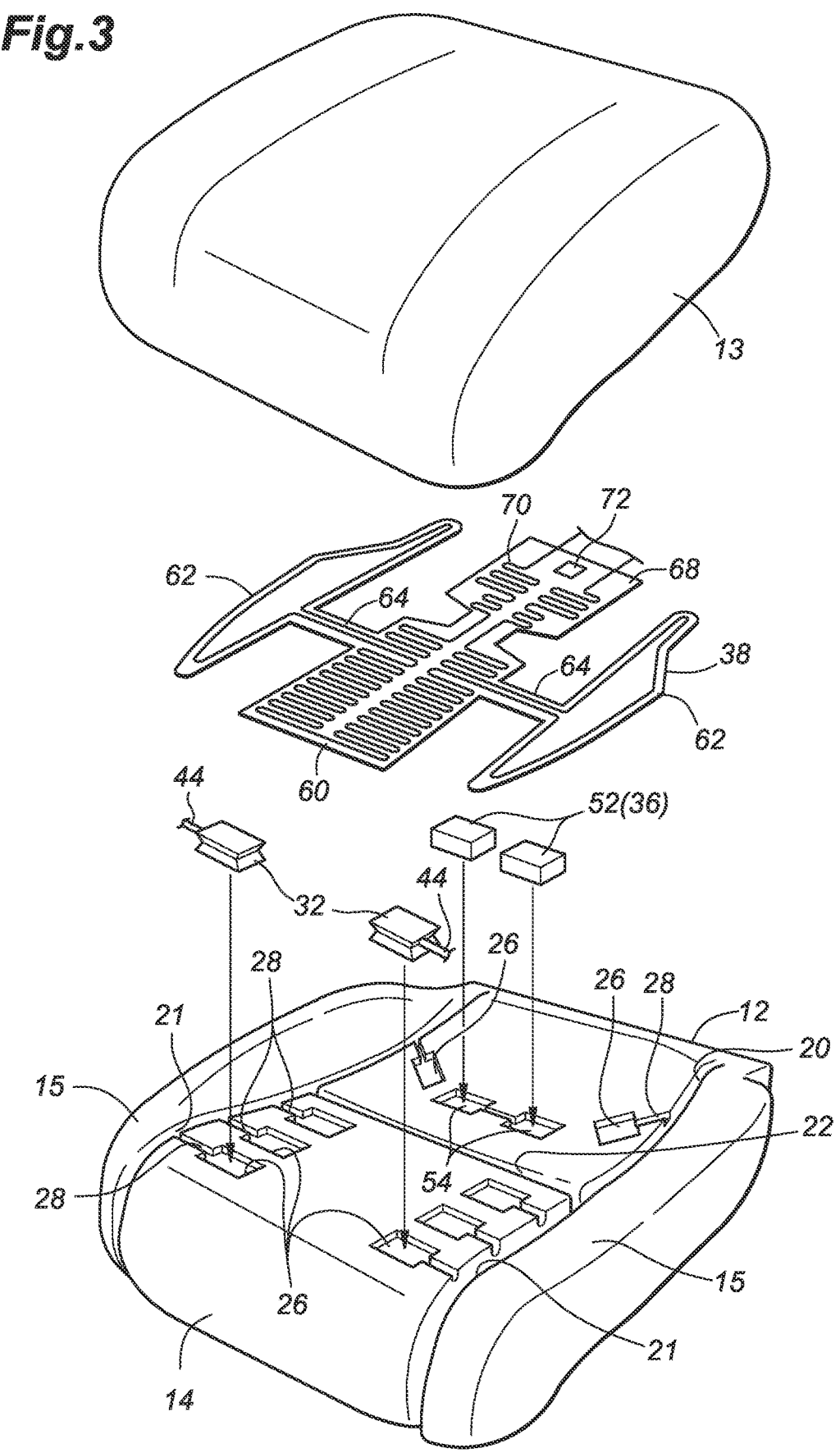
FIG. 3 is an exploded perspective view of the vehicle seat of the first embodiment.

As shown in FIG. 3, the pad member 12 includes a pad central part 14 forming a laterally central part thereof, and a pair of pad side parts 15 connected to either side of the pad central part 14. The pad side parts 15 are thus positioned on either side of the seat cushion 5, and form a pair of raised parts 16 (see FIGS. 1 and 2) that rise upward with respect to the pad central part 14.

Figure 4:
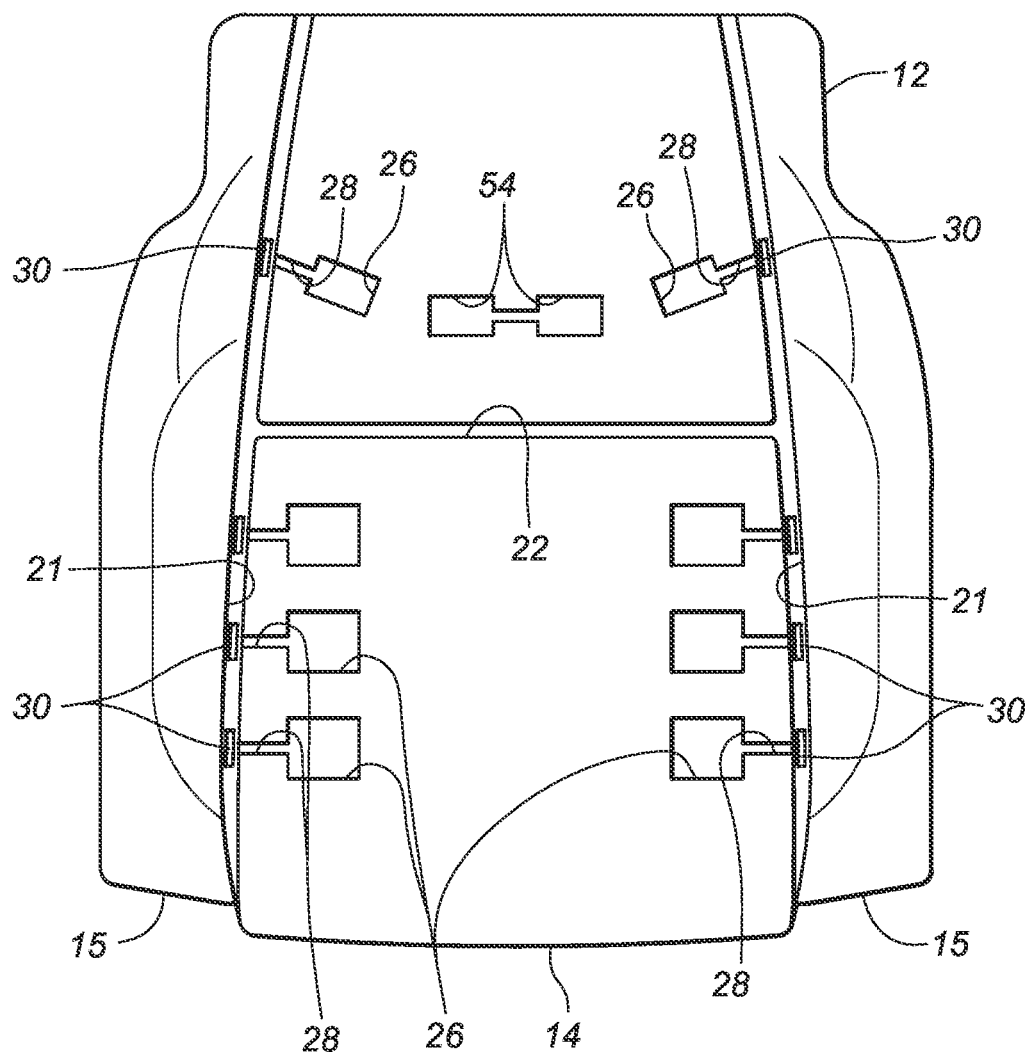
FIG. 4 is a top view of the pad member of the vehicle seat of the first embodiment.

As shown in FIG. 2, the upper surface of the pad member 12 is provided with a retaining groove 20 which is recessed downward. As shown in FIG. 4, the retaining groove 20 includes a pair of longitudinal segments 21 extending in the fore and aft direction between the pad central part 14 and the pad side parts 15, and a lateral segment 22 extending laterally between central parts of the left and right longitudinal segments 21 so that the retaining groove 20 is shaped like the letter H in top view. As shown in FIG. 2, the longitudinal segments 21 and the lateral segments 22 of the retaining groove 20 are each internally fitted with a wire 24 for hooking selected parts of the skin member 13 thereto.

As shown in FIGS. 3 and 4, the upper surface of the pad central part 14 is provided with a plurality of recesses 26 which are recessed downward and each have a rectangular shape in top view. As shown in FIG. 3, the recesses 26 are located between the left and right longitudinal segments 21.

The recesses 26 are located on the front side of the lateral segment 22 of the retaining groove 20 in two longitudinal rows which are laterally spaced apart from each other. The recesses 26 that are located on the front side of the lateral segment 22 generally correspond in position to the thighs of the seated occupant. In the present embodiment, an additional pair of recesses 26 are provided in the part of the upper surface of the pad member 12 on the rear side of the lateral segment 22. The recesses 26 that are positioned on the rear side of the lateral segment 22 correspond in position to the buttocks of the seated occupant.

As shown in FIG. 4, the upper surface of the pad member 12 is provided with a plurality of communication grooves 28 extending laterally between the respective recesses 26 and the longitudinal segments 21 that laterally outwardly adjoin the corresponding recesses 26. A through hole 30 is passed through the pad member 12 at the junction between the outer end of each communication groove 29 and the corresponding longitudinal segment 21.

Figure 5:
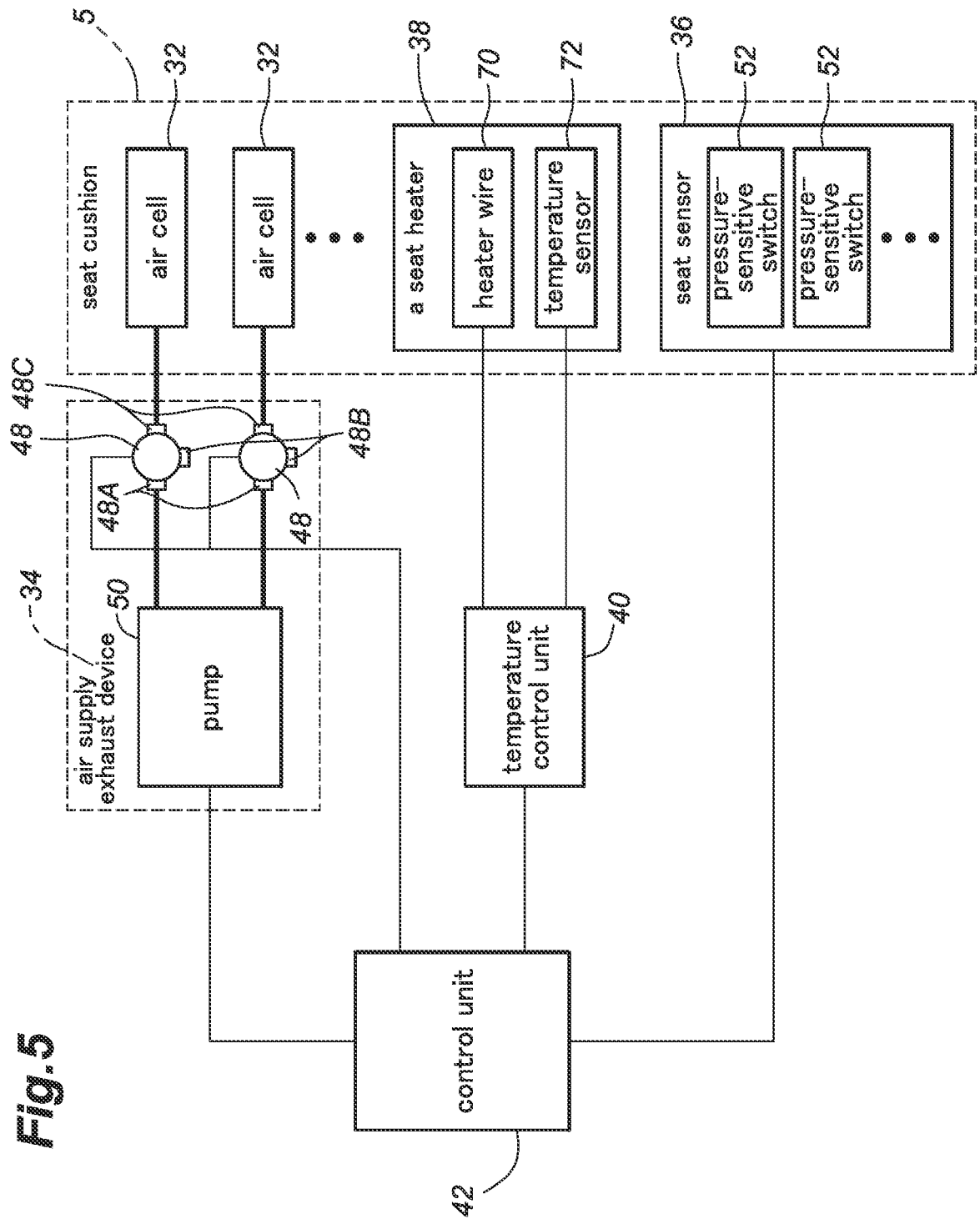
FIG. 5 is a block diagram of the vehicle seat of the first embodiment.

As shown in FIG. 5, the vehicle seat 1 includes a plurality of air cells 32, an air supply/exhaust device 34 for supplying/exhausting air to and from the air cells 32, a seating sensor 36, a seat heater 38, and a temperature control unit 40 for controlling the seat heater 38, and a control unit 42 for controlling the air supply/exhaust device 34 and the temperature control unit 40.

Each air cell 32 consists of a bag-shaped member, and is made of a stretchable material such as a rubber material. As shown in FIG. 2, the air cells 32 are incorporated in the seat cushion 5 each received in the corresponding recess 26 and attached to the surface of the pad member 12. A flexible tubing 44 is connected to each air cell 32. The tubing 44 is passed from the inside of the respective recesses 26 to the bottom side of the pad member 12 through the corresponding communication grooves 28 and though holes 30 in that order.

The air supply/exhaust device 34 is configured to supply/exhaust air into and out of the air cells 32 according to a control signal from the control unit 42 by inflating/deflating the air cells 32. As shown in FIG. 5, the air supply/exhaust device 34 includes solenoid valves 48 and a pump 50, and is connected to the air cells 32 via tubing 44.

The solenoid valves 48 each consist of a three-way valve provided with an intake port 48A, an exhaust port 48B, and a common port 48C. The intake port 48A of each solenoid valve 48 is connected to the pump 50, and the exhaust port 48B is open to the atmosphere. The common port 48C is connected to the tubing 44. The solenoid valve 48 switches between an intake position where the common port 48C is connected to the intake port 48A, and an exhaust position where the common port 48C is connected to the exhaust port 48B according to the control signal from the control unit 42. When the solenoid valve 48 is in the intake position, air is pumped from the pump 50 and inflates the corresponding air cell 32. When the solenoid valve 48 is in the exhaust position, the air in the corresponding air cell 32 is discharged via the tubing 44 under the pressure from the weight of the occupant, and the air cell 32 deflates.

The seating sensors 36 are configured to detect the seating of an occupant on the vehicle seat 1, and includes a plurality of pressure-sensitive switches 52.

Each pressure-sensitive switch 52 consists of a membrane switch that includes a frame-shaped spacer sheet, a pair of contact sheets laminated on either side of the frame-shaped spacer sheet in mutually spaced apart relationship, and a pair of electric contacts provided on the mutually opposing surfaces of the contact sheets. When a load is applied to either one of the contact sheets, the load causes the contact sheets to come closer to each other with the result that the two electric contacts come into contact with each other to be in a conductive state, or to produce a turned on state. The level of pressure at which the electrical contacts come into contact with each other can be changed by adjusting the size and thickness of the contact sheets, the thickness and shape of the spacer sheet, the stiffness of the contact sheet, and the like. The pressure-sensitive switch 52 may have any configuration as long as it is a switch that establishes an electric conductivity upon detecting pressure.

In the present embodiment, as shown in FIG. 1, two of the pressure-sensitive switches 52 are provided in a rear part of the seating surface 8 of the seat cushion 5 and the remaining two of the pressure-sensitive switches 52 are provided in a lower front part of the seat back 6.

Preferably, the pad members 12 of the seat cushion 5 and the seat back 6 are provided with switch recesses 54 for receiving the pressure-sensitive switches 52 therein. Two of the switch recesses 54 are provided in a rear part of the seat cushion 5 and the remaining two of the switch recesses 54 are provided in a lower front part of the seat back 6 so as to form a pair on the left and right in each instance (see FIGS. 3 and 4). Preferably, the pressure-sensitive switches 52 are received in the respective switch recesses 54 such that the surface of the contact sheet of each pressure-sensitive switch 52 is flush with the surface of the pad member 12. As a result, the presence of the pressure-sensitive switches 52 is prevented from causing discomfort to the seated occupant.

The seat heater 38 is formed by a planar heating element or a sheet-shaped heating element provided inside the seat cushion 5. The heat generated from the seat heater 38 warms the seating surface 8 of the seat cushion 5.

Figure 6:
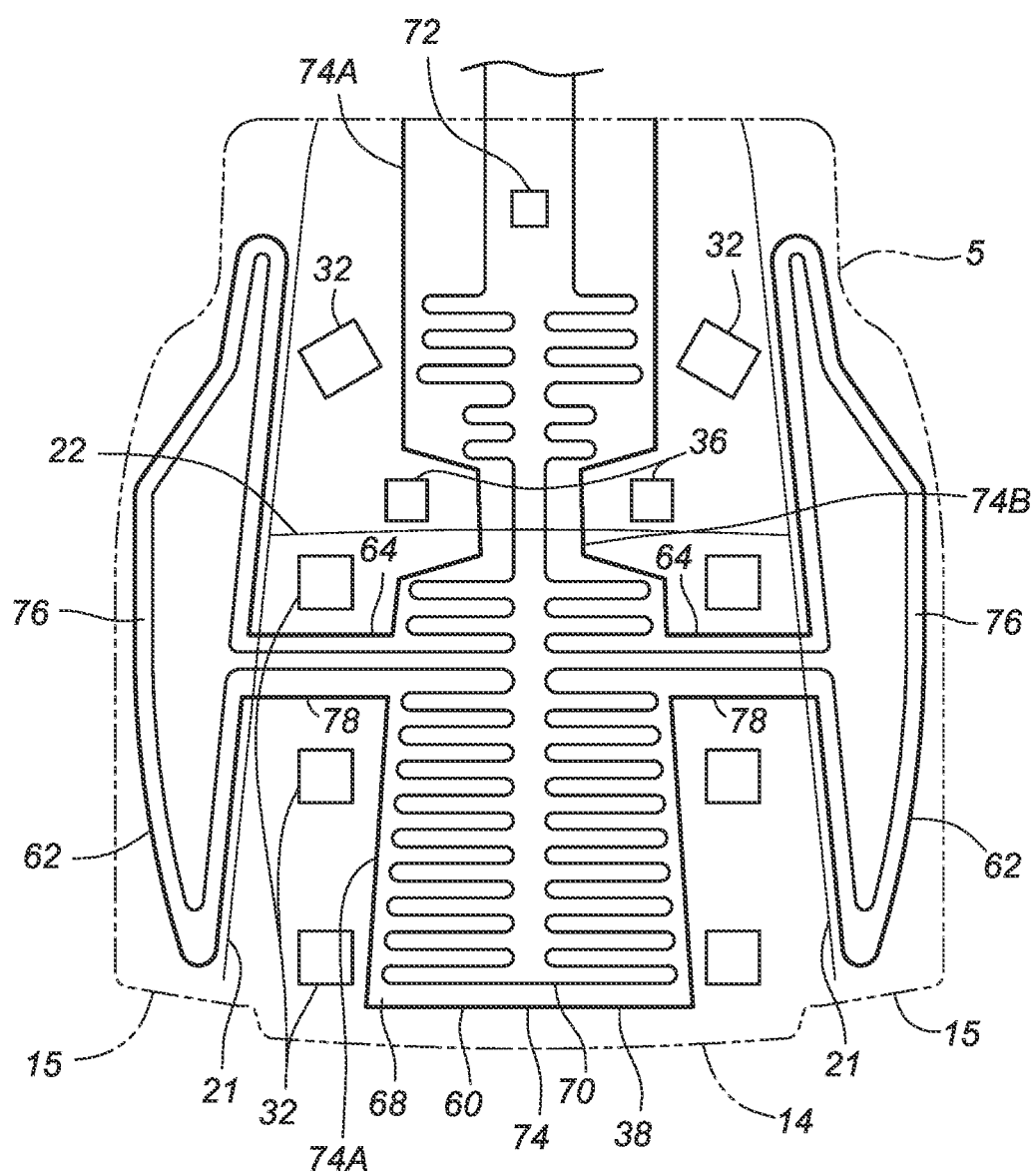
FIG. 6 is a top view of the vehicle seat of the first embodiment showing a seat heater along with the positioning thereof.

As shown in FIG. 6, the seat heater 38 includes a rectangular heater central part 60 positioned on the upper surface of the pad central part 14 and a pair of heater side parts 62 positioned on the left and right pad side parts 15, respectively. A heater lateral connecting part 64 connects each heater side part 62 to the heater central part 60.

The seat heater 38 includes a base cloth 68, a heating wire 70, and a temperature sensor 72.

The base cloth 68 is in a sheet form. In the present embodiment, the base cloth 68 is made of a non-woven fabric formed by entangling fibers with one another. The base cloth 68 includes a base cloth central part 74 positioned over the pad central part 14 to form the heater central part 60, a pair of base cloth side parts 76 positioned over the respective pad side parts 15 to form the heater side parts 62, and a pair of base cloth lateral connecting parts 78 connecting the base cloth central part 74 to the respective base cloth side parts 76. The base cloth central part 74 includes a front base cloth main part 74A, a rear base cloth main part 74A and a base cloth longitudinal connecting part 74B extending in the fore and aft direction to connect the two base cloth main parts 74A to each other. The base cloth side parts 76 are located on either side of the base cloth central part 74, and the base cloth lateral connecting parts 78 extend laterally to connect the front base cloth main part 74A and to the respective base cloth side parts 76.

The base cloth central part 74 extends in the fore and aft direction in a region located between the left and right air cells 32. The base cloth main part 74A and the base cloth longitudinal connecting parts 74B each have a substantially rectangular shape. The lateral width of the base cloth longitudinal connecting part 74B is smaller than that of the base cloth main parts 74A. The longitudinal width of the lateral connecting parts 78 is smaller than those of the base cloth central part 74 and the left and right base cloth side parts 76, and the base cloth lateral connecting parts 78 extend in a region located between the air cells 32.

The heating wire 70 (also referred to as a heat wire) is made of a material (for example, a metal wire or film) that generates heat when an electric current is conducted therethrough. The heating wire 70 is attached to the surface of the base cloth 68. The heating wire 70 extends forward from a rear end part of the heater central part 60 in a meandering fashion, passes through the left and right side parts, and loops back to a rear end part of the heater central part 60. The heating wire 70 passes through regions located between the air cells 32, but does not pass through the air cells 32. The two ends of the heating wire 70 are connected to the temperature control unit 40.

The temperature sensor 72 consists of a thermocouple. In this embodiment, the temperature sensor 72 is positioned at an appropriate part in the central part 60 of the heating wire 70. The temperature sensor 72 is connected to the temperature control unit 40 similarly as the heating wire 70.

Upon receiving a control signal from the control unit 42, the temperature control unit 40 controls the seat heater 38 so that the temperature becomes equal to a predetermined temperature corresponding to the control signal received from the control unit 42. In the present embodiment, when the temperature acquired by the temperature sensor 72 is equal to or lower than the temperature corresponding to the control signal received from the control unit 42, the temperature control unit 40 energizes the heating wire 70 to raise the temperature of the seat heater 38. When the temperature corresponding to the control signal is exceeded, the energization of the heating wire 70 is stopped.

The skin member 13 is in the form of a sheet that covers the pad member 12, the air cells 32, the seating sensor 36, and the seat heater 38 from above, and provides the ornamental surface of the seat cushion 5. The skin member 13 is preferably made of a stretchable cloth material that expands and contracts to accommodate the inflation of the air cells 32. Further, the skin member 13 may be formed by sewing a plurality of cloth pieces together.

As shown in FIG. 2, appropriate positions of the skin member 13 are fitted with hooks 80 that are hooked onto a wire 24 provided in the longitudinal segments 21 and the lateral segment 22 of the retaining groove 20 to secure the skin member 13 to the pad member 12.

The seat heater 38 is attached to the back surface of the skin member 13. In the present embodiment, the seat heater 38 is sewn to the back surface of the skin member 13 at the edge part thereof to be secured to the back surface of the skin member 13. As a result, the seat heater 38 is hooked to the wire 24 via the skin member 13.

Further, preferably, the base cloth longitudinal connecting part 74B is hooked onto the part of the wire 24 located in the lateral segment 22 of the retaining groove 20. Preferably, the base cloth lateral connecting parts 78 are hooked onto the parts of the wire 24 located in the longitudinal segments 21 of the retaining groove 20. By hooking the base cloth longitudinal connecting part 74B and the base cloth lateral connecting parts 78 to the wire 24, the seat heater 38 can be particularly firmly attached to the pad member 12.

The control unit 42 (ECU) is composed of a microcomputer including a central processing unit (CPU), RAM, ROM, a storage device, and the like. The vehicle seat 1 is provided with an input unit 82 that accepts an instruction to activate and deactivate the air cells 32 from the occupant, and an instruction to activate and deactivate the seat heater 38 from the occupant.

The control unit 42 is connected to the input unit 82. When an input corresponding to a drive instruction for the air cells 32 is made to the input unit 82, and the seating sensor 36 detects the seating of an occupant (more specifically, all the pressure-sensitive switches 52 are turned on), the control unit 42 activates the pump 50, and switches the solenoid valves 48 between the intake position and the exhaust position at predetermined time intervals. When the solenoid valves 48 are in the intake position, the air pumped from the pump 50 flows into the tubing 44. As a result, the air cells 32 are inflated, and the parts of the seating surface 8 corresponding to the air cells 32 expand. When the solenoid valves 48 are in the exhaust position, the air inside the air cells 32 is discharged from the exhaust ports 48B through the tubing 44, and the air cells 32 are deflated. As a result, the air cells 32 are repeatedly inflated and deflated in an intermittent manner. When the input unit 82 receives an input corresponding to a stop instruction, the control unit 42 stops the pump 50 and sets the solenoid valves 48 to the exhaust position. As a result, the air inside the air cells 32 is discharged from the exhaust ports 48B, and the air cells 32 are deflated.

When the input unit 82 receives an input corresponding to a drive instruction for the seat heater 38, and the seating sensor 36 detects that the occupant is seated, the control unit 42 causes the temperature control unit 40 to activate the seat heater 38 to bring the seat heater 38 to a predetermined temperature. In the present embodiment, the control unit 42 receives a drive instruction and a temperature setting (for example, HIGH, LOW, etc.) of the seating surface 8 desired by the occupant from the input unit 82, and the control unit 42 forwards a control signal indicating the temperature of the seating surface 8 desired by the occupant to the temperature control unit 40, which in turn controls the seat heater 38 to be at the temperature corresponding to the temperature setting.

Next, the effect of the vehicle seat 1 configured in this way will be discussed in the following. When the occupant makes an input corresponding to the drive instruction (inflation instruction) to the air cells 32 to the input unit 82, the resulting inflation of the air cells 32 causes the skin member 13 to swell so that a pressure is applied to the thighs of the occupant. The occupant's thighs are thereby massaged, and the occupant can relax or be refreshed.

Further, when the occupant makes an input corresponding to the drive instruction of the seat heater 38 to the input unit 82, the seat heater 38 is activated with the result that the upper surface of the seat cushion 5 (or, the seating surface 8) is warmed, and the surface temperature of the seat cushion 5 rises. In this way, the surface temperature of the seat cushion 5 can be raised by the occupant making a suitable input to the input unit 82. Therefore, the seating surface 8 of the vehicle seat 1 on which the occupant is seated can be set to a temperature that suits the desire of the occupant.

In the present embodiment, as shown in FIG. 6, the heater central part 60 extends through a region located between the left and right air cells 32, and the left and right heater side parts 62 are located on the left and right outer sides of the left and right air cells 32, respectively. Further, the heater lateral connecting part 64 passes through regions located between the air cells 32. As a result, as shown in FIG. 6, the seat heater 38 and the air cells 32 are located so as not to overlap each other in top view.

Figure 7:
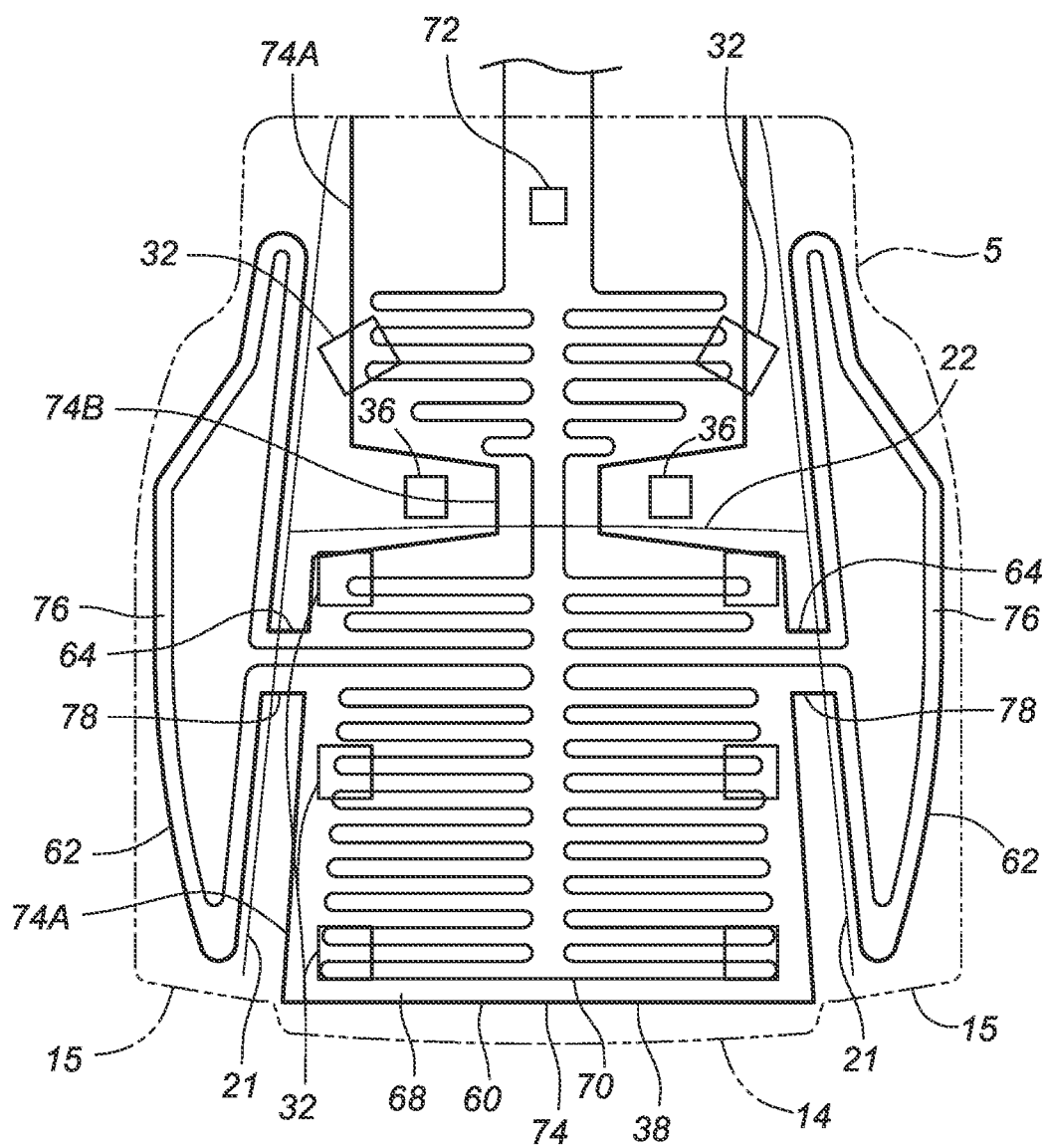
FIG. 7 is a top view of a vehicle seat modified from that of the first embodiment showing a seat heater along with the positioning thereof.

As shown in FIG. 7, even when a part of the seat heater 38 overlaps with the air cells 32 in top view (as view in the surface side—reverse side direction), the drive instruction of the seat heater 38 entered from the input unit 82 by the occupant causes the seating surface 8 to be warmed up so that a temperature environment suitable for the occupant seated on the vehicle seat 1 can be provided.

Figure 8A:
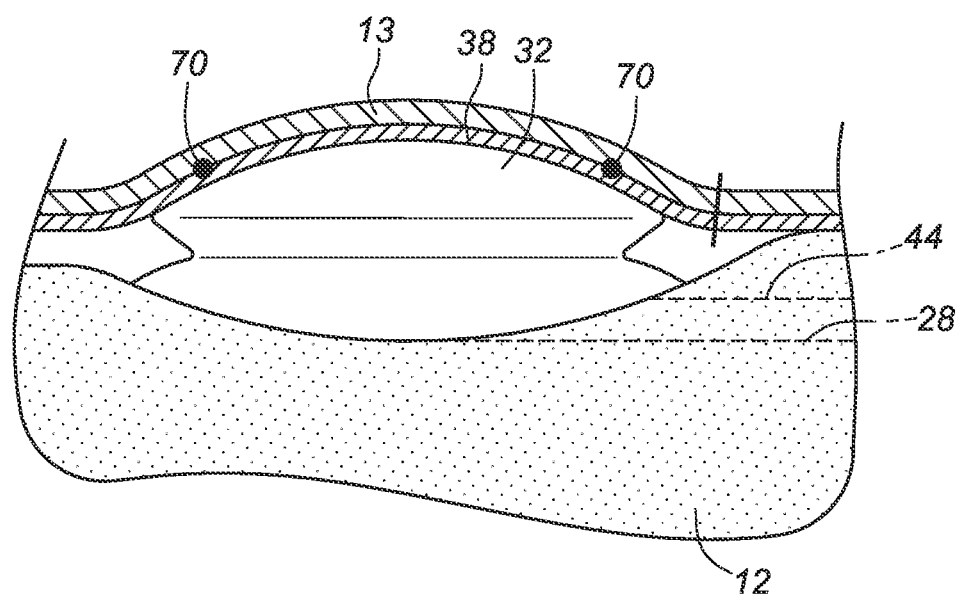
FIG. 8A is a sectional view showing an area surrounding the air cell in an inflated state in the vehicle seat of the first embodiment.

However, when the seat heater 38 and the air cells 32 overlap each other in top view, the resulting increase in the thickness of the seat cushion 5 may create a problem. Further, as shown in FIG. 8A, when the seat heater 38 is pushed out toward the occupant due to the bulging of the air cells 32, the seat heater 38 could be displaced or bent (or otherwise behave in an unpredictable manner), or the heating wire 70 may be subjected to a tensile load.

Figure 8B:
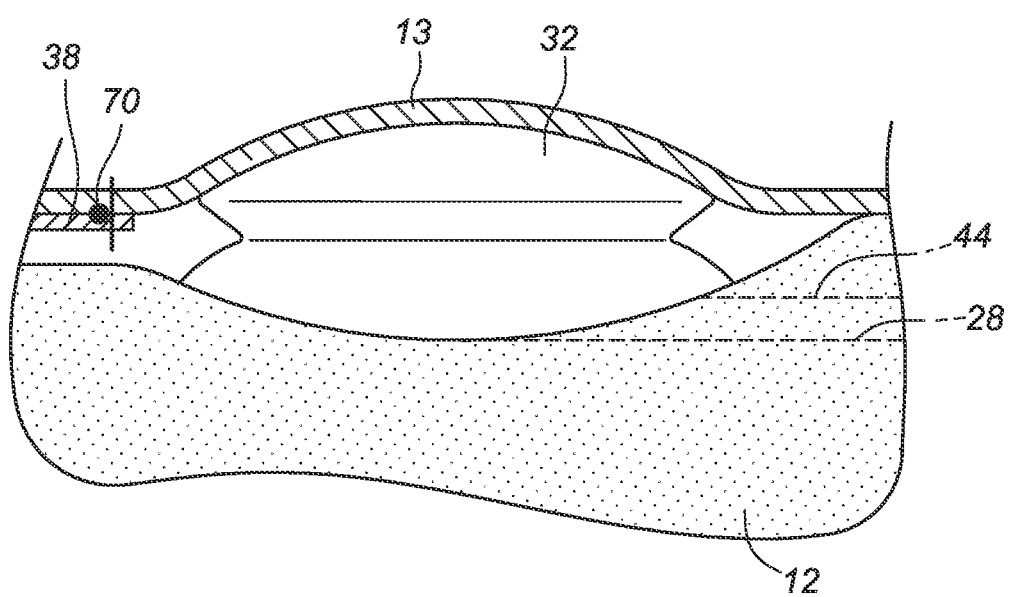
FIG. 8B is a sectional view showing an area surrounding the air cell in an inflated state in the vehicle seat modified from that of the first embodiment.

In the present embodiment, since the seat heater 38 and the air cells 32 are positioned so as not to overlap each other in top view, the thickness of the seat cushion 5 is prevented from increasing. Therefore, the vehicle seat 1 can be designed in a compact manner. Further, since the seat heater 38 and the air cells 32 do not overlap each other in top view, it is unlikely for the load due to the inflation of the air cells 32 to be applied to the seat heater 38 as shown in FIG. 8B. Thus, the seat heater 38 is prevented from being displaced or bent. Further, since the seat heater 38 and the air cells 32 do not overlap with each other, an excessive tensile load is prevented from being applied to the seat heater 38 when the air cells 32 are inflated.

The pressure-sensitive switches 52 are provided in a rear part of the seating surface 8 of the seat cushion 5 and in a lower part of the front surface of the seat back 6. Therefore, when the occupant is not properly seated on the vehicle seat 1, the seat heater 38 is prevented from being activated and the air cells 32 are prevented from being inflated and deflated. As a result, the seat heater 38 is prevented from being inadvertently activated, and the air cells 32 are prevented from being inadvertently inflated and deflated.

Second Embodiment

The vehicle seat 101 according to the second embodiment of the present invention differs from that of the first embodiment only in the configuration of the seat heater 38, and is otherwise similar to that of the first embodiment. Therefore, the description of such parts will be omitted in the following disclosure.

Similar to the first embodiment, the seat heater 38 has a substantially rectangular heater central part 60 positioned on the upper surface of the pad central part 14, and a pair of heater side parts 62 positioned on the respective pad side parts 15.

Figure 9A:
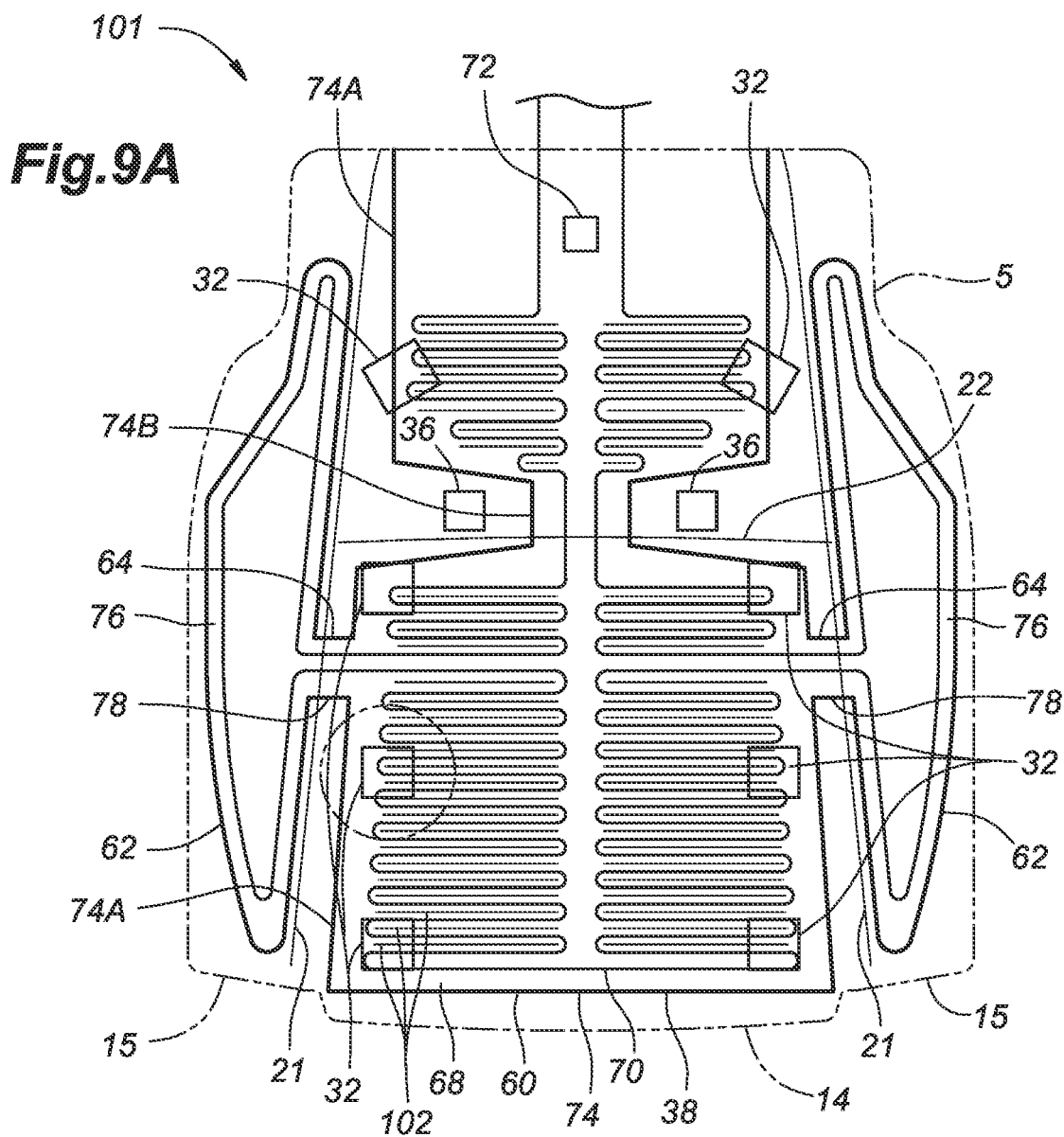
FIG. 9A shows a seat heater of a vehicle seat according to a second embodiment of the present invention.
Figure 9B:
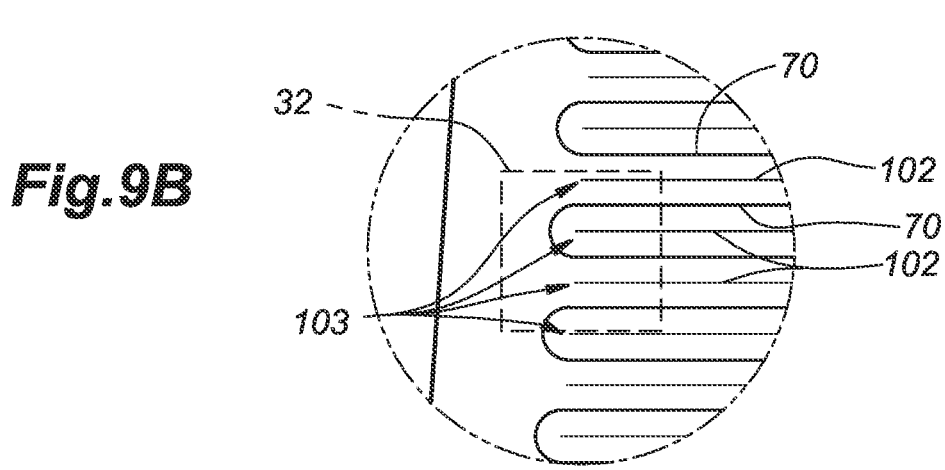
FIG. 9B is an enlarged view of a part in FIG. 9A surrounded by a double-dot chain line.

As shown in FIG. 9A, the heater central part 60 overlaps with the air cells 32 at the left and right side edge parts thereof. As shown in FIG. 9A, the base cloth 68 of the seat heater 38 is provided with slits 102 in the region thereof located between adjoining segments of the meandering heating wire 70 including the parts of the heater central part 60 overlapping with the air cells 32 (see FIG. 9B). These slits 102 create readily deformable portions 103 which readily deform when the air cells 32 are inflated.

In the present embodiment, at least a part of the slits 102 are provided so as to overlap with the air cells 32 in top view.

Next, the effect of the vehicle seat 101 configured in this way will be discussed in the following. By providing the slits 102 in the base cloth 68 of the seat heater 38, the readily deformable portions 103 are formed in the parts thereof overlapping with the air cells 32. As a result, when the air cells 32 are inflated, the seat heater 38 can deform in conformity. As a result, an excessive tensile force is prevented from being applied to the seat heater 38, and the seat heater 38 is prevented from impeding the inflation of the air cells 32. Thus, the pressure from the air cells 32 can be appropriately applied to the occupant.

Further, by providing the slits 102 in the base cloth 68, the readily deformable portions 103 can be created with ease and simplified in structure as compared to the cases where the base cloth 68 is provided with locally thinned portions or includes localized portions made of a readily deformable material.

In the present embodiment, since at least a part of the slits 102 overlap with the air cells 32 in top view, the readily deformable portions 103 of the seat heater 38 are located partly adjacent to the air cells 32. Thereby, the seat heater 38 is enabled to more readily conform to the inflated air cells 32.

When the air cells 32 are inflated, the slits 102 provided adjacent to the air cells 32 are deformed to a more open configuration. Therefore, when the slits 102 and the heating wire 70 intersect each other, a tensile load is applied to the heating wire 70. In the present embodiment, since the slits 102 are provided in the region between the adjacent segments of the heating wire 70, the load acting on the heating wire 70 owing to the inflation of the air cells 32 can be reduced as compared to the case where the slits 102 and the heating wire 70 intersect with each other.

Third Embodiment

The vehicle seat 151 according to the third embodiment differs from that of the first embodiment only in the configuration of the seat heater 38, but is otherwise similar to that of the first embodiment. Therefore, the description of such parts is omitted in the following disclosure.

Similarly to the first embodiment, the seat heater 38 has a substantially rectangular heater central part 60 positioned on the upper surface of the pad central part 14 and a pair of heater side parts 62 positioned on the left and right pad side parts 15, respectively.

Figure 10A:
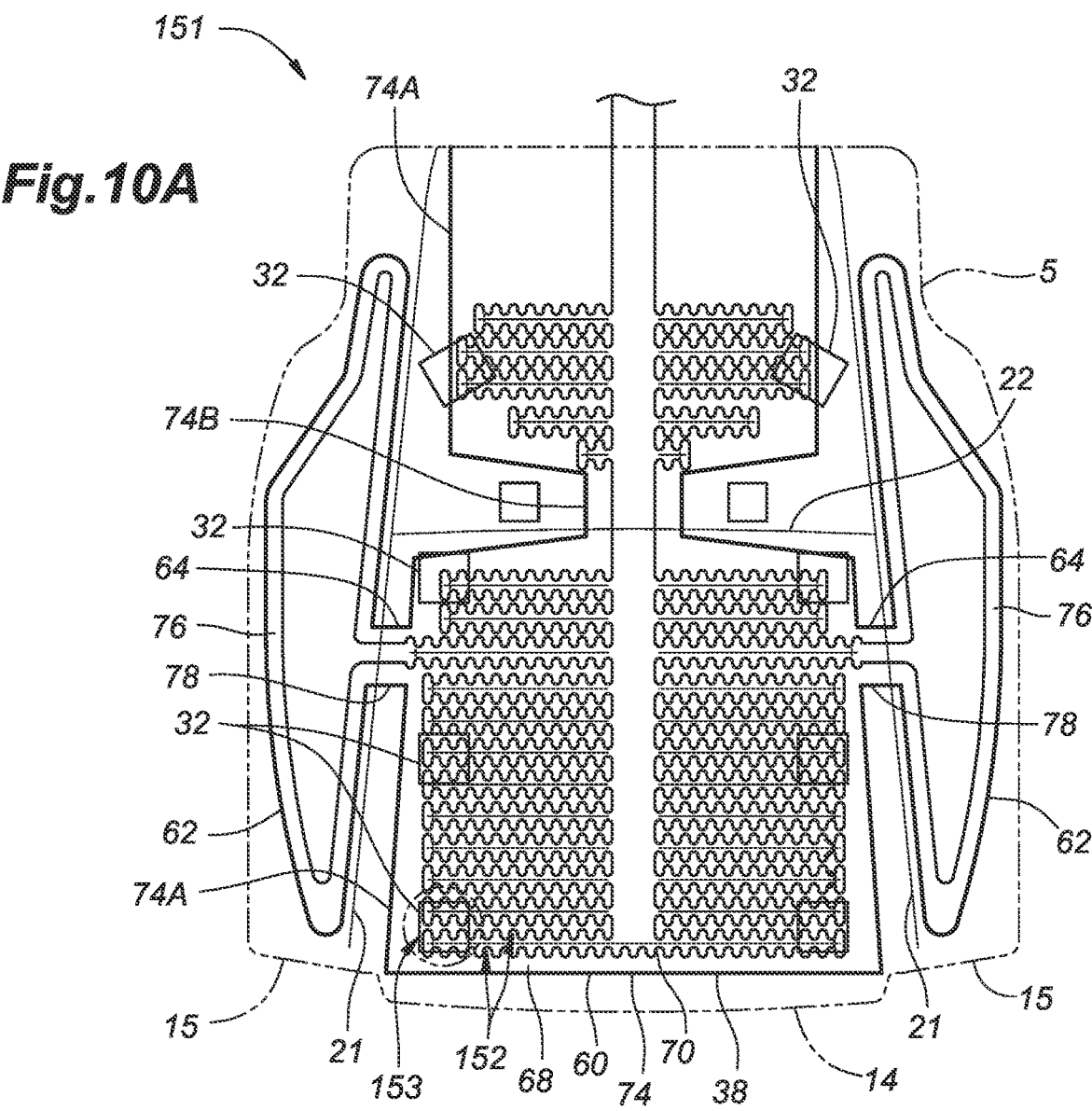
FIG. 10A shows a seat heater of a vehicle seat according to a third embodiment of the present invention.

The heater central part 60 overlaps with the air cells 32 at the left and right edges thereof. As shown in FIG. 10A, the part of the heating wire 70 located on the heater central part 60 includes a plurality of meandering segments 152 extending laterally (in a first direction) in a meandering manner, and connecting segments 153 that connect the opposing ends of the adjacent meandering segments 152. The meandering segments 152 are arranged one next to the other in the fore and aft direction, and the connecting segments 153 extend in the fore and aft direction (in a second direction) so as to connect the adjacent meandering segments 152. Thus, in the heater central part 60, the heating wire 70 extends laterally in a meandering manner, and loops back in the fore and aft direction.

Figure 10B:
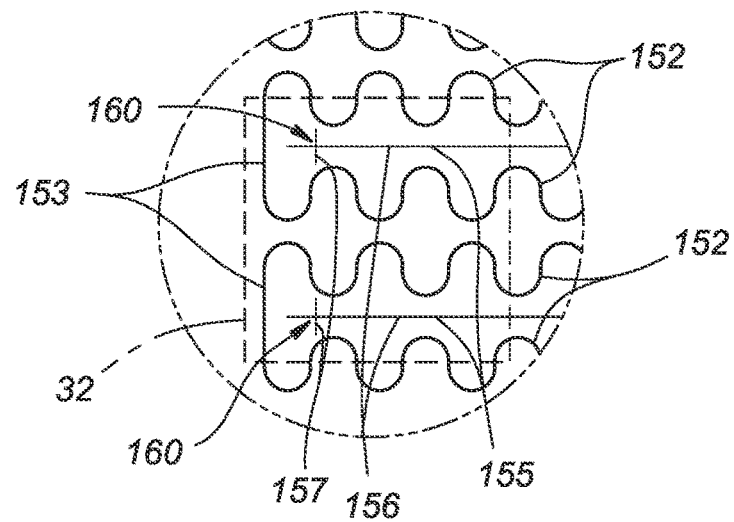
FIG. 10B is an enlarged view of a part in FIG. 10A surrounded by a double-dot chain line.

The base cloth 68 of the seat heater 38 is provided with a plurality of slits 155. Each slit 155 is positioned between the two mutually adjoining meandering segments 152. Each slit 155 includes a slit lateral part 156 (first part) extending in the lateral direction and a slit longitudinal part 157 (second part) extending orthogonally to the slit lateral part 156 or in the fore and aft direction. In the present embodiment, as shown in FIG. 10B, the slit longitudinal parts 157 include those provided at positions overlapping with the central parts of the air cells 32.

The longitudinal distance between the adjoining meandering segments 152 is smaller than the fore and aft width of the air cells 32, and at least one of the meandering segments 152, at least one of the connecting segments 153, and at least one of the slits 155 overlap with one of the air cells 32.

Next, the effect of the vehicle seat 1 according to the third embodiment will be discussed in the following. When the air cells 32 are inflated, the parts of the seat heater 38 on the immediate upper side of the air cells 32 are pushed upward.

A part of the seat heater 38 located directly above one of the air cells 32 includes at least one meandering segment 152, at least one of the connecting segments 153, and at least one of the slits 155. Therefore, the heating wire 70 and the base cloth 68 can readily deform in conformity to the inflated air cell 32. In other words, the part of the seat heater 38 located above the air cell 32 is formed as a readily deformable portion 160 that can readily deform in conformity to the inflated air cell owing to the meandering segment 152, the connecting segment 153, and the slit 155. Thereby, an excessive tensile load is prevented from being applied to the base cloth 68 and the heating wire 70.

In the present embodiment, each slit 155 includes a slit lateral part 156 extending in the lateral direction and a slit longitudinal part 157 extending in the fore and aft direction. Therefore, each slit 155 can be opened in both the lateral direction and the longitudinal direction. Therefore, the base cloth 68 is enabled to be more readily deformed in conformity to the inflation of the air cell 32 as compared with the case where the slits 155 extend only in the lateral direction.

Fourth Embodiment

Figure 11:
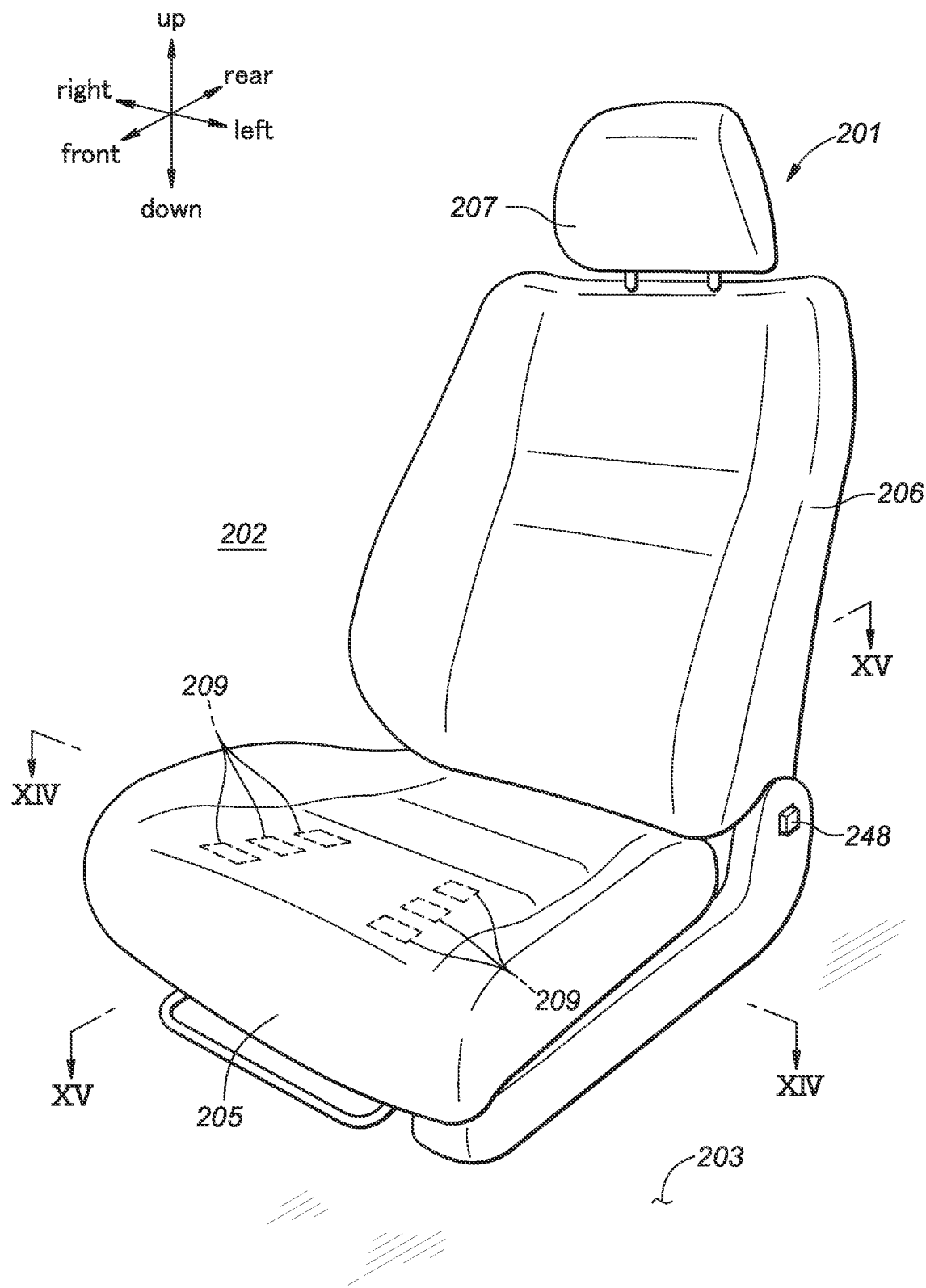
FIG. 11 is a perspective view of a vehicle seat according to a fourth embodiment of the present invention.

As shown in FIG. 11, the vehicle seat 151 is placed on a floor 203 defining the bottom end of the vehicle cabin 202 so as to face in the forward direction. In the present embodiment, the vehicle seat 151 is a passenger seat located laterally next to the driver's seat.

The vehicle seat 151 includes a seat cushion 205 attached to the floor 203, a seat back 206 connected to the rear end of the seat cushion 205, and a headrest 207 provided on top of the seat back 206. The seat cushion 205 supports the buttocks and thighs of the seated occupant. The seat back 206 is located behind the hip and back of the seated occupant, and the headrest 207 is located behind the head of the seated occupant.

Figure 12:
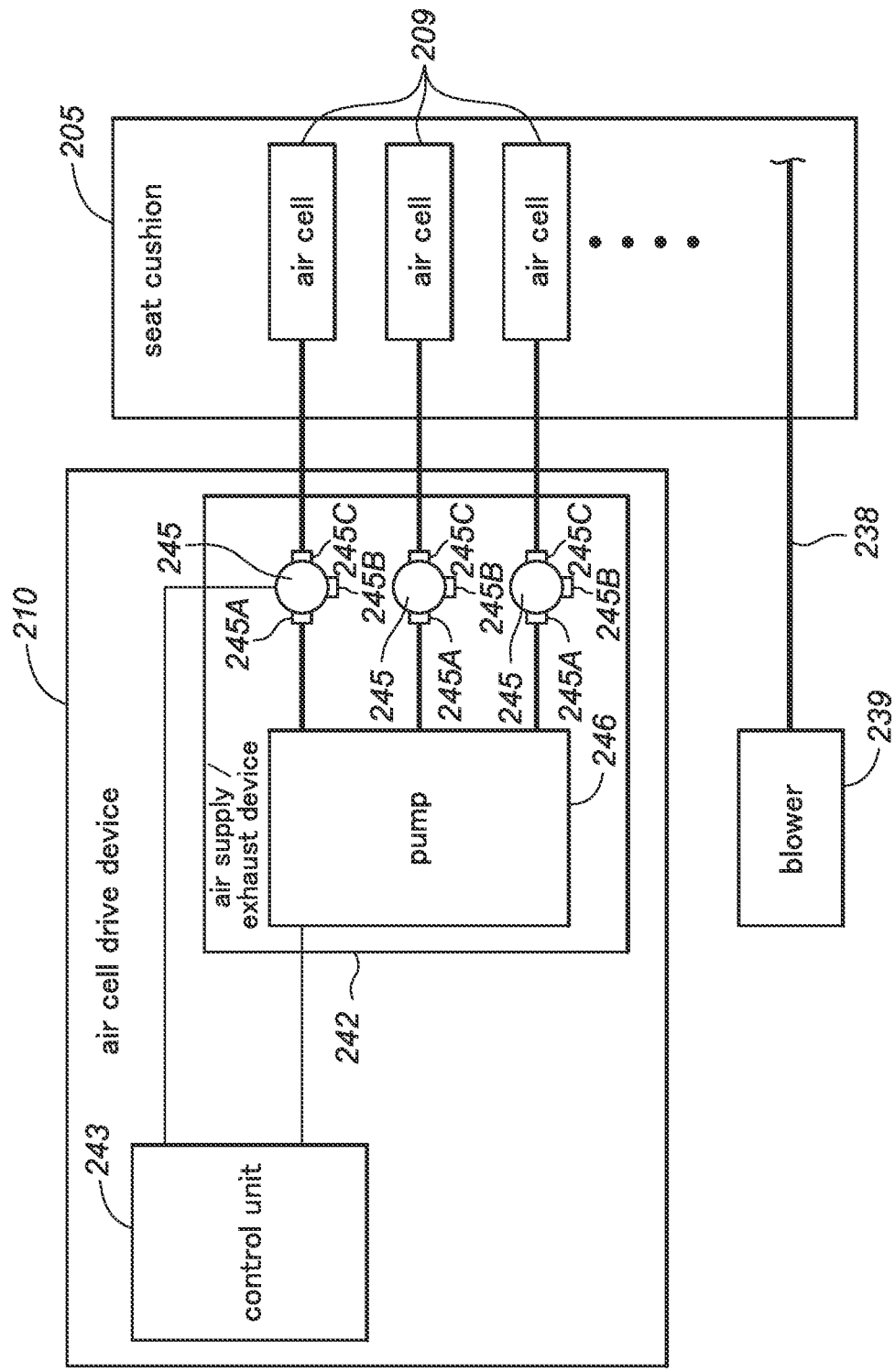
FIG. 12 is a block diagram of the vehicle seat of the fourth embodiment.

As shown in FIG. 12, the vehicle seat 151 is provided with air cells 209 or fluid sealed members and an air cell drive device 210 for supplying and exhausting air to and from the air cells 209. The air cells 209 are placed inside the seat cushion 205. The air cells 209 are arranged in the seat cushion 205 in a pair of rows extending in the fore and aft direction so as to correspond to the left and right thighs of the occupant. In the present embodiment, each row includes three air cells 209. When the air cell drive device 210 is activated, air is supplied to and exhausted from the air cells 209 so as to cause the air cells 209 to be inflated and deflated repeatedly to apply pressure to the buttocks and thighs of the occupant repeatedly. The massaging of the thighs of the occupant in this manner is expected to have a relaxing effect on the occupant.

Further, the seat cushion 205 of the vehicle seat 151 is internally provided with a passage 238 (ventilation path). This passage 238 is configured to guide the air flow created by a blower 239 provided on the vehicle seat 151 (see FIG. 12) to the seating surface of the seat cushion 205.

Next, the structure of the seat cushion 205 will be described in detail in the following with reference to the appended drawings.

As shown in FIGS. 13A, 13B, and 14, the seat cushion 205 is provided with a cushion frame 212 supported by a vehicle body to form a skeletal framework of the seat cushion 205, a pad member 213 supported by the cushion frame 212, and a skin member 214 that covers the surface of the pad member 213. The skin member 214 forms the ornamental surface of the seat cushion 205, and is preferably made of a stretchable cloth material that can expand under the pressure created by the inflation of the air cells 209.

As shown in FIGS. 13A to 15, the pad member 213 includes a pad main body 216 supported by the cushion frame 212, a passage forming piece 217 overlaid on a part of the upper surface of the pad main body 216, a stiff member 218 attached to the passage forming piece 217, and an upper part forming piece 219 overlaid on the upper surface of the passage forming piece 217 which is covered by the skin member 214. The pad main body 216, the passage forming piece 217, and the upper part forming piece 219 are made of an elastically deformable foam resin material such as urethane foam. In the present embodiment, the pad main body 216, the passage forming piece 217, and the upper part forming piece 219 are all made of the same material.

Figure 15:
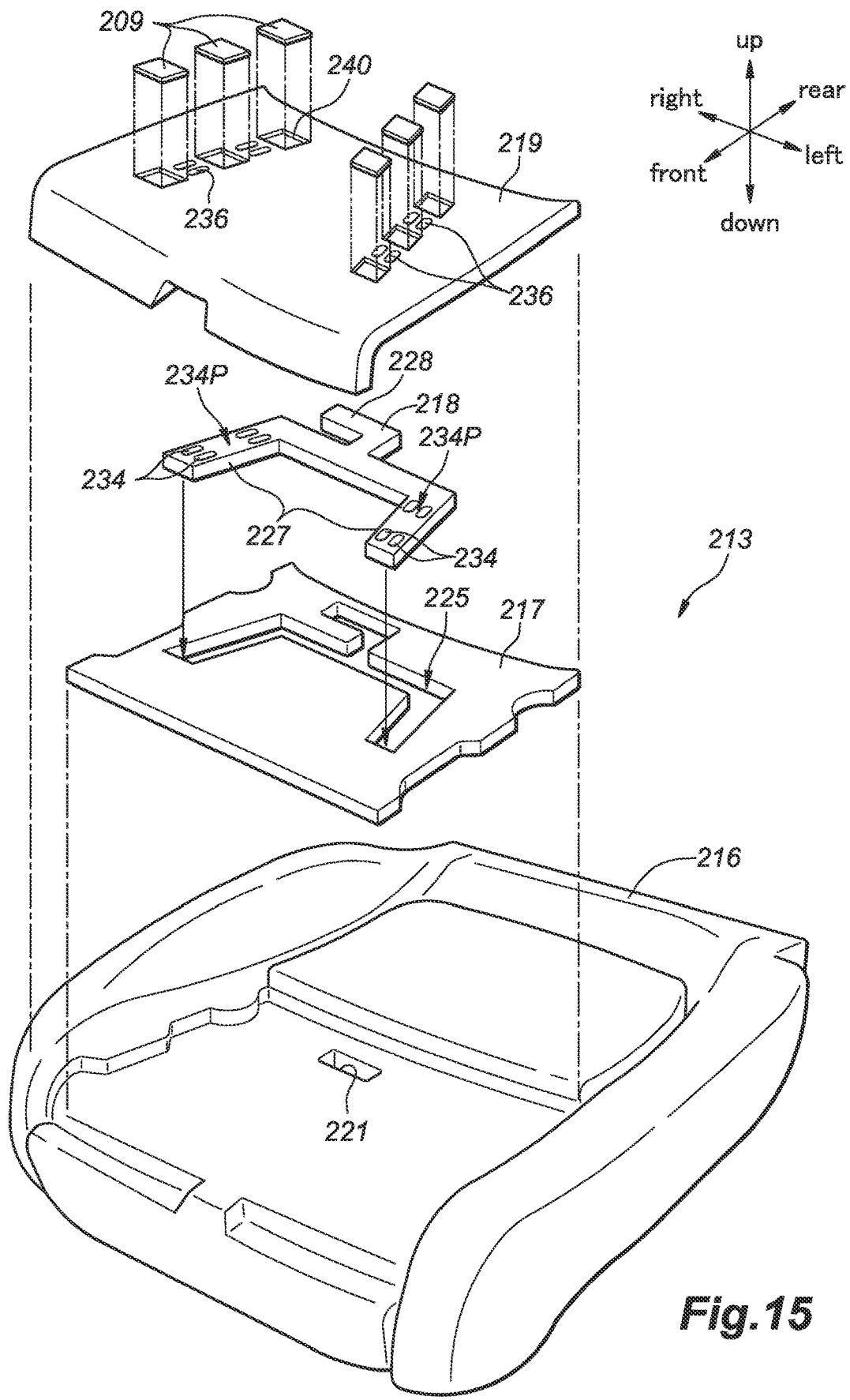
FIG. 15 is an exploded perspective view of a seat cushion of the vehicle seat of the fourth embodiment.

The pad main body 216 is a substantially rectangular parallelepiped member forming a lower part of the seat cushion 205, and is supported by the cushion frame 212 from below as shown in FIGS. 13A, 13B, and 14. As shown in FIGS. 14 and 15, the pad main body 216 is provided with a communication hole 221 that is passed vertically therethrough. As shown in FIG. 14, a duct 222 is attached to the lower surface of the pad main body 216. The duct 222 is provided with a tubular shape defining an inner bore. In this embodiment, the duct 222 consists of a bellows pipe. The duct 222 is connected to the pad main body 216 such that the inner bore thereof communicates with the communication hole 221. The pad main body 216 may be provided with a connecting member 223 (for example, a hose nipple or the like) to facilitate the connection of the duct 222 to the pad main body 216.

As shown in FIG. 15, the passage forming piece 217 is in a sheet form (or a plate shape). The passage forming piece 217 is provided with a continuous slot 225 (also referred to as a groove) passed in the vertical direction. In the present embodiment, the slot 225 has a predetermined width in top view, and has a Y-shape, bifurcated from the base end side (rear side) to the free end side (front side). The base end of the slot 225 is positioned so as to align with the communication hole 221 when the passage forming piece 217 is overlaid on the pad main body 216.

The stiff member 218 includes two branch portions 227 extending in the fore and aft direction, and a connecting portion 228 extending in the fore and aft direction and connecting the rear end parts of the two branch portions 227 to each other, and has a Y-shape corresponding to the slot 225. The stiff member 218 is composed of a square pipe which is closed at the front and rear ends, and is bifurcated at the front end. The branch portions 227 and the connecting portion 228 each have a hollow interior extending along the length thereof, and the hollow interiors of these portions are communicated with each other. The front ends of the hollow interior of the branch portions 227 and the rear end of the hollow interior of the connecting portion 228 are sealed. As a result, a Y-shaped internal chamber 231 corresponding to the slot 225 is formed inside the stiff member 218. The stiff member 218 is made of a material (such as plastic, metal, etc.) stiffer than those of the pad main body 216, the passage forming piece 217, and the upper part forming piece 219, and is less likely to be deformed under an external pressure.

The stiff member 218 has a substantially same vertical thickness as the passage forming piece 217. The stiff member 218 is fitted in the slot 225 and snugly received in the slot 225. The peripheral wall of the stiff member 218 is attached to the wall surface defining the slot 225. In the present embodiment, the stiff member 218 and the passage forming piece 217 consist of an integrally foam molded product.

As shown in FIG. 14, a rear part of the bottom wall of the connecting portion 228 is formed with a connecting portion through hole 233 communicating with the internal chamber 231. The connecting portion through hole 233 is positioned so as to overlap with the communication hole 221 in the vertical direction when the passage forming piece 217 is overlaid on the pad main body 216. As shown in FIGS. 13A, 13B, and 15, the upper wall of the front end part of each branch portion 227 is formed with branch portion connecting holes 234, respectively, communicating with the internal chamber 231 one behind the other.

The upper part forming piece 219 is in a sheet form (plate shape) extending along the seating surface of the seat cushion 205. The upper part forming piece 219 is provided with a plurality of upper through holes 236 passed vertically therethrough. In the present embodiment, each upper through hole 236 consists of a pair of openings positioned laterally next to each other. In the following disclosure, each upper through hole 236 may also be referred to as an upper through hole pair 236P. The upper through hole pairs 236P are thus arranged in two rows extending in the fore and aft direction in a laterally aligned relationship. The upper through hole pairs 236P are thus lined up in the fore and aft direction so as to correspond to the thighs of the occupant.

When the upper part forming piece 219 is overlaid on the passage forming piece 217, the upper through holes 236 align with the branch portion connecting holes 234, and are positioned so as to overlap each other.

When the passage forming piece 217 is overlaid on the pad main body 216 and the upper part forming piece 219 is overlaid on the passage forming piece 217, the interior of the duct 222, the interior of the connecting portion through hole 233, the internal chamber 231 of the stiff member 218, and the interior of the upper through holes 236 are communicated to each other so that a passage 238 that sequentially passes through these components is created.

A blower 239 (see FIG. 12) is connected to the duct 222. When the blower 239 is activated, air is forwarded from the blower 239 into the duct 222. The air introduced into the duct 222 is discharged from the upper through holes 236 via the passage 238. The air discharged from the upper through hole 236 passes through the skin member 214 and reaches the thighs of the seat occupant. In this way, the air flow from the blower 239 passes through the passage 238 and reaches the seat occupant.

The air cells 209 each consist of a bag-shaped member configured to contain air, which is a fluid, and is made of a stretchable material such as a rubber material. The air cells 209 are inflated by the air supplied thereto. Further, if the air is discharged from the air cells 209 which are already filled with air, the air cells 209 are deflated. The air cells 209 are each attached to the upper surface (surface side) of the upper part forming piece 219.

In the present embodiment, recesses 240 that are recessed downward are formed on the upper surface of the upper part forming piece 219 at positions corresponding to the air cells 209. Each recess 240 has a substantially rectangular shape when viewed from above. The upper through hole pairs 236P are positioned so as not to overlap with the recesses 240 or so as to avoid the recess 240 on the upper surface of the upper part forming piece 219. Therefore, the upper through hole pairs 236P open out on the upper surface of the upper part forming piece 219 where the recesses 240 are absent. In this embodiment, each upper through hole pair 236P open out between the adjacent air cells 209. As a result, the passage 238 is passed through the regions located between the adjacent air cells 209, and is allowed to reach the space (region) located between the adjacent air cells 209.

Figure 16:
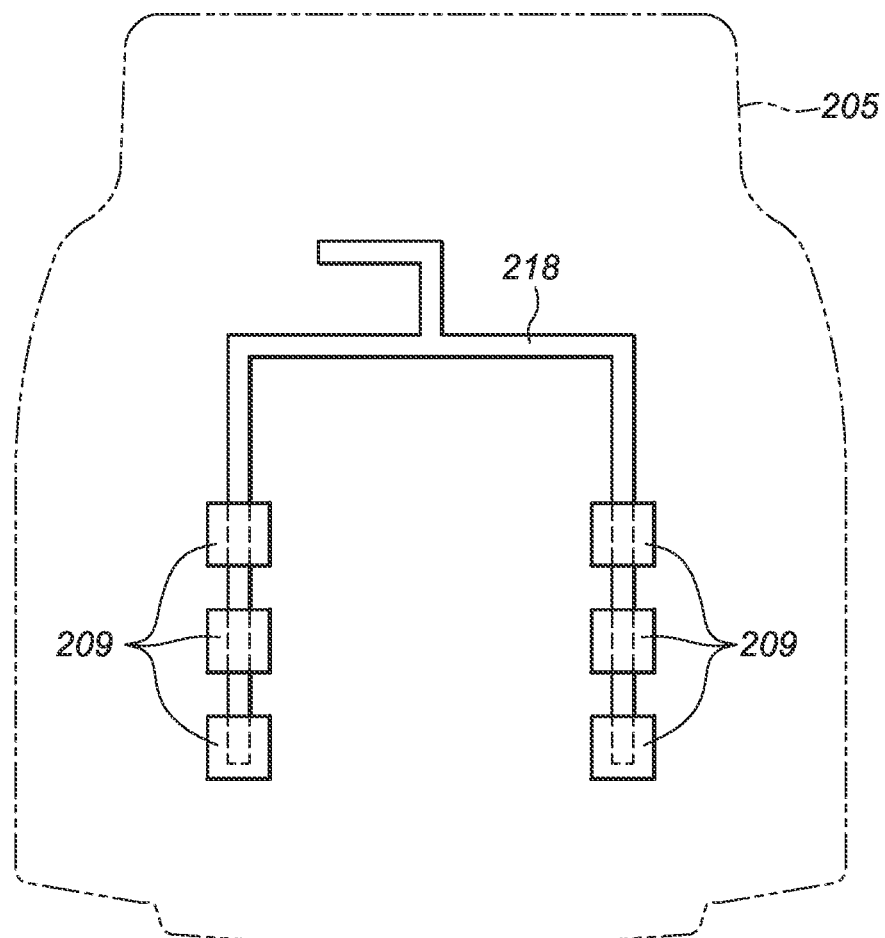
FIG. 16 is a top view of the seat cushion of the vehicle seat of the fourth embodiment.

Each air cell 209 is received in the corresponding recess 240, and attached to the upper part forming piece 219. Therefore, the air cell 209 is covered from above by the skin member 214 while being attached to the upper surface side of the pad member 213. In this conjunction, as shown in FIG. 16, each air cell 209 overlaps with the stiff member 218 from above.

Each air cell 209 is coupled to a tube (not shown in the drawings). Each tube passes through the inside of the pad member 213 from the surface side thereof, and is connected to the air cell drive device 210 on the back side of the pad member 213.

As shown in FIG. 12, the air cell drive device 210 includes an air supply/exhaust device 242 connected to the air cells 209 via a tubing, and a control unit 243 that controls the air supply/exhaust device 242. The air supply/exhaust device 242 supplies and exhausts each of the air cells 209 according to the control signal from the control unit 243, and inflates and deflates the air cells 209.

The air supply/exhaust device 242 includes solenoid valves 245 connected to the corresponding air cells 209 via a tubing, and a pump 246. Each solenoid valve 245 consists of a three-way valve provided with an intake port 245A, an exhaust port 245B, and a common port 245C. The intake port 245A of the solenoid valve 245 is connected to the pump 246 via a tubing or the like. The exhaust port 245B is open to the atmosphere. The common port 245C is connected to the duct 222. The solenoid valve 245 switches between an intake position where the common port 245C is connected to the intake port 245A, and an exhaust position where the common port 245C is connected to the exhaust port 245B according to the control signal from the control unit 243. The pump 246 is driven to pump air into the tubing according to a control signal from the control unit 243.

The vehicle seat 151 is provided with an input unit 248 (see FIG. 11) that accepts a drive instruction and a stop instruction for the air cells 209 from the occupant. When the input unit 248 receives an input corresponding to the drive instruction, the control unit 243 drives the pump 246 and switches the solenoid valves 245 between the intake position and the exhaust position at predetermined time intervals. When the solenoid valves 245 are in the intake position, the air pumped from the pump 246 flows into the tube and the air cells 209 are inflated. When the solenoid valves 245 are in the exhaust position, the air inside the air cells 209 is discharged from the exhaust ports 245B via the tubing, and the air cells 209 are deflated. Thus, the air cells 209 are repeatedly inflated and deflated intermittently. When the input unit 248 receives an input corresponding to the stop instruction, the control unit 243 stops the pump 246 and sets the solenoid valves 245 at the exhaust position. As a result, the air inside the air cells 209 is discharged from the exhaust ports 245B, and the air cells 209 are deflated. In this way, the control unit 243 controls the opening and closing of the solenoid valves 245 to supply and exhaust air to and from the corresponding air cells 209 to inflate and deflate them.

Next, the effect of the vehicle seat 151 according to the present embodiment will be discussed in the following. When the occupant makes an input corresponding to the drive instruction to the input unit 248, the air cells 209 are inflated and push up the occupant's thighs. As a result, the air cells 209 receive a reaction force and are pushed downward so that the air cells 209 apply pressure to the pad member 213.

The stiff members 218 provided on the back surface side (lower side) of the corresponding air cells 209 restrict the deformation of the pad member 213. This prevents the air cells 209 from moving downward (or to the side of the pad member 213). Therefore, the load generated by the inflation of the air cells 209 is prevented from being transmitted to the pad member 213 so that the pressure from the air cells 209 is more effectively applied to the occupant, and a high massage effect can be expected.

Further, a part of the passage 238 through which the air from the blower 239 flows is formed by the stiff member 218. Since the stiff member 218 resists the pressure from the seated person and the pressure due to the inflation of the air cell 209, the part of the air passage 238 defined by the stiff member 218 is less likely to be crushed, and the deformation of this part of the passage 238 can be avoided. As a result, the passage 238 for conducting the air from the blower 239 is less likely to be crushed by the pressure from the seated person or the pressure due to the inflation of the air cell 209. Therefore, the air supplied from the blower 239 can reach the seated occupant without fail.

Further, since the passage 238 is arranged so as to overlap with the air cells 209 in top view, and the parts of the passage 238 overlapping with the air cells 209 are formed by the stiff members 218, no extra stiff members are required to be placed under the air cells 209. Thereby, the number of component parts of the vehicle seat 151 can be reduced.

Further, in the present embodiment, the stiff member 218 and the passage forming piece 217 are integrally molded by being integrally foamed. Therefore, the number of component parts can be reduced as compared with the case where the stiff member 218 and the passage forming piece 217 are formed separately. Further, since the step of incorporating the stiff member 218 into the passage forming piece 217 is not required, the assembly of the vehicle seat 151 is simplified.

Further, in the present embodiment, the upper through hole pairs 236P open out between the adjacent air cells 209. As a result, the passage 238 provided in the pad member 213 passes between the adjacent air cells 209, and the air from the blower 239 is blown through the region between the adjacent air cells 209 via the passage 238. Thus, even when the air cells 209 are inflated, air can be blown through the region between the adjacent air cells 209 via the passage 238 so that the comfort of the vehicle seat 151 is improved.

Fifth Embodiment

The vehicle seat 301 according to the fifth embodiment differs in the configuration of the seat cushion 205 similarly as in the fourth embodiment. The seat cushion 205 of the vehicle seat 301 according to the fifth embodiment will be described in the following with reference to the drawings.

As shown in FIGS. 17A and 17B, the seat cushion 205 of the vehicle seat 301 according to the fifth embodiment has a cushion frame 212 similar to that of the fourth embodiment forming a structural skeletal framework. Further, the seat cushion 205 includes air cells 209, a pad member 213, a skin member 214, a passage forming member 317, and a stiff member 318.

Figure 18:
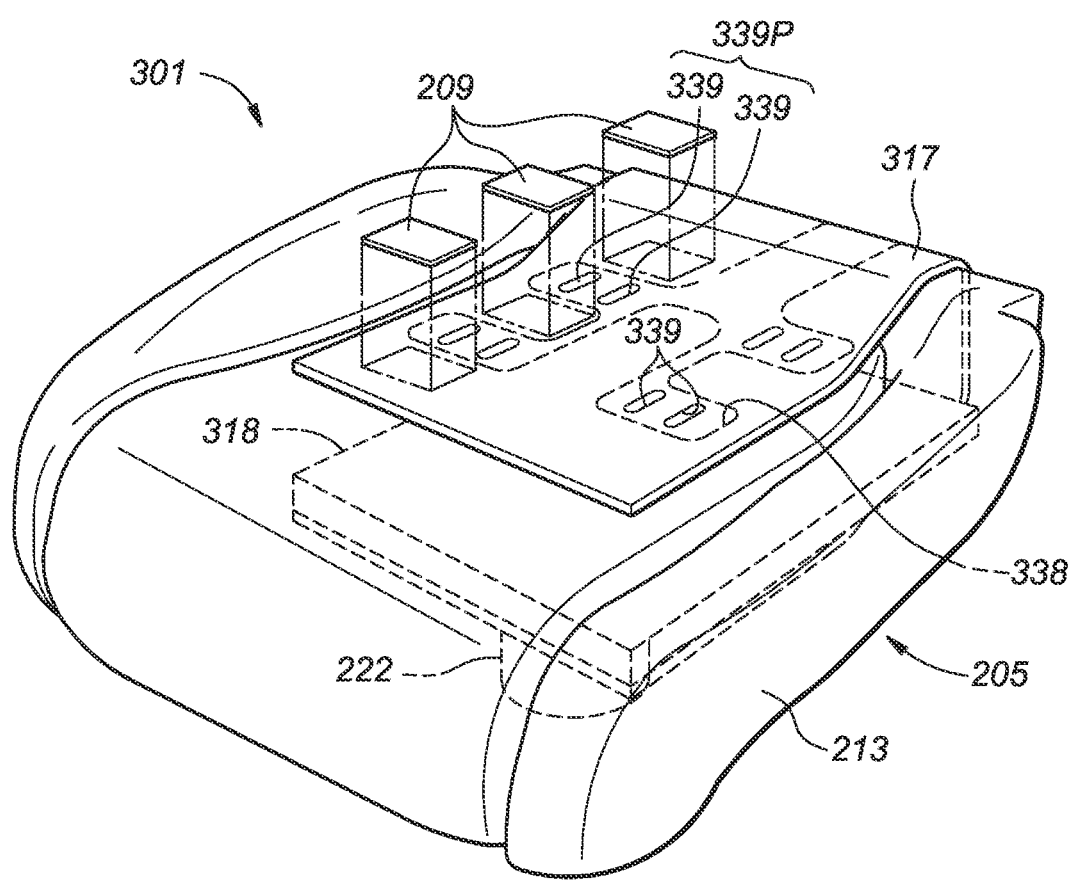
FIG. 18 is a perspective view of a pad member and a passage forming member of the seat cushion of the vehicle seat of the fifth embodiment.

As shown in FIG. 18, the pad member 213 has a substantially rectangular parallelepiped shape having an upper surface and a lower surface. Unlike the fourth embodiment, the pad member 213 is composed of an integral member. The pad member 213 is elastically deformable and is made of a foamed resin such as urethane foam.

The vehicle seat 301 includes a stiff member 318 which is a plate-shaped member made of a material (for example, plastic or the like) that is stiffer than the pad member 213 as in the fourth embodiment, and deforms to a less extent than the pad member 213 when subject to an external pressure. The stiff member 318 extends along the lower surface (back surface) of the pad member 213, and is in contact with the lower surface of the pad member 213.

The vehicle seat 301 includes a passage forming member 317 consisting of a sheet-shaped member. In the present embodiment, as shown in FIGS. 17A and 17B, the passage forming member 317 is formed by overlaying and joining two resin sheets on top of the other. As shown in FIG. 18, a duct 222 is provided on one side of the passage forming member 317, and a plurality of openings 339 are formed on the other side of the passage forming member 317. A passage 338 is defined inside the passage forming member 317 by leaving parts of the two sheets separated from each other. The duct 222 is connected to the passage forming member 317 such that the interior of the duct communicates with the passage 338.

The passage forming member 317 extends rearward from the lower surface of the stiff member 318, passes along the rear surface of the pad member 213, and reaches the upper surface of the pad member 213. In this conjunction, the duct 222 is located on the lower surface side of the pad member 213, and the openings 339 are located on the upper surface side of the pad member 213. In the present embodiment, the stiff member 318 and the passage forming member 317 are bonded to each other to form an integral body. The passage forming member 317 and the stiff member 318 are supported from below by the cushion frame 212 along the left and right edges.

In the present embodiment, as shown in FIG. 18, the openings 339 are provided in the passage forming member 317 such that each opening 339 is in fact formed by a pair of openings positioned laterally next to each other. The pairs of the openings 339 may be referred to as opening pairs 339P in the following disclosure. The opening pairs 339P are provided so as to form a pair of rows extending in the fore and aft direction and laterally spaced from each other.

The air cells 209 are provided between the passage forming member 317 and the skin member 214 on the upper surface side of the pad member 213. As shown in FIG. 18, the air cells 209 are positioned so as to avoid the passage 338 including the opening pairs 339P. The air cells 209 are attached to the upper surface of the passage forming member 317. Similarly to the fourth embodiment, the air cells 209 each consist of a bag-shaped member, and are made of a stretchable material such as a rubber material. Similarly to the fourth embodiment, the air cells 209 are connected to the air supply/exhaust device 242 via a tubing (not shown). The air cells 209 are arranged in two rows extending in the fore and aft direction and laterally spaced from each other. The air cells 209 are located under the left and right thighs of the occupant seated on the vehicle seat 151. The air supply/exhaust device 242 is controlled by the control unit 243 to supply and exhaust air to and from the air cells 209, as in the fourth embodiment. Thus, the air cells 209 can be inflated and deflated for massaging the buttocks and thighs of the occupant.

Similarly to the fourth embodiment, the skin member 214 covers the surfaces of both the air cells 209 and the pad member 213. The skin member 214 is made of a stretchable material that expands under the pressure from the inflation of the air cells 209. The skin member 214 is provided on the upper surface of the seat cushion 205, and forms an ornamental surface of the seat cushion 205.

The duct 222 is connected to the blower 239 as in the fourth embodiment. When the blower 239 is activated, air is blown into the duct 222 by the blower 239. The air sent into the duct 222 reaches the seated occupant via the passage 338. In other words, the blower 239 blows air to the seated occupant via the passage 338.

Next, the effect of the vehicle seat 301 according to the fifth embodiment will be discussed in the following.

As shown in FIGS. 17A and 17B, the air cells 209 are located on the top side of the pad member 213. Therefore, when the air cells 209 are inflated, pressure is applied to the pad member 213.

The stiff member 318 is located under the pad member 213 and below the air cells 209. Therefore, the stiff member 318 resists the pressure due to the inflation of the air cells 209, and the downward deformation of the pad member 213 is restricted. As a result, the air cells 209 can be prevented from shifting to the side of the pad member 213 (downward), so that the pressure from the air cells 209 is effectively applied to the occupant.

Further, the passage forming member 317 has a sheet shape. Therefore, by positioning the passage forming member 317 on the surface of the pad member 213, it is possible to form the passage 238 for blowing air to the seated person with ease without requiring a passage to be formed inside the pad member 213.

Further, the stiff member 318 and the passage forming member 317 are bonded to each other to form an integral body. Therefore, as opposed to the case where the stiff member 318 and the passage forming member 317 are separate members, the stiff member 318 and the passage forming member 317 can be assembled to the pad member 213 at the same time so that the assembly work of the vehicle seat 301 can be facilitated.

Sixth Embodiment

The vehicle seat 401 according to the sixth embodiment differs from the fourth embodiment in the configuration and positioning of the stiff member 418, but is otherwise similar to that of the fourth embodiment. Therefore, the description of such similar parts is omitted in the following disclosure.

The vehicle seat 401 includes stiff members 418 that are each received in a recess 240 provided on the upper surface of an upper part forming piece 219. The stiff members 418 each have a flat plate shape that is conformal to the recess 240. In the present embodiment, the recesses 240 and the stiff members 418 all have a rectangular shape (square) when viewed from above (or, when viewed from the front and back direction). Each stiff member 418 is fitted in the corresponding recess 240, and attached to the upper part forming piece 219.

The air cells 209 have a rectangular shape (square) similarly to the stiff members 418. The width of each stiff member 418 in the lateral direction is larger than that of the air cell 209. The width of the stiff member 418 in the fore and aft direction (direction orthogonal to the lateral direction) is larger than that of the air cell 209. The widths of the stiff member 418 in the fore and aft direction and the lateral direction may be set sufficiently large so that the air cell 209 does not come into direct contact with the pad member 213 when the air cell 209 is inflated.

In the present embodiment, the edge of each stiff member 418 is further provided with a projecting wall 420 projecting upward (or in a direction away from the surface of the pad member 213). The amount of protrusion of the projecting wall 420 is set to be equal to or less than the depth of the recess 240. As a result, the projecting wall 420 is lower than the upper surface of the part of the pad member 213 surrounding the recess 240 in which the stiff member 418 is located. Thereby, the presence of the stiff member 418 is prevented from causing any discomfort to the seat occupant.

Further, the vertical dimension of each air cell 209 in the deflated state may be set to be larger than the protrusion amount of the projecting wall 420. As a result, the projecting wall 420 is lower than the upper surface of the air cell 209 received in the stiff member 418. Therefore, the presence of the stiff members 418 is prevented from causing discomfort to the seated occupant.

Figure 20:
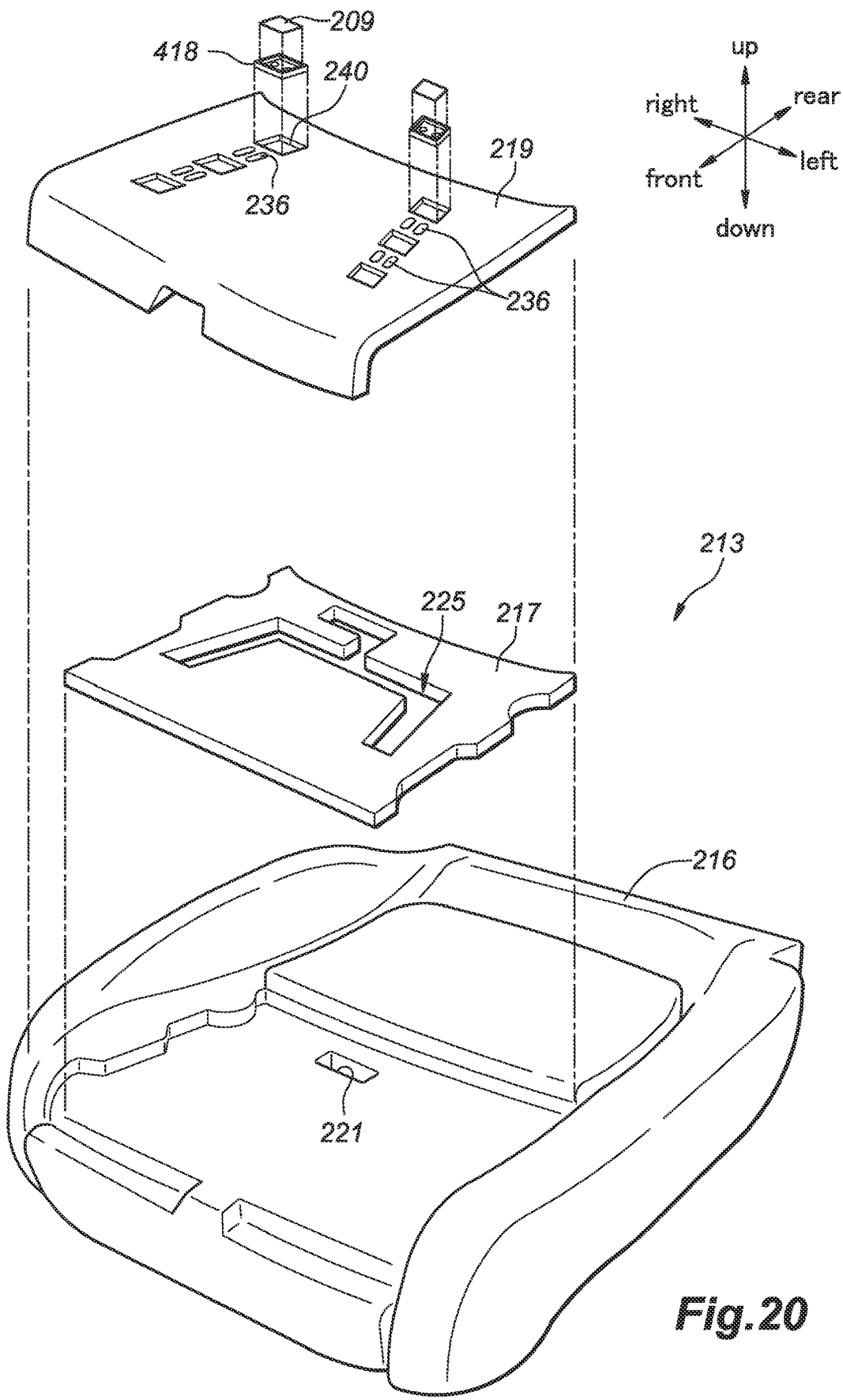
FIG. 20 is an exploded perspective view of the seat cushion of the vehicle seat of the sixth embodiment.

Next, the effect of the vehicle seat 401 configured in this way will be discussed in the following. As shown in FIG. 20, the passage forming piece 217 and the upper part forming piece 219 are layered on top of the other on the upper surface of the pad main body 216.

When the blower 239 is activated, air flows into the duct 222. The air sent into the duct 222 reaches the upper surface of the pad member 213 via the communication hole 221, the slot 225, and the upper through holes 236. Thus, the blower 239 blows air to the seated occupant via the passage 238.

The passage 238 passes along the back side of the air cells 209. Therefore, the vehicle seat 401 can be made compact, and minimized in size.

When the air supply/exhaust device 242 is activated and the air cells 209 are inflated, pressure is applied from each air cell 209 to the corresponding stiff member 418. The stiff member 418 is larger than the air cell 209 in top view, so that when the air cell 209 is inflated, the air cell 209 is supported by the stiff member 418 and does not come into direct contact with the pad member 213. This prevents the pressure due to the inflation of the air cell 209 from being directly applied to the pad member 213. Further, since the pressure applied to the pad member 213 is dispersed by the stiff member 418, the pad member 213 is less likely to be deformed. Thus, each air cell 209 is supported by the corresponding stiff member 418 from the back side so that the movement of the air cell 209 toward the pad member 213 is prevented, and the pressure from the air cell 209 is effectively applied to the seated occupant. Further, since the pressure applied to the pad member 213 provided with the passage 238 is dispersed, the passage 238 is prevented from being deformed, and the flow of the air (fluid) supplied by the blower 239 is prevented from being blocked.

Since the lateral width of each stiff member 418 is larger than the lateral width of the air cell 209, the air cell 209 can be supported in the lateral direction by the stiff member 418 in a reliable manner. Further, since the longitudinal width of the stiff member 418 is larger than the longitudinal width of the air cell 209, the air cell 209 can be supported in the fore and aft direction in a reliable manner. Further, by thus making the size of the stiff member 418 larger than the air cell 209, the pressure applied to the pad member 213 can be further dispersed. Therefore, the passage 238 is prevented from being deformed, and the air (fluid) supplied by the blower 239 is prevented from being blocked in a more reliable manner.

In the present embodiment, the lateral and longitudinal widths of each stiff member 418 is set sufficiently large so that the air cell 209 does not directly abut on the pad member 213 when the air cell 209 is inflated. As a result, the air cell 209 when inflated is supported over a wide surface area by the stiff member 418, and the air cell 209 can be prevented from coming into contact with the pad member 213 when inflated so that the load due to the inflation of the air cell 209 can be effectively transmitted to the occupant.

Further, the projecting wall 420 provided along the edge of each stiff member 418 protrudes toward the air cell 209. As a result, the air cell 209 that expands in both the lateral and longitudinal directions at the time of inflation is prevented from coming into contact with the pad member 213. As a result, the air cell 209 when inflated is prevented from coming into contact with the pad member 213 so that the load due to the inflation of the air cell 209 can be more effectively transmitted to the occupant.

Seventh Embodiment

The vehicle seat 501 according to the seventh embodiment differs from those of the first to sixth embodiments in the structure of the seat cushion 205, but is otherwise similar to them. Therefore, the description of similar parts is omitted from the following disclosure.

The seat cushion 205 of the vehicle seat 501 according to the seventh embodiment includes a cushion frame 212 serving as a structural skeletal framework, a pad member 513 supported by the cushion frame 212, a plurality of air cells 209 provided on the upper surface of the pad member 513, and a skin member 214 that covers the pad member 513 and the air cells 209 from above.

The cushion frame 212 is the same as that of the fourth embodiment. The pad member 513 is the same as that of the fifth embodiment, has a substantially rectangular parallelepiped shape having an upper surface and a lower surface, and is composed of an integral member. The pad member 513 is elastically deformable and is made of a foamed resin such as urethane foam.

Figure 21A:
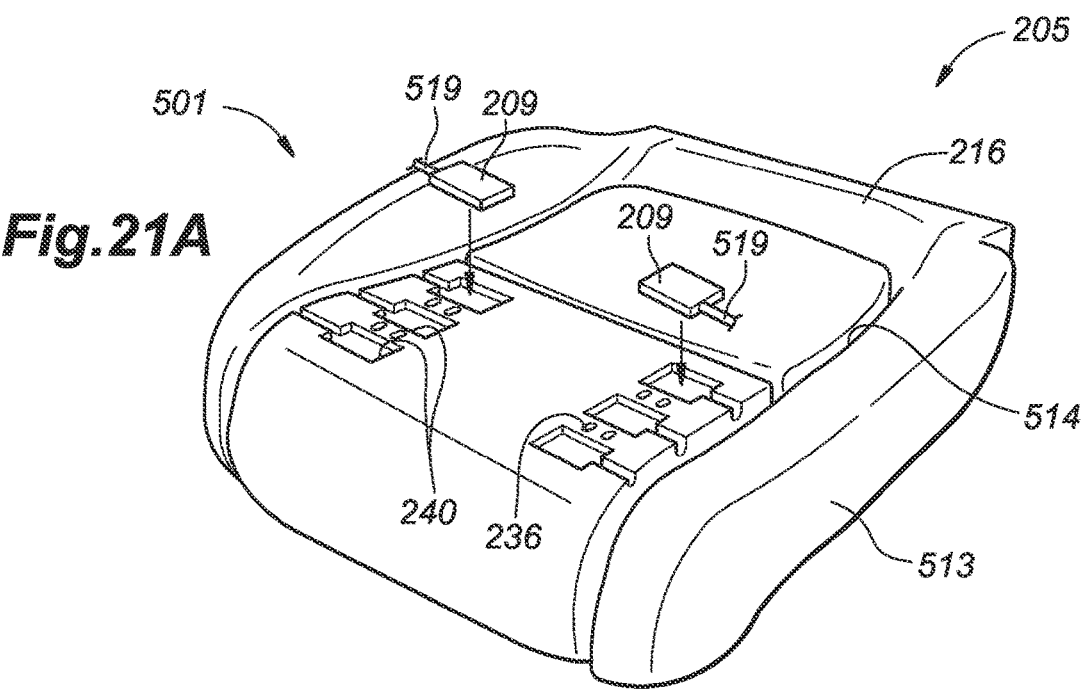
FIG. 21A is a top view of a pad member of a vehicle seat according to a seventh embodiment of the present invention.
Figure 21B:
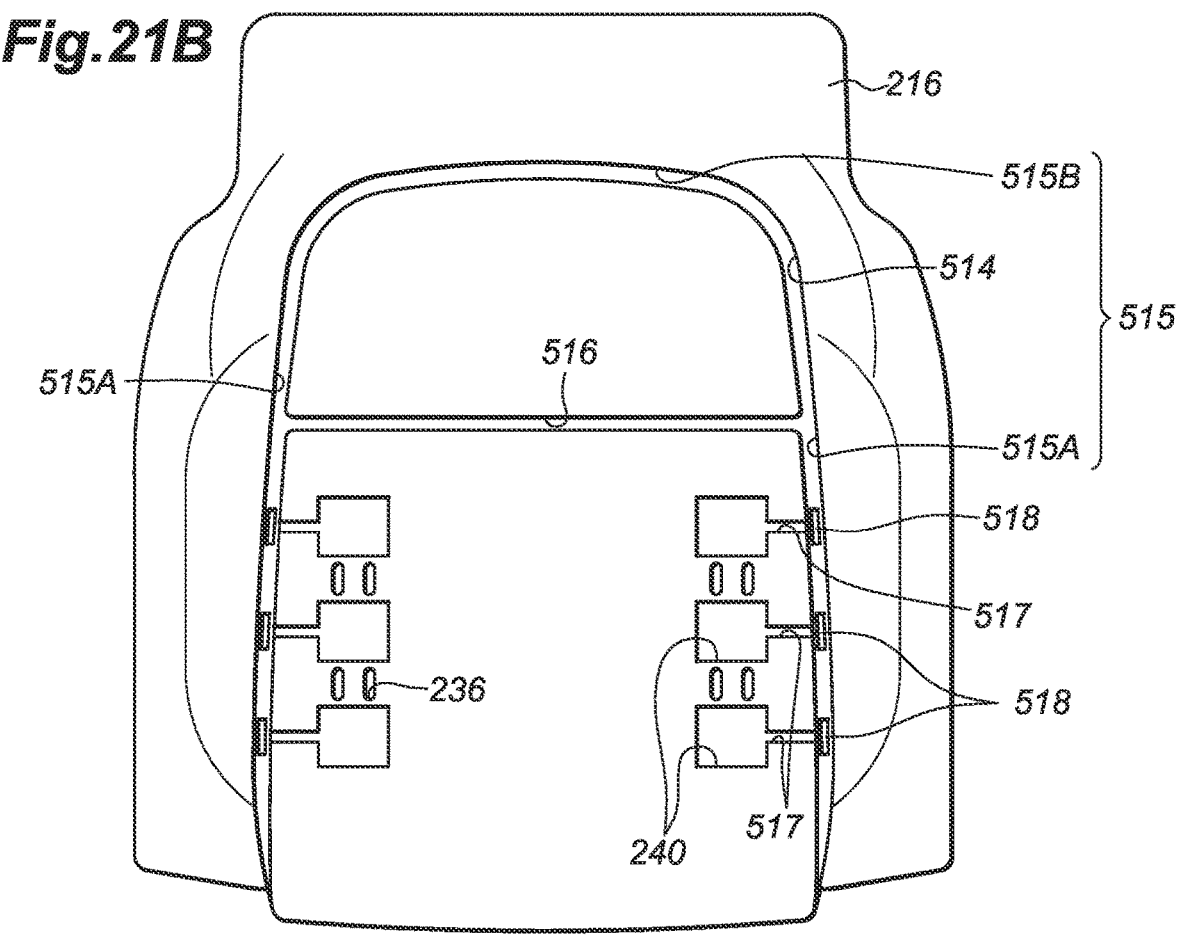
FIG. 21B is a top view of the pad member of the vehicle seat of the seventh embodiment.

As shown in FIG. 21A, the upper surface of the pad member 513 is provided with a retaining groove 514 that is recessed downward. As shown in FIG. 21B, the retaining groove 514 includes a U-shaped groove segment 515 having a U-shape when viewed from above, and a lateral groove segment 516 extending laterally. The U-shaped groove segment 515 includes a pair of U-shaped groove longitudinal portions 515A that are laterally spaced apart, and a U-shaped groove lateral portion 515B that extends laterally between the rear ends of the U-shaped groove longitudinal portions 515A. The U-shaped groove lateral portion 515B is located behind the lateral groove segment 516, and connects the left and right U-shaped groove longitudinal portions 515A to each other. Hooks (not shown in the drawings) for retaining the skin member 214 are positioned at appropriate positions inside the retaining groove 514.

The upper surface of the pad member 513 is formed with a plurality of recesses 240 each accommodating an air cell 209 therein. Similar to those of the fourth embodiment, each recess 240 is recessed downward, and has a substantially rectangular shape when viewed from above. In the present embodiment, a plurality of the recesses 240 are provided in a region defined by the U-shaped groove lateral portion 515B and the left and right U-shaped groove longitudinal portions 515A. The recesses 240 are arranged on the upper surface of the pad member 513 in two rows extending in the fore and aft direction and laterally aligned to each other so as to form lateral pairs.

A communication groove 517 laterally extends from each of the recesses 240 to the U-shaped groove segment 515 (more specifically, the corresponding U-shaped groove longitudinal portion 515A) on the upper surface of the pad member 513. The laterally outer end of each communication groove 517 terminating at the corresponding U-shaped groove segment 515 communicates with a through hole 518 that is passed vertically through the pad member 513.

The air cells 209 are each housed in the corresponding recess 240. A tubing 519 for supplying and exhausting air is connected to the air cells 209. The tubing 519 passes through the communication grooves 517 and the through holes 518, extend to the lower side of the pad member 513, and is connected to the air supply/exhaust device 242. The tubing 519 is made of flexible and deformable material which is stiffer than the pad member 513.

Similarly to the fourth embodiment, a passage 238 is formed inside the pad member 213. When the blower 239 is activated, the air supplied from the blower 239 to the duct 222 reaches the seated occupant via the passage 238. Thus, the blower 239 blows air to the seated occupant via the passage 238.

Next, the effect of the vehicle seat 501 configured in this way will be discussed in the following. In the vehicle seat 501 according to the present embodiment, since the tubing 519 is provided so as to pass through the retaining groove 514, the number of holes and grooves for connecting the tubing 519 to the air cells 209 may be reduced so that the structure of the vehicle seat 501 is simplified.

Eighth Embodiment

An eighth embodiment of the vehicle seat device according to the present invention will be described in the following with reference to FIGS. 22 to 25C.

Figure 22:
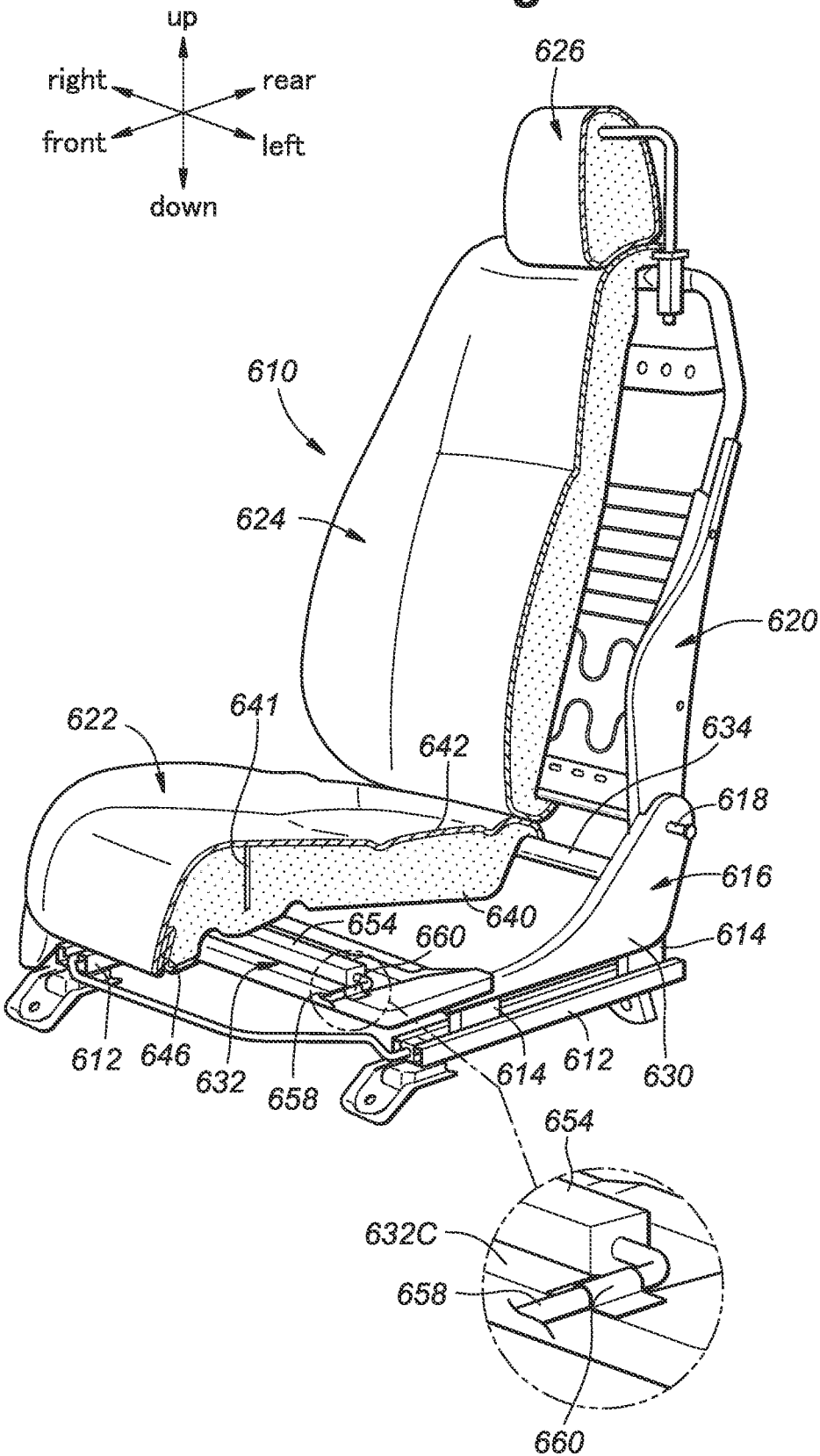
FIG. 22 is a perspective view of a seat cushion of a vehicle seat according to an eighth embodiment of the present invention partly in section.

As shown in FIG. 22, the vehicle seat device 610 is configured as a seat device for an automobile, and is mounted on sliders 614 (upper rails) which are slidably engaged by the left and right guide rails 612 (lower rails), respectively, installed on a floor panel (not shown) of the automobile so that the vehicle seat can be adjusted in the fore and aft direction.

The vehicle seat device 610 includes a seat cushion frame 616 fixed to the sliders 614, a support shaft 618 extending in the lateral direction at the rear end of the seat cushion frame 616, and a seat back frame 620 having a lower end attached to the support shaft 618 so as to be tilted about the support shaft 618. A seat cushion 622 that supports the buttocks and thighs of the seated occupant is attached to the upper part of the seat cushion frame 616. A seat back 624, which serves as a backrest of the seated occupant, is attached to a rear part of the seat back frame 620. A headrest 626 is attached to an upper end part of the seat back 624.

The seat cushion frame 616 includes a left and a right side member 630 extending in the fore and aft direction parallel to each other, a front pan 632 extending laterally between the front parts of the left and right side members 630, and a rear rod 634 that extends laterally and connects rear parts of the left and right side members 630 to each other, and forms a square frame shape in top view.

The seat cushion 622 includes a pad member 640 made of foamed polyurethane resin or the like, and a skin member 642 that covers the outer surface of the pad member 640 excluding the bottom surface thereof, and has a rectangular shape in top view. The seat cushion 622 is supported by the left and right side members 630 at either side part thereof, by the front pan 632 at the front end part thereof, and by the rear rod 634 at the rear end part thereof, and extends so as to exhibit a substantially horizontal upper surface.

Figure 23:
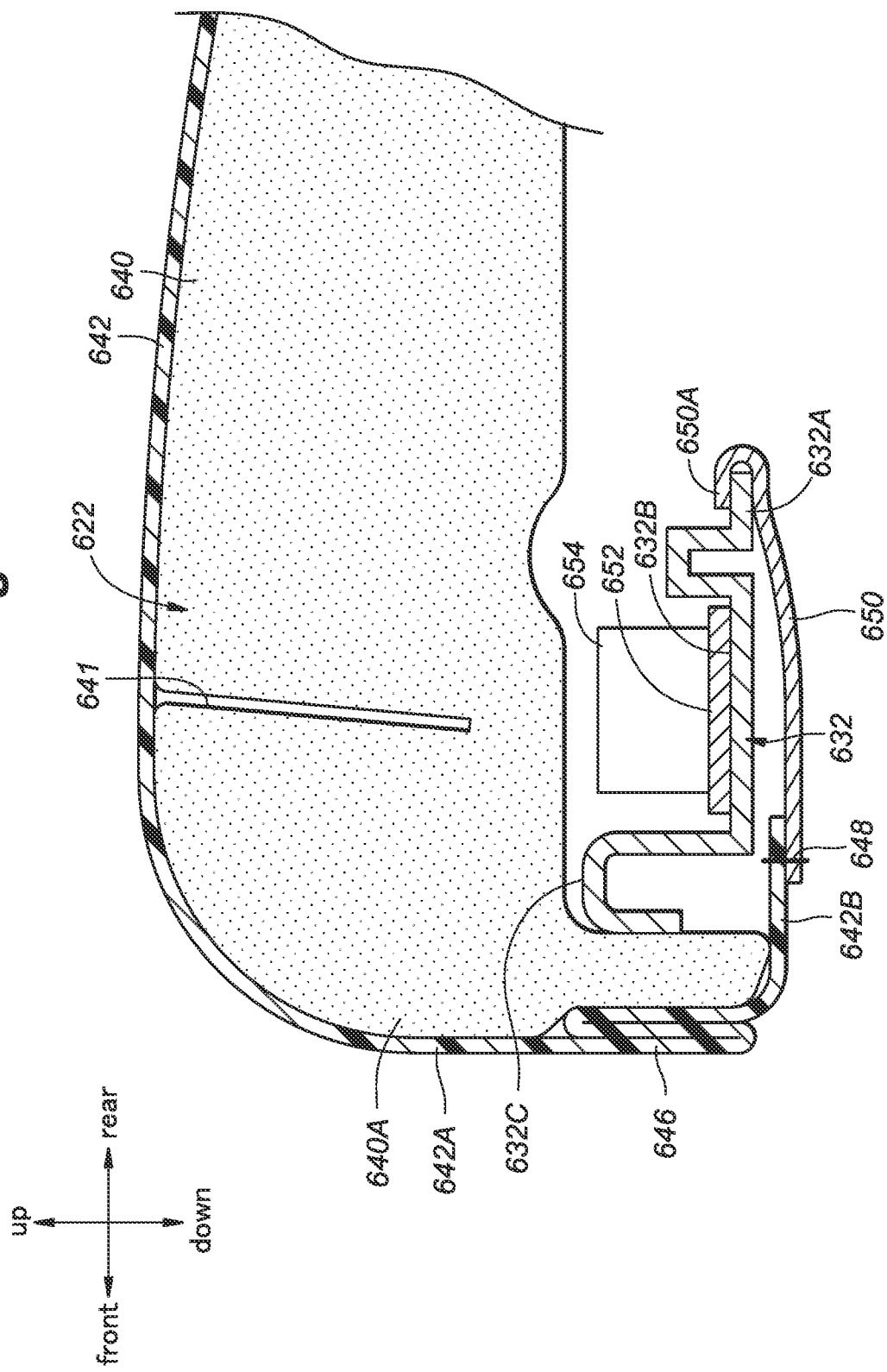
FIG. 23 is an enlarged fragmentary sectional view of the vehicle seat of the eighth embodiment.

The skin member 642 is made of leather, a resin sheet, a woven fabric, or the like. The skin member 642 has a front part 642A extending along a front end 640A of the pad member 640, as shown in FIG. 23. The front part 642A of the skin member 642 includes a folded portion 646 that is formed by folding the skin member 642 up and down, with a predetermined vertical length of the lower edge of the skin member 642 being folded upon itself. The folded portion 646 is kept in the folded state by bonding the adjoining layers of the skin member 642 to each other with a double-sided adhesive tape (not shown in the drawings) or the like.

The folded portion 646 is formed as an unfoldable portion that can be unfolded under a tension exceeding a prescribed value owing to the separation of the bonding between the adjoining layers of the skin member 642 so as to accommodate the bulging deformation of the pad member 640 which can be caused by the activation of an airbag device 654 (which will be described hereinafter) and the resulting extension of the upper surface part of the skin member 642 in the fore and aft direction. The term "tension" as used herein refers to the longitudinal tension that is created on an upper side part of the skin member 642.

The skin member 642 is bent rearward from the lower end of the folded portion 646 and extends backward along the lower side of the pad member 640 to form a rearwardly extending portion 642B, and the rear end of this rearwardly extending portion 642B is fixedly provided with a locking metal fitting 650 via a sewn portion 648 or the like. The locking metal fitting 650 is engaged by a rear edge portion 632A of the front pan 632 by means of a hook portion 650A provided at the tip end of the locking metal fitting 650. Owing to this engagement structure, a predetermined tension is normally applied to the skin member 642. The tension normally applied to the skin member 642 is set so as not to break the folded state of the folded portion 646.

The front pan 632 is provided with a laterally elongated recess 632B, as shown in FIG. 24. A mount bracket 652 having a lower surface shape similar to the upper surface shape of the front pan 632 is fixed to the upper surface of the front pan 632 by using fasteners 656 such as rivets. An airbag device 654 is attached to a part of the mount bracket 652 corresponding to the recess 632B. The airbag device 654 includes an inflator (not shown in the drawings) and an airbag (not shown in the drawings), and the airbag is inflated by the operation of the inflator by an electric signal from the outside. Hereinafter, the inflation of the airbag is referred to as the deployment operation of the airbag device 654. The deployment operation of the airbag device 654 may be performed when a fore and acceleration exceeding a predetermined value is applied to the vehicle seat device 610 and the seated occupant, as is the case when a vehicle crash occurred.

A groove 641 extending in the lateral direction is formed on the upper surface of the pad member 640 at a fore and aft (longitudinal) position corresponding to the airbag device 654.

When the airbag device 654 is deployed by an electric signal from the outside, a front part of the pad member 640 is deformed so as to rise upward forming a bulge having an apex directly above the airbag device 654. When the front part of the pad member 640 is raised and deformed in this manner, the thighs of the seated person are lifted by the upward deformation of the pad member 640. This upward deformation of the pad member 640 provides a resistance against a forward motion of the lower body of the seated occupant caused by the forward slipping of the seated occupant along the upper surface of the seat cushion 622 so that the occurrence of the submarine phenomenon is prevented.

When the pad member 640 is raised and deformed, a tension exceeding the predetermined value acts on the skin member 642. Due to this tension, the bonding of the folded portion 646 of the skin member 642 is broken, and the folded portion 646 becomes unfolded. As a result, the afore and aft (longitudinal) length of the upper surface part of the skin member 642 increases.

Owing to this action, the bulging deformation of the pad member 640 caused by the deployment of the airbag device 654 is prevented from being impeded by the skin member 642. As a result, the bulging deformation of the pad member 640 is favorable performed, and the required submarining preventing action can be obtained.

Owing to the presence of the groove 641, the force required for the pad member 640 to undergo the bulging deformation when the airbag device 654 is deployed can be reduced. As a result, even if the power of the airbag device 654 is not high, the pad member 640 can be raised and deformed in a reliable manner, and the submarine phenomenon can be prevented in a more reliable manner.

As shown in FIG. 22, a wire harness 658 (electric wire) extends along the upper surface of the front pan 632 to conduct an electrical signal from the outside to the airbag device 654. The wire harness 658 extends between the upper surface of a front flange portion 632C of the front pan 632 and the lower surface of the pad member 640 of the seat cushion 622, and is connected to the airbag device 654.

Figure 25A:
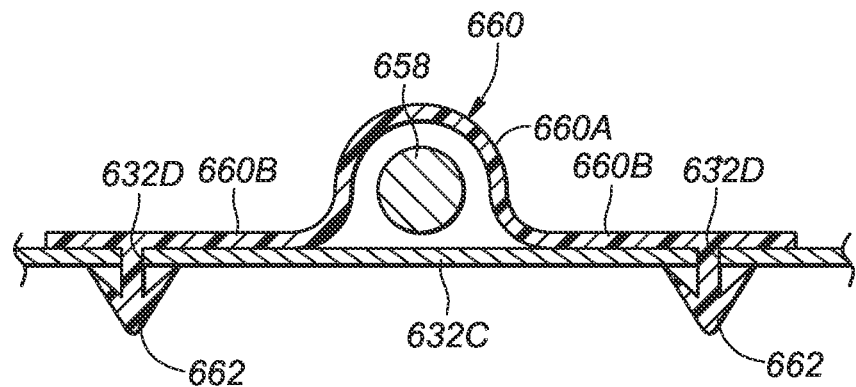
FIGS. 25A to 25C are enlarged sectional views of the vehicle seat of the eighth embodiment showing the positioning of a wire harness.

As shown in FIGS. 22 and 24, on the upper surface of the front flange portion 632C is positioned a cover member 660 that covers a part of the wire harness 658 extending along the upper surface of the front flange portion 632C in the fore and aft direction over substantially the entire length thereof. As shown in FIG. 25A, the cover member 660 is an electrically insulating resin molded product, and includes a semi-cylindrical portion 660A accommodating the harness 658 therein, a pair of flange portions 660B extending from the outer edges of the semi-cylindrical portion 660A away from each other, and a pair of barb-shaped locking claws 662 projecting downward from the lower surfaces of the respective flange portions 660B. The cover member 660 is fixed to the front pan 632 by inserting the locking claws 662 into corresponding through holes 632D formed in the front flange portion 632C.

The cover member 660 prevents the wire harness 658 from being disconnected due to interference with the pad member 640 which may occur due to the impact or vibration caused by the seating of an occupant, the upward deformation of the pad member 640, or the like.

Figure 25B:
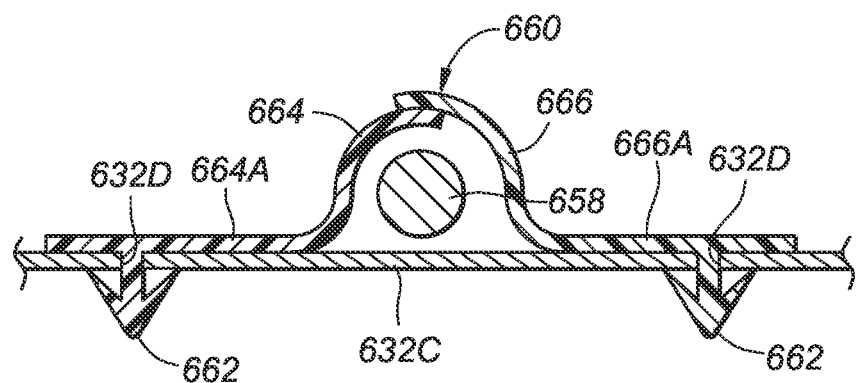
Figure 25C:
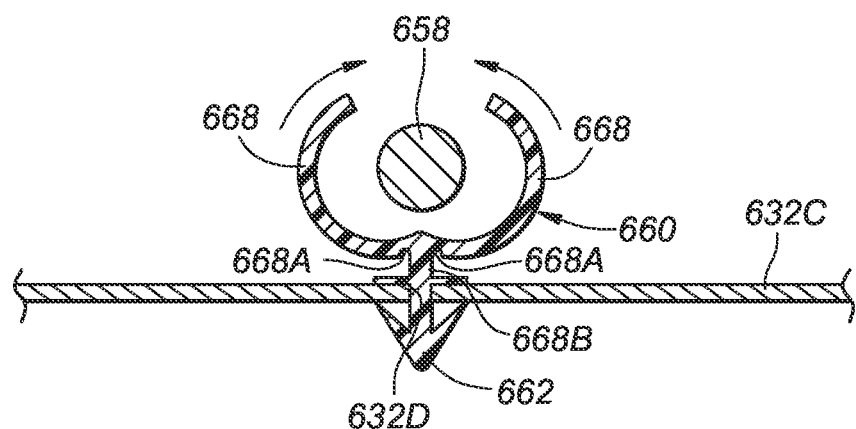

As shown in FIG. 25B, the cover member 660 may be composed of a combination of two left and right halves 664 and 666. In this case, the locking claw 662 is formed on each of the flange portions 664A and 666A of the two halves 664 and 666. As shown in FIG. 25C, the cover member 660 may have a jaw-structure which forms a receiving portion 668 for receiving the harness 658 therein by being opened and closed by a hinge 668A. In this case, a locking claw 662 is formed on a base portion 668B of the receiving portion 668.

Ninth Embodiment

A ninth embodiment of the vehicle seat device according to the present invention will be described in the following with reference to FIG. 26. In FIG. 26, the parts corresponding to those in FIG. 2 are denoted with like reference numerals, and the description of such parts may be omitted.

The skin member 642 includes an auxiliary skin member 680 having an overlapping end portion 680A that overlaps with an end portion 642C of the rearwardly extending portion 642B. A locking metal fitting 650 is attached to the auxiliary skin member 680 via a sewn portion 648 or the like. The locking metal fitting 650 engages a rear edge portion 632A of the front pan 632 with a hook portion 650A formed at the tip end of the locking metal fitting 650.

The end portion 642C and the end portion 680A overlap each other by a predetermined longitudinal length, and are joined to each other in two stages, one consisting of a first joint portion 682 that can be ruptured by the deployment operation of the airbag device 654, the other consisting of a second joint portion 684 that is located closer to the terminal end of the overlapping portion than the first joint portion 682 and capable of withstanding the tension produced by the deployment operation of the airbag device 654. Thus, an extendable portion that allows the longitudinal length of the skin member 642 to be increased by the deployment of the airbag device 654 is formed. For this purpose, the first joint portion 682 and the second joint portion 684 are formed by sewed portions having different joining strengths, bonded portions having different bonding strength, etc.

Normally, as shown in FIG. 26, the first joint portion 682 and the second joint portion 684 are not broken, and the first joint portion 682 and the second joint portion 684 are at a prescribed longitudinal distance from each other with the end portion 642C and the end portion 680A overlapping with each other When a front part of the pad member 640 is raised and deformed by the deployment operation of the airbag device 654, a tension exceeding a predetermined value acts on the skin member 642 with the result that the first joint portion 682 is broken. This causes the overlapping parts of the end portion 642C and the end portion 680A to be separated from each other, and the longitudinal length of the skin member 642 on the upper side to be increased.

Owing to this action, the bulging deformation of the pad member 640 due to the deployment operation of the airbag device 654 is prevented from being hindered by the skin member 642 so that the bulging deformation of the pad member 640 can be performed in a favorable manner. This embodiment also provides a required action to suppress the submarine phenomenon.

Since the second joint portion 684 is kept connected even after the deployment operation of the airbag device 654, the pad member 640 is prevented from being exposed.

The skin member 642 and the auxiliary skin member 680 may consist of a single piece by connecting the end portion 642C with the end portion 680A via a bent or folded portion of the skin member 642 in the shape of inverted letter U. In this case, the second joint portion 684 may be omitted.

Tenth Embodiment

The tenth embodiment of the vehicle seat device according to the present invention will be described in the following with reference to FIG. 27. In FIG. 27, the parts corresponding to those in FIG. 23 are denoted with like reference numerals, and description of such parts may be omitted in the following disclosure.

The pad member 640 is provided with a retaining groove 686 extending laterally at a longitudinally middle part thereof. The retaining groove 686 has a closed bottom, and opens at the upper surface of the pad member 640.

The skin member 642 includes a rear side skin member 643 that covers the part of the pad member 640 on the rear side of the retaining groove 686, and a front side skin member 645 that covers the part of the pad member 640 on the front side of the retaining groove 686. The rear side skin member 643 has a front edge part 643A that drops into the retaining groove 686. The front side skin member 645 has a rear edge part 645A that drops into the retaining groove 686. The front edge part 643A and the rear edge part 645A overlap with each other over a predetermined longitudinal length, and the terminal edges of these edge parts are connected to an anchor member 690 via a sewn portion 688.

The pad member 640 is provided with a clip member 692 made of a resin molded product and fixed to the bottom of the retaining groove 686. The clip member 692 is provided with a pair of gripping claws 692A positioned one behind the other, and an actuation arm 692B extending forward from the front gripping claw 692A in the shape of letter U lying on its side to a position directly above the airbag device 654.

Normally, the front and rear gripping claws 692A resiliently grip the anchor member 690 so as to apply a longitudinal tension to the rear side skin member 643 and the front side skin member 645. Upon receiving an upward force as a result of the deployment of the airbag device 654 at the free end of the actuation arm 692B, the front and rear gripping claws 692A are deformed away from each other.

Thus, when the airbag device 654 is deployed, the anchor member 690 is disengaged from the clip member 692, and the front edge part 643A of the rear side skin member 643 and the rear edge part 645A of the front side skin member 645 are allowed to move freely out of the retaining groove 686.

When the front part of the pad member 640 is raised and deformed by the deployment operation of the airbag device 654, the front edge part 643A of the rear side skin member 643 and the rear edge part 645A of the front side skin member 645 are allowed to move upward from the retaining groove 686 so that the skin member 642 is allowed to freely stretch in the longitudinal direction.

Thus, when the airbag device 654 is deployed, the bulging deformation of the pad member 640 can be performed in a favorable manner without being hampered by the skin member 642 so that the submarine phenomenon can be effectively prevented.

In this embodiment, the retaining groove 686 provides a similar function as the groove 641 of the eighth embodiment, and the force required for the deployment operation of the airbag device 654 to cause the bulging deformation of the pad member 640 is reduced.

Eleventh Embodiment

The eleventh embodiment of the vehicle seat device according to the present invention will be described in the following with reference to FIG. 28. In FIG. 28, the parts corresponding to those in FIG. 27 are denoted with like reference numerals as those shown in FIG. 27, and the description of such parts may be omitted in the following disclosure.

In the eleventh embodiment, the retaining groove 686 and the clip member 692 are positioned directly above the airbag device 654. In this embodiment, the clip member 692 has a pair of flange portions 692C extending from the gripping claws 692A away from each other.

At the time of the deployment operation of the airbag device 654, the clip member 692 receives an upward force from the airbag device 654 from below so that the front and rear gripping claws 692A are deformed away from each other.

As a result of the deployment of the airbag device 654, the anchor member 690 is disengaged from the clip member 692 so that the front edge part 643A of the rear side skin member 643 and the rear edge part 645A of the front side skin member 645 are allowed to be freely pulled out upward from the retaining groove 686 similarly as in the tenth embodiment.

Thus, in the eleventh embodiment also, when the airbag device 654 is deployed, the bulging deformation of the pad member 640 can be performed in a favorable manner without being hampered by the skin member 642 so that the submarine phenomenon can be effectively prevented.

In this embodiment also, the retaining groove 686 provides a similar function as the groove 641 of the eighth embodiment, and the force required for the deployment operation of the airbag device 654 to cause the bulging deformation of the pad member 640 is reduced.

Twelfth Embodiment

Figure 29:
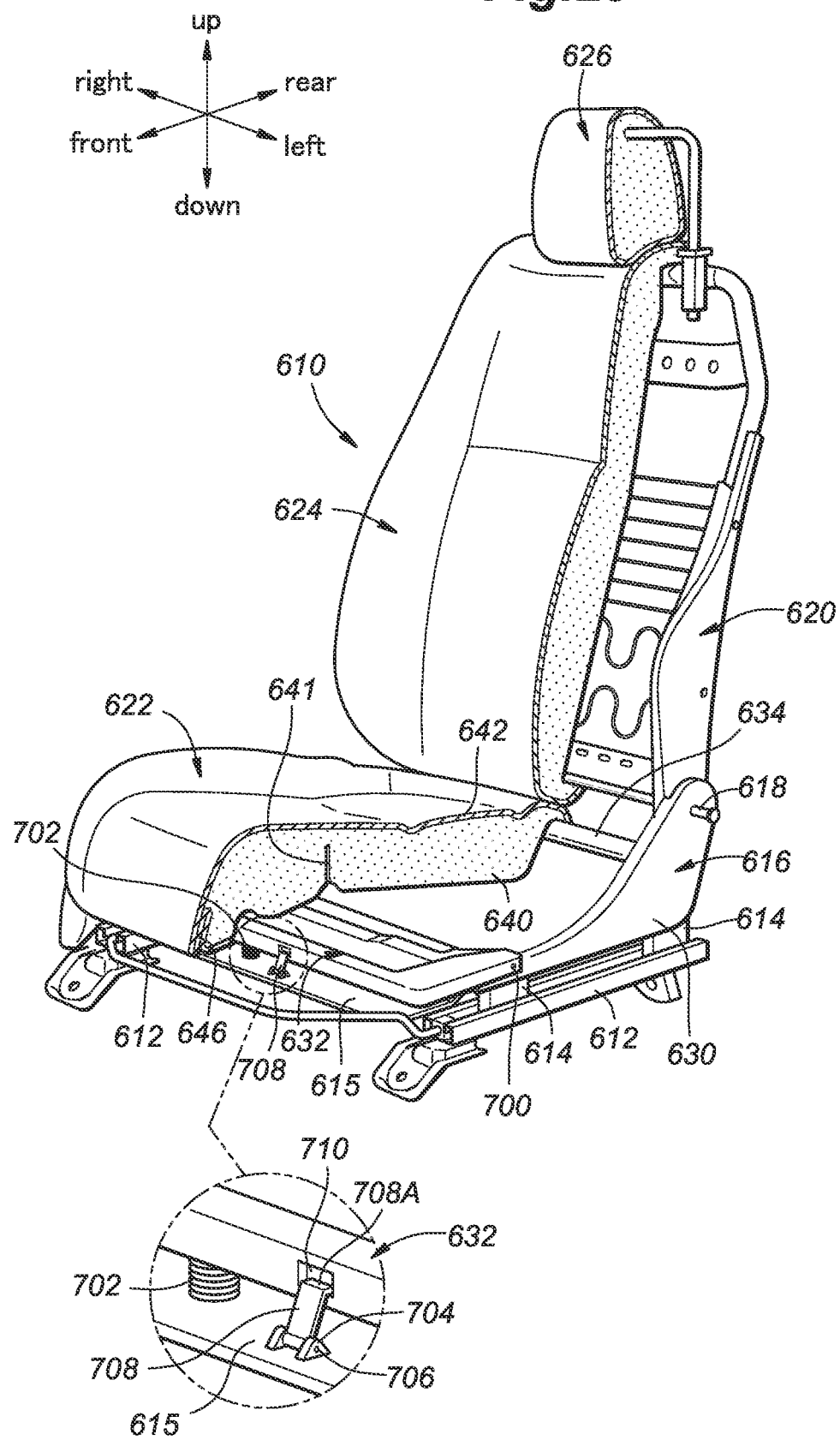
FIG. 29 is a perspective view of a vehicle seat according to a twelfth embodiment of the present invention partly in section.

The twelfth embodiment of the vehicle seat device according to the present invention will be described in the following with reference to FIG. 29. In FIG. 29, the parts corresponding to those in FIG. 22 are denoted by like reference numerals, and the description of such parts may be omitted in the following disclosure.

In the twelfth embodiment, the front pan 632 of the seat cushion frame 616 is supported by a pivot shaft 700 extending horizontally between the front ends of the left and right side members 630 so as to be tilted upward.

The front pan 632 is normally urged upward by a compression coil spring 702 provided between the front pan 632 and a support plate 615 connected to the sliders 614.

A lock member 708 is pivotally attached to the support plate 615 via a bracket 704 so as to be rotatable around a lateral axis, The lock member 708 is urged by a torsion coil spring (not shown in the drawing) in such a direction that a locking claw 708A formed in the lock member 708 is engaged by an engaging recess 710 formed in the front pan 632.

When the locking claw 708A of the lock member 708 is engaged by the engaging recess 710, the front pan 632 takes a substantially horizontal attitude, and the seat cushion 622 takes a substantially horizontal attitude in a corresponding manner.

The lock member 708 is driven by an actuator (not shown in the drawings) in a direction to move the locking claw 708A away from the engaging recess 710. When the locking claw 708A of the lock member 708 is disengaged from the engaging recess 710, the front pan 632 is tilted about the pivot shaft 700 into a front end up attitude under the spring force of the compression coil spring 702. This tilting movement causes the front part of the seat cushion frame 616 to be displaced or tilted into a front end up attitude. As a result, the resistance against the lower body of the seated occupant slipping forward from the seat cushion 622 is increased so that the occurrence of the submarine phenomenon is prevented.

Although the present invention has been described in terms of specific embodiments, the present invention is by no means limited by such embodiments, but can be modified in various ways. In the first to third embodiments, the air cells 32 are inflated and deflated to massage the buttocks and thighs of the occupant, but the present invention is not limited to these embodiments. For example, the control unit 42 may open only the solenoid valve 48 connected to the air cells 32 provided on the left half (or right half) of the vehicle seat 1, and control the posture of the occupant by inflating only the air cells 32 that are located on the left half (or right half) of the seating surface 8 of the vehicle seat 1.

In the first to third embodiments, the air cells 32 and the seat heater 38 are provided on the seat cushion 5, but the present invention is not limited to these embodiments. By applying the same inventive idea, the air cells 32 and the seat heater 38 may be provided on the surface side (front side) of the pad member of the seat back 6 of the vehicle seat 1. By providing the air cells 32 on the seat back 6 and inflating and deflating the air cells 32 therein, the hip and back of the occupant can be pressed and massaged.

Figure 30A:
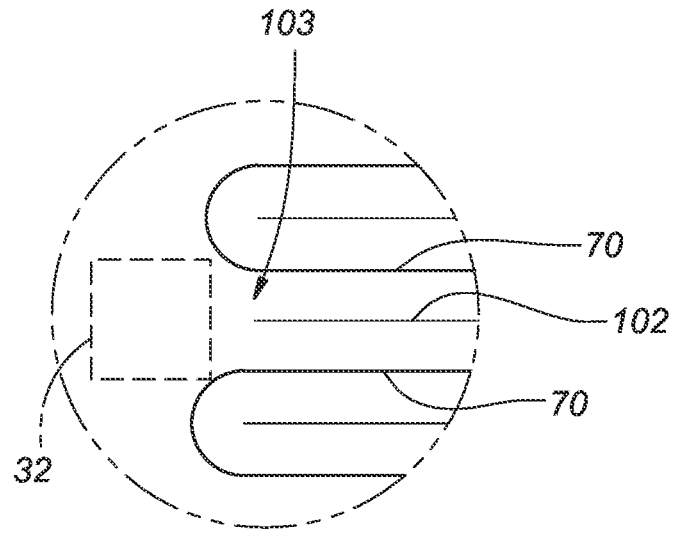
FIG. 30A is an enlarged fragmentary view showing a part of a seat heater in a vehicle seat modified from that of the second embodiment, a slit being positioned so as not to overlap with an air cell.
Figure 30B:
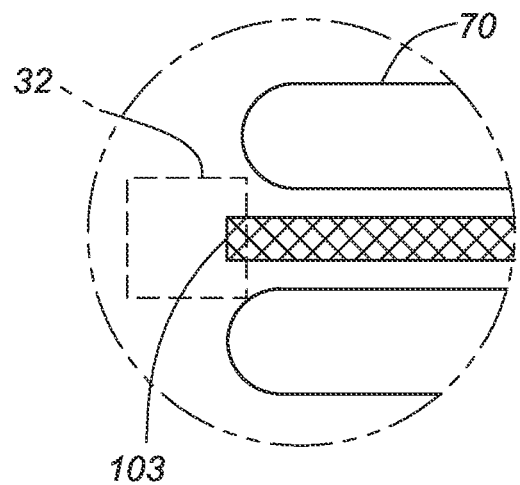
FIG. 30B is an enlarged fragmentary view showing a part of a seat heater of a vehicle seat modified from that of the second embodiment, a readily deformable portion being formed by a material other than non-woven fabric.

In the second embodiment, the slits 102 are provided so as to overlap with the air cells 32, but the present invention is not limited to this embodiment. Any arrangement may be used as long as the readily deformable portion 160 of the seat heater 38 is deformable following the inflation of the air cell 32, and as shown in FIG. 30A, the readily deformable portion 160 of the seat heater 38 may be formed in the vicinity of the air cell 32 by providing the slit 102 in the vicinity of the air cell 32. Further, as shown in FIG. 30B, the readily deformable portion 103 of the seat heater 38 may be partly made of a material (for example, rubber or the like) having a higher flexibility than the non-woven fabric.

In the first to third embodiments, the vehicle seats 1, 101 and 201 are described as being used in automobiles, but the present invention is not limited to these embodiments. The present invention can be applied to vehicle seats other than those for automobiles (for example, buses, trucks, ships, airplanes, etc.).

In the fourth to seventh embodiments, the air cells 209 are provided on the seat cushion 205, but the present invention is not limited to these embodiments. The air cells 209 may also be provided on the seat back 206. Further, in the fourth to seventh embodiments, the vehicle seats 151, 301, 401, and 501 are those used in automobiles, but the present invention is not limited to these embodiments. The present invention can also be applied to seats provided on vehicles other than automobiles (for example, buses, trucks, ships, airplanes, etc.).

In the fourth to seventh embodiments, the air cells 209 consist of fluid sealed members in which air, which is a fluid, is contained, but the present invention is not limited to these embodiments. The fluid sealed member may take any other form as long as the fluid sealed member can contain and discharge a fluid and consists of a bag-shaped member that is inflated when the liquid is filled (introduced) therein. In short, the fluid sealed member may be a bag-shaped member that is inflated when a fluid consisting of a liquid is introduced thereinto.

In the fourth to seventh embodiments, the passages 238 and 338 are used to send air to the seated occupant, but the present invention is not limited to these embodiments. For example, the passage 238, 338 may be connected to a device (supply/discharge device) for supplying or discharging a fluid such as air, and supply or discharge the fluid to and from parts near the surface of the vehicle seats 151, 301, 401, 501. For example, the passages 238 and 338 may be used to expel and collect air from parts near the surface of vehicle seats 151, 301, 401, 501. The collected air may be used, for example, to determine the physical condition of the seated person.

In these cases also, the passages 238 and 338 may be passed in the region located between the adjacent air cells 209. Thereby, when the air cells 209 are inflated, the passage 238 and 338 may provide an access to the gaps between the adjacent air cells 209 to efficiently collect the air stagnating in the gaps.

Further, the blower 239 may be either connected and attached to the vehicle seat 151, or to the vehicle body (for example, the floor 203).

Figure 31:
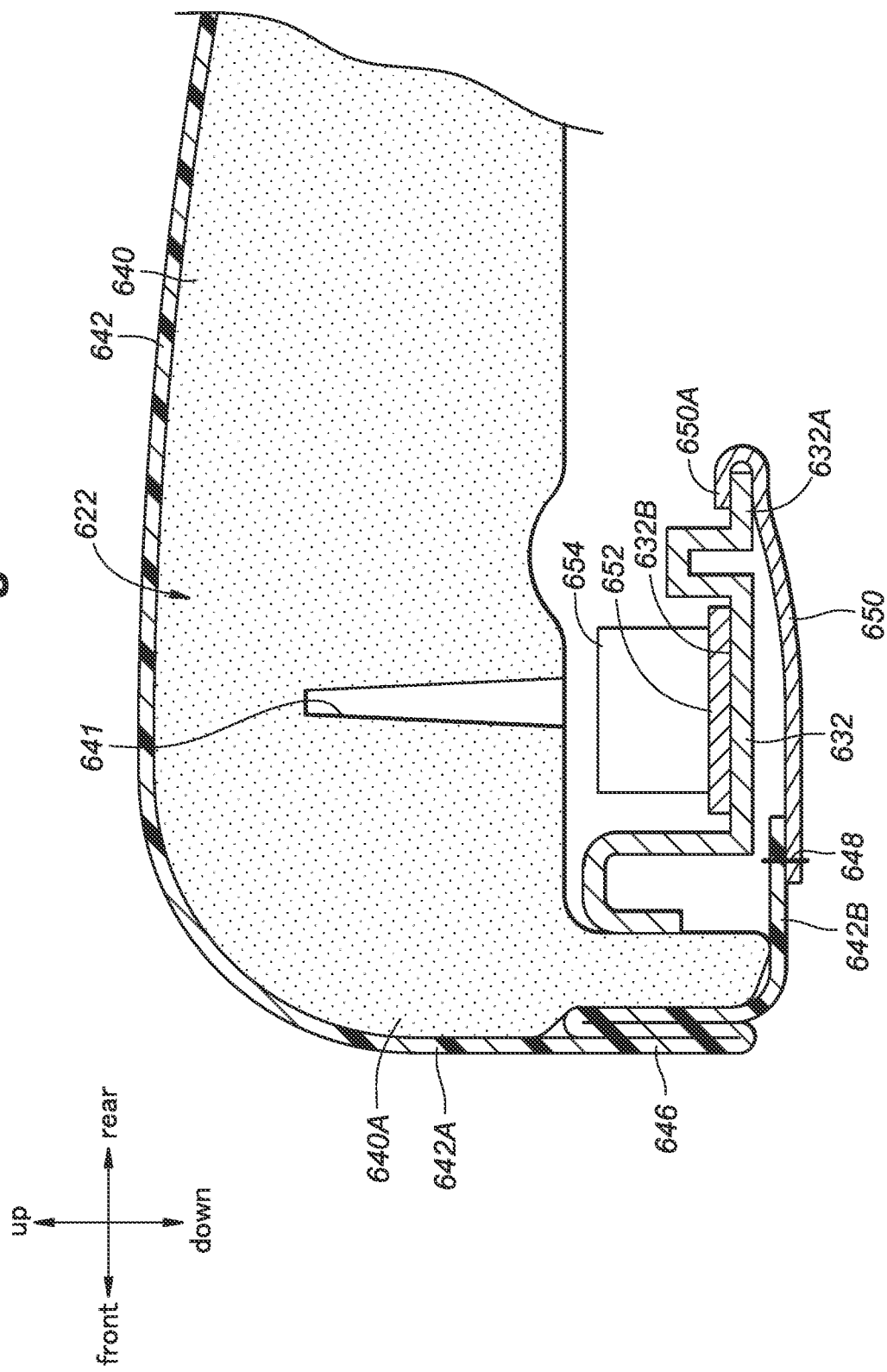
FIG. 31 is an enlarged fragmentary sectional view of a part of a vehicle seat is modified from those of the eighth to twelfth embodiments.
Figure 32:
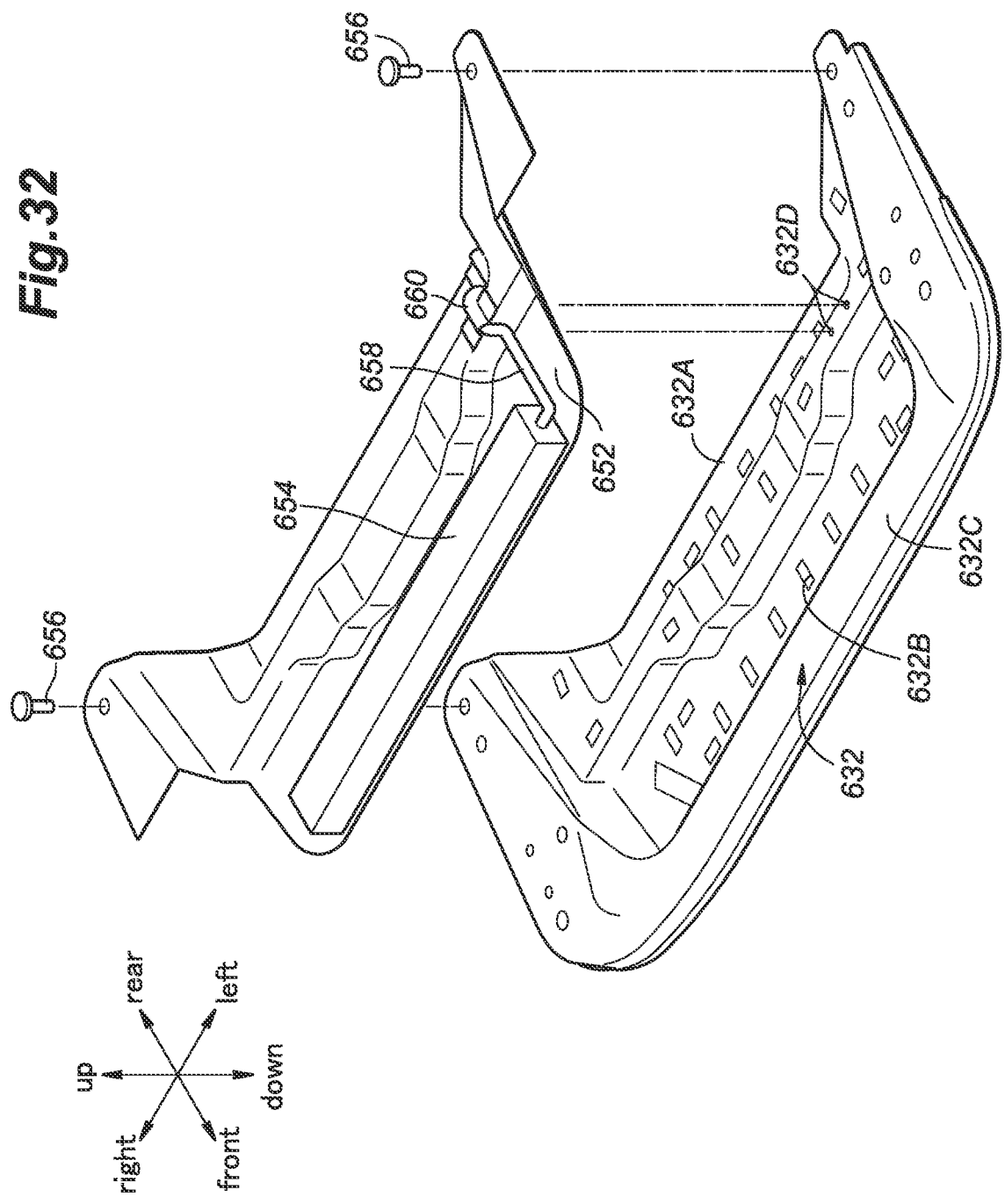
FIG. 32 is an enlarged fragmentary perspective view of a front pan and an airbag device of a vehicle seat is modified from those of the eighth to twelfth embodiments.

Further, as shown in FIG. 31, the groove 641 may extend laterally on the lower surface of the pad member 640 at a longitudinal position corresponding to the airbag device 654. As shown in FIG. 32, the wire harness 658 may extend from the airbag device 654 to the rear edge portion 632A of the front pan 632 along the upper surface of the front pan 632. In this case also, the harness 658 may be covered by a cover member 660 over the entire length of the part thereof extending along the front pan 632.

REFERENCE NUMERALS

| | |
|---|---|
| 1: vehicle seat according to the first embodiment | |
| 5: seat cushion | 6: seat back |
| 12: pad member | 13: skin member |
| 32: air cell | 68: base cloth |
| 70: heater wire | |
| 101: vehicle seat according to the second embodiment | |
| 102: slit | 103: readily deformable portion |
| 151: vehicle seat according to the third embodiment | |
| 155: slit | 156: slit lateral part (first part) |
| 157: slit longitudinal part (second part) | 160: readily deformable portion |
| 201: vehicle seat according to the fourth embodiment | |
| 209: air cell (fluid sealed member) | 213: pad member |
| 216: pad main body | 217: passage forming piece |
| 218: stiff member | 219: upper part forming piece |
| 238: passage | |
| 301: vehicle seat according to the fifth embodiment | |
| 317: passage forming member | 318: stiff member |
| 338: passage | |
| 401: vehicle seat according to the sixth embodiment | |
| 418: stiff member | 420: projecting wall |
| 501: vehicle seat according to the seventh embodiment | |
| 513: pad member | |
| 610: vehicle seat device according to the eighth to twelfth embodiments | |
| 614: slider | 615: support plate |
| 616: seat cushion frame | 618: support shaft |
| 620: seat back frame | 622: seat cushion |
| 624: seat back | 626: headrest |
| 630: side member | 632: front pan |
| 632A: rear edge portion | 632B: recess |
| 632C: front flange portion | 632D: through hole |
| 634: rear rod | 640: pad member |
| 640A: front end | 641: groove |
| 642: skin member | 642A: front part |
| 642B: rearwardly extending portion | 642C: end portion |
| 643: rear side skin member | 643A: front edge part |
| 645: front side skin member | 645A: rear edge part |
| 646: folded portion | 648: sewn portion |
| 650: locking metal fitting | 650A: hook part |
| 652: mount bracket | 654: airbag device |
| 656: fastener | 658: wire harness |
| 660: cover member | 660A: semi-cylindrical portion |
| 660B: flange portion | 662: locking claw |
| 664: half | 666: half |
| 668: receiving portion | 668A: hinge |
| 668B: base portion | 680: auxiliary skin member |
| 680A: end portion | 682: first joint portion |
| 684: second joint portion | 686: retaining groove |
| 688: sewn portion | 690: anchor member |
| 692: clip member | 692A: gripping claw |
| 692B: actuating arm | 692C: flange portion |
| 700: pivot shaft | 702: compression coil spring |
| 704: bracket | 708: lock member |
| 708A: locking claw | 710: engaging recess |

The invention claimed is:

1. A vehicle seat, comprising
at least one of a seat back and a seat cushion having a pad member and a skin member covering the pad member,
wherein a heater having a sheet configuration and a plurality of air cells are provided between a surface side of the pad member and the skin member, and
the heater and the air cells are positioned so as not to overlap each other in a surface side to back side direction.

2. The vehicle seat according to claim 1, wherein the heater is attached to a back side surface of the skin member, and the air cells are attached to a surface side surface of the pad member.

3. The vehicle seat according to claim 1, wherein the heater is provided with a readily deformable portion that can be readily deformed when the air cells are inflated.

4. The vehicle seat according to claim 3, wherein the readily deformable portion includes a slit provided in the heater.

5. The vehicle seat according to claim 4, wherein the heater includes a base cloth with a sheet configuration and a heating wire positioned along a surface of the base cloth, the slit being provided between adjacent segments of the heating wire.

6. The vehicle seat according to claim 4, wherein the slit overlaps with one of the air cells in the surface side to back side direction.

7. The vehicle seat according to claim 3, wherein the heater includes a base cloth with a sheet configuration and a heating wire positioned along a surface of the base cloth, and the deformable portion includes a segment of the heating wire that extends while meandering in a first direction and is looped back in a second direction orthogonal to the first direction.

8. The vehicle seat according to claim 7, wherein a part of the base cloth located in the readily deformable portion is provided with a slit that does not overlap with the heating wire.

9. The vehicle seat according to claim 8, wherein the slit includes a first part extending in the first direction and a second part extending orthogonally to the first part.

10. A manufacturing method of a vehicle seat, comprising:
preparing a pad member for a seat back or a seat cushion;
positioning a heater having a sheet configuration and a plurality of air cells on a surface of the pad member so as not to overlap each other in a surface side to back side direction; and
covering the surface of the pad member, the heater and the air cells with a skin member so that the heater and air cells are disposed between a surface side of the pad member and the skin member.

11. A vehicle seat, comprising
at least one of a seat back and a seat cushion having a pad member and a skin member covering the pad member,
wherein a heater having a sheet configuration and a plurality of air cells are provided between a surface side of the pad member and the skin member,
the heater is provided with a readily deformable portion that can be readily deformed when the air cells are inflated,
the heater includes a base cloth with a sheet configuration and a heating wire positioned along a surface of the base cloth, and
a part of the base cloth located in the readily deformable portion is provided with a slit that does not overlap with the heating wire.

12. The vehicle seat according to claim 11, wherein the deformable portion includes a segment of the heating wire that extends while meandering in a first direction and is looped back in a second direction orthogonal to the first direction.

13. The vehicle seat according to claim 12, wherein the slit includes a first part extending in the first direction and a second part extending orthogonally to the first part.

\* \* \* \* \*